US008105783B2

(12) United States Patent
Handique

(10) Patent No.: US 8,105,783 B2
(45) Date of Patent: Jan. 31, 2012

(54) MICROFLUIDIC CARTRIDGE

(75) Inventor: Kalyan Handique, Ypsilanti, MI (US)

(73) Assignee: HandyLab, Inc., Ann Arbor, MI (US)

( * ) Notice: Subject to any disclaimer, the term of this patent is extended or adjusted under 35 U.S.C. 154(b) by 422 days.

(21) Appl. No.: 12/239,537

(22) Filed: Sep. 26, 2008

(65) Prior Publication Data

US 2009/0130719 A1    May 21, 2009

Related U.S. Application Data

(63) Continuation-in-part of application No. 12/173,023, filed on Jul. 14, 2008, and a continuation-in-part of application No. 29/308,920, filed on Jul. 14, 2008, now Pat. No. Des. 621,060, and a continuation-in-part of application No. 11/985,577, filed on Nov. 14, 2007, now Pat. No. 7,998,708.

(60) Provisional application No. 60/959,437, filed on Jul. 13, 2007.

(51) Int. Cl.
*C12Q 1/68* (2006.01)
*C12P 19/34* (2006.01)

(52) U.S. Cl. .................. 435/6.12; 435/6.1; 435/6.11

(58) Field of Classification Search .................. None
See application file for complete search history.

(56) References Cited

U.S. PATENT DOCUMENTS

| | | |
|---|---|---|
| 1,434,314 A | 10/1922 | Raich |
| 1,616,419 A | 2/1927 | Wilson |
| 1,733,401 A | 8/1930 | Lovekin |
| 3,528,449 A | 9/1970 | Witte et al. |
| 3,985,649 A | 10/1976 | Eddelman |
| 4,018,089 A | 4/1977 | Dzula et al. |
| 4,018,652 A | 4/1977 | Lanham et al. |
| 4,038,192 A | 7/1977 | Serur |
| 4,055,395 A | 10/1977 | Honkawa et al. |
| D249,706 S | 9/1978 | Adamski |
| 4,139,005 A | 2/1979 | Dickey |
| D252,157 S | 6/1979 | Kronish et al. |
| D252,341 S | 7/1979 | Thomas |
| D254,687 S | 4/1980 | Fadler et al. |
| 4,212,744 A | 7/1980 | Oota |
| D261,033 S | 9/1981 | Armbruster |
| D261,173 S | 10/1981 | Armbruster |
| 4,301,412 A | 11/1981 | Hill et al. |
| 4,439,526 A | 3/1984 | Columbus |
| 4,457,329 A | 7/1984 | Werley et al. |
| 4,466,740 A | 8/1984 | Kano et al. |
| 4,504,582 A | 3/1985 | Swann |
| 4,522,786 A | 6/1985 | Ebersole |
| D279,817 S | 7/1985 | Chen et al. |
| 4,599,315 A | 7/1986 | Teraski et al. |
| 4,612,873 A | 9/1986 | Eberle |
| 4,612,959 A | 9/1986 | Costello |
| D288,478 S | 2/1987 | Carlson et al. |
| 4,654,127 A | 3/1987 | Baker et al. |
| 4,673,657 A | 6/1987 | Christian |
| 4,683,195 A | 7/1987 | Mullis et al. |
| 4,683,202 A | 7/1987 | Mullis |
| D292,735 S | 11/1987 | Lovborg |
| 4,720,374 A | 1/1988 | Ramachandran |
| 4,798,693 A | 1/1989 | Mase et al. |
| 4,800,022 A | 1/1989 | Leonard |
| D302,294 S | 7/1989 | Hillman |
| 4,895,650 A | 1/1990 | Wang |
| 4,919,829 A | 4/1990 | Gates et al. |
| 4,921,809 A | 5/1990 | Shiff et al. |
| 4,946,562 A | 8/1990 | Guruswamy |
| 4,949,742 A | 8/1990 | Rando et al. |
| D310,413 S | 9/1990 | Bigler et al. |
| 4,963,498 A | 10/1990 | Hillman |
| 4,967,950 A | 11/1990 | Legg et al. |
| 4,978,502 A | 12/1990 | Dole et al. |
| 4,978,622 A | 12/1990 | Mishell et al. |
| 4,989,626 A | 2/1991 | Takagi et al. |
| 5,001,417 A | 3/1991 | Pumphrey et al. |
| 5,004,583 A | 4/1991 | Guruswamy et al. |
| 5,048,554 A | 9/1991 | Kremer |

(Continued)

FOREIGN PATENT DOCUMENTS

| | | |
|---|---|---|
| CA | 2294819 | 1/1999 |
| DE | 19929734 | 12/1999 |
| EP | 0766256 | 4/1997 |
| FR | 2672301 | 8/1992 |
| FR | 2795426 | 12/2000 |
| JP | 58212921 A | 12/1983 |
| WO | WO 88/06633 | 9/1988 |
| WO | WO 92/05443 | 4/1992 |
| WO | WO 98/00231 | 1/1998 |
| WO | WO 98/22625 | 5/1998 |

(Continued)

OTHER PUBLICATIONS

Brahmasandra et al., On-chip DNA detection in microfabricated separation systems, SPIE Conference on Microfuidic Devices and Systems, 1998, vol. 3515, pp. 242-251, Santa Clara, CA.
Handique et al., 2001, Mathematical modeling of drop mixing in a split-type microchannel, J. Micromech Microeng, 11:548-554.
International Search Report and Written Opinion dated Apr. 4, 2008 for PCT/US07/07513.
International Search Report and Written Opinion for PCT/US07/024022 dated Jan. 5, 2009.

(Continued)

*Primary Examiner* — Young J Kim

(74) *Attorney, Agent, or Firm* — Knobbe, Martens, Olson & Bear, LLP

(57) ABSTRACT

The technology described herein generally relates to microfluidic cartridges configured to amplify and detect polynucleotides extracted from multiple biological samples in parallel. The technology includes a microfluidic substrate, comprising: a plurality of sample lanes, wherein each of the plurality of sample lanes comprises a microfluidic network having, in fluid communication with one another: an inlet; a first valve and a second valve; a first channel leading from the inlet, via the first valve, to a reaction chamber; and a second channel leading from the reaction chamber, via the second valve, to a vent.

36 Claims, 52 Drawing Sheets

U.S. PATENT DOCUMENTS

| | | | |
|---|---|---|---|
| 5,053,199 A | 10/1991 | Keiser et al. |
| 5,060,823 A | 10/1991 | Perlman |
| 5,061,336 A | 10/1991 | Soane |
| 5,064,618 A | 11/1991 | Baker et al. |
| 5,071,531 A | 12/1991 | Soane |
| 5,091,328 A | 2/1992 | Miller |
| D324,426 S | 3/1992 | Fan et al. |
| 5,096,669 A | 3/1992 | Lauks et al. |
| 5,126,002 A | 6/1992 | Iwata et al. |
| 5,126,022 A | 6/1992 | Soane et al. |
| D328,135 S | 7/1992 | Fan et al. |
| D328,794 S | 8/1992 | Frenkel et al. |
| 5,135,627 A | 8/1992 | Soane |
| 5,135,872 A | 8/1992 | Pouletty et al. |
| 5,147,606 A | 9/1992 | Charlton et al. |
| 5,169,512 A | 12/1992 | Wiedenmann et al. |
| D333,522 S | 2/1993 | Gianino |
| 5,186,339 A | 2/1993 | Heissler |
| 5,192,507 A | 3/1993 | Taylor et al. |
| 5,208,163 A | 5/1993 | Charlton et al. |
| 5,223,226 A | 6/1993 | Wittmer et al. |
| D338,275 S | 8/1993 | Fischer et al. |
| 5,250,263 A | 10/1993 | Manz |
| 5,252,743 A | 10/1993 | Barrett et al. |
| 5,256,376 A | 10/1993 | Callan et al. |
| 5,275,787 A | 1/1994 | Yuguchi et al. |
| 5,282,950 A | 2/1994 | Dietze et al. |
| 5,296,375 A | 3/1994 | Kricka et al. |
| 5,304,477 A | 4/1994 | Nagoh et al. |
| 5,304,487 A | 4/1994 | Wilding et al. |
| D347,478 S | 5/1994 | Pinkney |
| 5,311,896 A | 5/1994 | Kaartinen et al. |
| 5,311,996 A | 5/1994 | Duffy et al. |
| 5,316,727 A | 5/1994 | Suzuki et al. |
| 5,327,038 A | 7/1994 | Culp |
| 5,339,486 A | 8/1994 | Persic, Jr. |
| D351,913 S | 10/1994 | Hieb et al. |
| 5,364,591 A | 11/1994 | Green et al. |
| 5,372,946 A | 12/1994 | Cusak et al. |
| 5,374,395 A | 12/1994 | Robinson |
| 5,389,339 A | 2/1995 | Petschek et al. |
| 5,401,465 A | 3/1995 | Smethers et al. |
| 5,411,708 A | 5/1995 | Moscetta et al. |
| 5,416,000 A | 5/1995 | Allen et al. |
| 5,422,271 A | 6/1995 | Chen et al. |
| 5,422,284 A | 6/1995 | Lau |
| 5,427,946 A | 6/1995 | Kricka et al. |
| 5,474,796 A | 12/1995 | Brennan |
| D366,116 S | 1/1996 | Biskupski |
| 5,486,335 A | 1/1996 | Wilding et al. |
| 5,494,639 A | 2/1996 | Grzegorzewski |
| 5,498,392 A | 3/1996 | Wilding et al. |
| 5,503,803 A | 4/1996 | Brown |
| 5,516,410 A | 5/1996 | Schneider et al. |
| 5,519,635 A | 5/1996 | Miyake et al. |
| 5,529,677 A | 6/1996 | Schneider et al. |
| 5,559,432 A | 9/1996 | Logue |
| 5,565,171 A | 10/1996 | Dovichi et al. |
| 5,569,364 A | 10/1996 | Hooper et al. |
| 5,578,818 A | 11/1996 | Kain et al. |
| 5,580,523 A | 12/1996 | Bard |
| 5,582,884 A | 12/1996 | Ball et al. |
| 5,585,069 A | 12/1996 | Zanucchi et al. |
| 5,585,089 A | 12/1996 | Queen et al. |
| 5,585,242 A | 12/1996 | Bouma et al. |
| 5,587,128 A | 12/1996 | Wilding et al. |
| 5,589,136 A | 12/1996 | Northrup et al. |
| 5,593,838 A | 1/1997 | Zanzucchi et al. |
| 5,595,708 A | 1/1997 | Berndt |
| 5,599,432 A | 2/1997 | Manz et al. |
| 5,599,503 A | 2/1997 | Manz et al. |
| 5,599,667 A | 2/1997 | Arnold, Jr. et al. |
| 5,601,727 A | 2/1997 | Bormann et al. |
| 5,603,351 A | 2/1997 | Cherukuri et al. |
| 5,605,662 A | 2/1997 | Heller et al. |
| D378,782 S | 4/1997 | LaBarbera et al. |
| 5,628,890 A | 5/1997 | Carter et al. |
| 5,630,920 A | 5/1997 | Friese et al. |
| 5,631,337 A | 5/1997 | Sassi et al. |
| 5,632,876 A | 5/1997 | Zanzucchi et al. |
| 5,632,957 A | 5/1997 | Heller et al. |
| 5,635,358 A | 6/1997 | Wilding et al. |
| 5,637,469 A | 6/1997 | Wilding et al. |
| 5,639,423 A | 6/1997 | Northrup et al. |
| 5,643,738 A | 7/1997 | Zanzucchi et al. |
| 5,646,039 A | 7/1997 | Northrup et al. |
| 5,647,994 A | 7/1997 | Tuunanen et al. |
| 5,651,839 A | 7/1997 | Rauf |
| 5,652,149 A | 7/1997 | Mileaf et al. |
| D382,346 S | 8/1997 | Buhler et al. |
| D382,647 S | 8/1997 | Staples et al. |
| 5,667,976 A | 9/1997 | Van Ness et al. |
| 5,671,303 A | 9/1997 | Shieh et al. |
| 5,674,394 A | 10/1997 | Whitmore |
| 5,674,742 A | 10/1997 | Northrup et al. |
| 5,681,484 A | 10/1997 | Zanzucchi et al. |
| 5,681,529 A | 10/1997 | Taguchi et al. |
| 5,683,657 A | 11/1997 | Mian |
| 5,699,157 A | 12/1997 | Parce |
| 5,700,637 A | 12/1997 | Southern |
| 5,705,813 A | 1/1998 | Apffel et al. |
| 5,726,026 A | 3/1998 | Wilding et al. |
| 5,726,404 A | 3/1998 | Brody |
| 5,726,944 A | 3/1998 | Taft et al. |
| 5,731,212 A | 3/1998 | Gavin et al. |
| 5,744,366 A | 4/1998 | Kricka et al. |
| 5,747,666 A | 5/1998 | Willis |
| 5,750,015 A | 5/1998 | Soane et al. |
| 5,755,942 A | 5/1998 | Zanzucchi et al. |
| 5,763,262 A | 6/1998 | Wong et al. |
| 5,770,029 A | 6/1998 | Nelson et al. |
| 5,770,388 A | 6/1998 | Vorpahl |
| 5,772,966 A | 6/1998 | Maracas et al. |
| 5,779,868 A | 7/1998 | Parce et al. |
| 5,787,032 A | 7/1998 | Heller et al. |
| 5,788,814 A | 8/1998 | Sun et al. |
| 5,800,690 A | 9/1998 | Chow et al. |
| D399,959 S | 10/1998 | Prokop et al. |
| 5,827,481 A | 10/1998 | Bente et al. |
| 5,842,106 A | 11/1998 | Thaler et al. |
| 5,842,787 A | 12/1998 | Kopf-Sill et al. |
| 5,846,396 A | 12/1998 | Zanzucchi et al. |
| 5,849,208 A | 12/1998 | Hayes et al. |
| 5,849,486 A | 12/1998 | Heller et al. |
| 5,849,489 A | 12/1998 | Heller |
| 5,849,598 A | 12/1998 | Wilson et al. |
| 5,852,495 A | 12/1998 | Parce |
| 5,856,174 A | 1/1999 | Lipshutz et al. |
| 5,858,188 A | 1/1999 | Soane et al. |
| 5,863,502 A | 1/1999 | Southgate et al. |
| 5,863,708 A | 1/1999 | Zanzucchi et al. |
| 5,863,801 A | 1/1999 | Southgate et al. |
| 5,866,345 A | 2/1999 | Wilding et al. |
| 5,869,004 A | 2/1999 | Parce et al. |
| 5,872,010 A | 2/1999 | Karger et al. |
| 5,874,046 A | 2/1999 | Megerle |
| 5,876,675 A | 3/1999 | Kennedy |
| 5,880,071 A | 3/1999 | Parce et al. |
| 5,882,465 A | 3/1999 | McReynolds |
| 5,883,211 A | 3/1999 | Sassi et al. |
| 5,885,432 A | 3/1999 | Hooper et al. |
| 5,885,470 A | 3/1999 | Parce et al. |
| 5,895,762 A | 4/1999 | Greenfield et al. |
| 5,900,130 A | 5/1999 | Benregnu et al. |
| 5,912,124 A | 6/1999 | Kumar |
| 5,912,134 A | 6/1999 | Shartle |
| 5,916,522 A | 6/1999 | Boyd et al. |
| 5,916,776 A | 6/1999 | Kumar |
| 5,919,711 A | 7/1999 | Boyd et al. |
| 5,922,591 A | 7/1999 | Anderson et al. |
| 5,927,547 A | 7/1999 | Papen et al. |
| 5,928,880 A | 7/1999 | Wilding et al. |
| 5,929,208 A | 7/1999 | Heller et al. |
| D413,391 S | 8/1999 | Lapeus et al. |
| 5,932,799 A | 8/1999 | Moles |
| 5,935,401 A | 8/1999 | Amigo |
| 5,939,291 A | 8/1999 | Loewy et al. |

| | | | | | | |
|---|---|---|---|---|---|---|
| 5,942,443 | A | 8/1999 | Parce et al. | 6,287,254 B1 | 9/2001 | Dodds |
| D413,677 | S | 9/1999 | Dumitrescu et al. | 6,291,248 B1 | 9/2001 | Haj-Ahmad |
| 5,948,227 | A | 9/1999 | Dubrow | 6,294,063 B1 | 9/2001 | Becker et al. |
| 5,955,028 | A | 9/1999 | Chow | 6,302,134 B1 | 10/2001 | Kellogg et al. |
| 5,955,029 | A | 9/1999 | Wilding et al. | 6,302,304 B1 | 10/2001 | Spencer |
| 5,957,579 | A | 9/1999 | Kopf-Sill et al. | 6,306,273 B1 | 10/2001 | Wainright et al. |
| 5,958,203 | A | 9/1999 | Parce et al. | 6,319,469 B1 | 11/2001 | Mian et al. |
| 5,958,694 | A | 9/1999 | Nikiforov | 6,326,211 B1 | 12/2001 | Anderson et al. |
| 5,959,221 | A | 9/1999 | Boyd et al. | 6,337,435 B1 | 1/2002 | Chu et al. |
| 5,959,291 | A | 9/1999 | Jensen | 6,368,871 B1 | 4/2002 | Christel et al. |
| 5,964,995 | A | 10/1999 | Nikiforov et al. | 6,370,206 B1 | 4/2002 | Schenk |
| 5,964,997 | A | 10/1999 | McBride | 6,375,901 B1 | 4/2002 | Robotti et al. |
| 5,965,001 | A | 10/1999 | Chow et al. | 6,379,929 B1 | 4/2002 | Burns et al. |
| 5,965,410 | A | 10/1999 | Chow et al. | 6,379,974 B1 | 4/2002 | Parce et al. |
| 5,965,886 | A | 10/1999 | Sauer et al. | 6,391,541 B1 | 5/2002 | Petersen et al. |
| 5,972,187 | A | 10/1999 | Parce et al. | 6,391,623 B1 | 5/2002 | Besemer et al. |
| D417,009 | S | 11/1999 | Boyd | 6,395,161 B1 | 5/2002 | Schneider et al. |
| 5,976,336 | A | 11/1999 | Dubrow et al. | 6,398,956 B1 | 6/2002 | Coville et al. |
| 5,980,704 | A | 11/1999 | Cherukuri et al. | 6,399,025 B1 | 6/2002 | Chow |
| 5,980,719 | A | 11/1999 | Cherukuri et al. | 6,399,389 B1 | 6/2002 | Parce et al. |
| 5,981,735 | A | 11/1999 | Thatcher et al. | 6,403,338 B1 | 6/2002 | Knapp et al. |
| 5,989,402 | A | 11/1999 | Chow et al. | 6,408,878 B2 * | 6/2002 | Unger et al. .................. 137/597 |
| 5,992,820 | A | 11/1999 | Fare et al. | D461,906 S | 8/2002 | Pham |
| 5,993,611 | A | 11/1999 | Moroney, III et al. | 6,428,987 B2 | 8/2002 | Franzen |
| 5,993,750 | A | 11/1999 | Ghosh et al. | 6,432,366 B2 | 8/2002 | Ruediger et al. |
| 5,997,708 | A | 12/1999 | Craig | 6,440,725 B1 | 8/2002 | Pourahmadi et al. |
| 6,001,231 | A | 12/1999 | Kopf-Sill | 6,444,461 B1 | 9/2002 | Knapp et al. |
| 6,001,307 | A | 12/1999 | Naka et al. | 6,448,064 B1 | 9/2002 | Vo-Dinh et al. |
| 6,004,515 | A | 12/1999 | Parce et al. | 6,453,928 B1 | 9/2002 | Kaplan et al. |
| 6,007,690 | A | 12/1999 | Nelson et al. | D467,348 S | 12/2002 | McMichael et al. |
| 6,010,627 | A | 1/2000 | Hood, III | D467,349 S | 12/2002 | Niedbala et al. |
| 6,012,902 | A | 1/2000 | Parce | 6,498,497 B1 | 12/2002 | Chow et al. |
| D420,747 | S | 2/2000 | Dumitrescu et al. | 6,500,390 B1 | 12/2002 | Boulton et al. |
| D421,130 | S | 2/2000 | Cohen et al. | D468,437 S | 1/2003 | McMenamy et al. |
| 6,024,920 | A | 2/2000 | Cunanan | 6,509,193 B1 | 1/2003 | Tajima |
| D421,653 | S | 3/2000 | Purcell | D470,595 S | 2/2003 | Crisanti et al. |
| 6,033,546 | A | 3/2000 | Ramsey | 6,517,783 B2 | 2/2003 | Horner et al. |
| 6,043,080 | A | 3/2000 | Lipshutz et al. | 6,520,197 B2 | 2/2003 | Deshmukh et al. |
| 6,046,056 | A | 4/2000 | Parce et al. | 6,521,188 B1 | 2/2003 | Webster |
| 6,048,734 | A | 4/2000 | Burns et al. | D472,324 S | 3/2003 | Rumore et al. |
| 6,054,034 | A | 4/2000 | Soane et al. | 6,534,295 B2 | 3/2003 | Tai et al. |
| 6,054,277 | A | 4/2000 | Furcht et al. | 6,544,734 B1 | 4/2003 | Briscoe et al. |
| 6,056,860 | A | 5/2000 | Amigo et al. | D474,279 S | 5/2003 | Mayer et al. |
| 6,057,149 | A | 5/2000 | Burns et al. | D474,280 S | 5/2003 | Niedbala et al. |
| 6,063,341 | A | 5/2000 | Fassbind et al. | 6,572,830 B1 | 6/2003 | Burdon et al. |
| 6,063,589 | A | 5/2000 | Kellogg et al. | 6,575,188 B2 | 6/2003 | Parunak |
| 6,071,478 | A | 6/2000 | Chow | 6,576,459 B2 | 6/2003 | Miles et al. |
| D428,497 | S | 7/2000 | Lapeus et al. | 6,579,453 B1 | 6/2003 | Bächler et al. |
| 6,086,740 | A | 7/2000 | Kennedy | 6,597,450 B1 | 7/2003 | Andrews et al. |
| 6,102,897 | A | 8/2000 | Lang | 6,602,474 B1 | 8/2003 | Tajima |
| 6,106,685 | A | 8/2000 | McBride et al. | D480,814 S | 10/2003 | Lafferty et al. |
| 6,123,205 | A | 9/2000 | Dumitrescu et al. | D482,796 S | 11/2003 | Oyama et al. |
| 6,130,098 | A | 10/2000 | Handique et al. | 6,664,104 B2 | 12/2003 | Pourahmadi et al. |
| 6,132,580 | A | 10/2000 | Mathies et al. | 6,670,153 B2 | 12/2003 | Stern |
| 6,132,684 | A | 10/2000 | Marino | D484,989 S | 1/2004 | Gebrian |
| 6,133,436 | A | 10/2000 | Koster et al. | 6,692,700 B2 | 2/2004 | Handique |
| D433,759 | S | 11/2000 | Mathis et al. | 6,706,519 B1 | 3/2004 | Kellogg et al. |
| 6,143,250 | A | 11/2000 | Tajima | 6,734,401 B2 | 5/2004 | Bedingham et al. |
| 6,156,199 | A | 12/2000 | Zuk, Jr. | D491,272 S | 6/2004 | Alden et al. |
| 6,168,948 | B1 | 1/2001 | Anderson et al. | D491,273 S | 6/2004 | Biegler et al. |
| 6,171,850 | B1 | 1/2001 | Nagle et al. | D491,276 S | 6/2004 | Langille |
| 6,174,675 | B1 | 1/2001 | Chow et al. | 6,766,817 B2 | 7/2004 | da Silva |
| D438,311 | S | 2/2001 | Yamanishi et al. | 6,783,962 B1 | 8/2004 | Olander et al. |
| D438,632 | S | 3/2001 | Miller | D495,805 S | 9/2004 | Lea et al. |
| D438,633 | S | 3/2001 | Miller | 6,790,330 B2 | 9/2004 | Gascoyne et al. |
| 6,197,595 | B1 | 3/2001 | Anderson et al. | 6,819,027 B2 | 11/2004 | Saraf |
| 6,211,989 | B1 | 4/2001 | Wulf et al. | D499,813 S | 12/2004 | Wu |
| 6,221,600 | B1 | 4/2001 | MacLeod et al. | D500,142 S | 12/2004 | Crisanti et al. |
| 6,235,175 | B1 | 5/2001 | Dubrow et al. | 6,852,287 B2 | 2/2005 | Ganesan |
| 6,235,313 | B1 | 5/2001 | Mathiowitz et al. | 6,859,698 B2 | 2/2005 | Schmeisser |
| 6,236,581 | B1 | 5/2001 | Lines et al. | 6,861,035 B2 | 3/2005 | Pham et al. |
| 6,251,343 | B1 | 6/2001 | Dubrow et al. | 6,878,540 B2 | 4/2005 | Pourahmadi et al. |
| 6,254,826 | B1 | 7/2001 | Acosta et al. | 6,878,755 B2 | 4/2005 | Singh et al. |
| 6,259,635 | B1 | 7/2001 | Torelli et al. | 6,884,628 B2 | 4/2005 | Hubbell et al. |
| 6,261,431 | B1 | 7/2001 | Mathies et al. | 6,887,693 B2 | 5/2005 | McMillan et al. |
| D446,306 | S | 8/2001 | Ochi et al. | 6,893,879 B2 | 5/2005 | Petersen et al. |
| 6,271,021 | B1 | 8/2001 | Burns et al. | 6,905,612 B2 | 6/2005 | Dorian et al. |
| 6,274,089 | B1 | 8/2001 | Chow et al. | 6,911,183 B1 | 6/2005 | Handique et al. |
| 6,281,008 | B1 | 8/2001 | Komai et al. | 6,914,137 B2 | 7/2005 | Baker |

| | | |
|---|---|---|
| 6,918,404 B2 | 7/2005 | da Silva |
| D508,999 S | 8/2005 | Fanning et al. |
| 6,942,771 B1 | 9/2005 | Kayyem |
| 6,958,392 B2 | 10/2005 | Fomovskaia et al. |
| D512,155 S | 11/2005 | Matsumoto |
| 6,964,747 B2 | 11/2005 | Banerjee et al. |
| 6,984,516 B2 | 1/2006 | Briscoe et al. |
| D515,707 S | 2/2006 | Sinohara et al. |
| D516,221 S | 2/2006 | Wohlstadter et al. |
| 7,004,184 B2 | 2/2006 | Handique et al. |
| D517,554 S | 3/2006 | Yanagisawa et al. |
| 7,010,391 B2 | 3/2006 | Handique et al. |
| D523,153 S | 6/2006 | Akashi et al. |
| 7,066,586 B2 | 6/2006 | da Silva |
| D528,215 S | 9/2006 | Malmsater |
| D531,321 S | 10/2006 | Godfrey et al. |
| 7,118,910 B2 | 10/2006 | Unger et al. |
| D534,280 S | 12/2006 | Gomm et al. |
| 7,148,043 B2 | 12/2006 | Kordunsky et al. |
| D535,403 S | 1/2007 | Isozaki et al. |
| 7,169,618 B2 | 1/2007 | Skould |
| D537,951 S | 3/2007 | Okamoto et al. |
| D538,436 S | 3/2007 | Patadia et al. |
| 7,192,557 B2 | 3/2007 | Wu et al. |
| 7,235,406 B1 | 6/2007 | Woudenberg et al. |
| D548,841 S | 8/2007 | Brownell et al. |
| D549,827 S | 8/2007 | Maeno et al. |
| 7,270,786 B2 | 9/2007 | Parunak et al. |
| D554,069 S | 10/2007 | Bolotin et al. |
| D554,070 S | 10/2007 | Bolotin et al. |
| D556,914 S | 12/2007 | Okamoto et al. |
| D559,995 S | 1/2008 | Handique et al. |
| 7,323,140 B2 | 1/2008 | Handique et al. |
| 7,332,130 B2 | 2/2008 | Handique |
| 7,338,760 B2 | 3/2008 | Gong et al. |
| D566,291 S | 4/2008 | Parunak et al. |
| D569,526 S | 5/2008 | Duffy et al. |
| 7,374,949 B2 | 5/2008 | Kuriger |
| 7,390,460 B2 | 6/2008 | Osawa et al. |
| 7,476,313 B2 | 1/2009 | Siddiqi |
| 7,494,770 B2 | 2/2009 | Wilding et al. |
| 7,553,671 B2 | 6/2009 | Sinclair et al. |
| D596,312 S | 7/2009 | Giraud et al. |
| 7,604,938 B2 | 10/2009 | Takahashi et al. |
| 7,704,735 B2 * | 4/2010 | Facer et al. ............... 435/303.1 |
| D618,820 S | 6/2010 | Wilson et al. |
| D621,060 S | 8/2010 | Handique |
| 2001/0023848 A1 | 9/2001 | Gjerde et al. |
| 2001/0038450 A1 | 11/2001 | McCaffrey et al. |
| 2001/0046702 A1 | 11/2001 | Schmebri |
| 2001/0055765 A1 | 12/2001 | O'Keefe et al. |
| 2002/0001848 A1 | 1/2002 | Bedingham et al. |
| 2002/0009015 A1 | 1/2002 | Laugharn, Jr. et al. |
| 2002/0015667 A1 | 2/2002 | Chow |
| 2002/0021983 A1 | 2/2002 | Comte et al. |
| 2002/0037499 A1 | 3/2002 | Quake et al. |
| 2002/0039783 A1 | 4/2002 | McMillan et al. |
| 2002/0053399 A1 * | 5/2002 | Soane et al. ............... 156/292 |
| 2002/0054835 A1 | 5/2002 | Robotti et al. |
| 2002/0055167 A1 | 5/2002 | Pourahmadi et al. |
| 2002/0060156 A1 | 5/2002 | Mathies et al. |
| 2002/0068357 A1 | 6/2002 | Mathies et al. |
| 2002/0141903 A1 | 10/2002 | Parunak et al. |
| 2002/0142471 A1 | 10/2002 | Handique et al. |
| 2002/0143297 A1 | 10/2002 | Francavilla et al. |
| 2002/0143437 A1 | 10/2002 | Handique et al. |
| 2002/0169518 A1 | 11/2002 | Luoma et al. |
| 2002/0187557 A1 * | 12/2002 | Hobbs et al. ............... 436/161 |
| 2003/0019522 A1 | 1/2003 | Parunak |
| 2003/0049833 A1 | 3/2003 | Chen et al. |
| 2003/0070677 A1 | 4/2003 | Handique et al. |
| 2003/0073106 A1 | 4/2003 | Johansen et al. |
| 2003/0083686 A1 | 5/2003 | Freeman et al. |
| 2003/0087300 A1 | 5/2003 | Knapp et al. |
| 2003/0127327 A1 | 7/2003 | Kurnik |
| 2003/0136679 A1 | 7/2003 | Bohn et al. |
| 2003/0186295 A1 | 10/2003 | Colin et al. |
| 2003/0199081 A1 | 10/2003 | Wilding et al. |
| 2003/0211517 A1 | 11/2003 | Carulli et al. |

| | | |
|---|---|---|
| 2004/0014238 A1 | 1/2004 | Krug et al. |
| 2004/0063217 A1 | 4/2004 | Webster et al. |
| 2004/0072278 A1 * | 4/2004 | Chou et al. .................. 435/29 |
| 2004/0072375 A1 | 4/2004 | Gjerde et al. |
| 2004/0151629 A1 | 8/2004 | Pease et al. |
| 2004/0157220 A1 | 8/2004 | Kurnool et al. |
| 2004/0161788 A1 | 8/2004 | Chen et al. |
| 2004/0189311 A1 | 9/2004 | Glezer et al. |
| 2004/0209354 A1 | 10/2004 | Mathies et al. |
| 2004/0219070 A1 | 11/2004 | Handique |
| 2004/0240097 A1 | 12/2004 | Evans |
| 2005/0048540 A1 | 3/2005 | Inami et al. |
| 2005/0084424 A1 | 4/2005 | Ganesan et al. |
| 2005/0106066 A1 | 5/2005 | Saltsman et al. |
| 2005/0152808 A1 | 7/2005 | Ganesan |
| 2005/0202504 A1 | 9/2005 | Anderson et al. |
| 2005/0208676 A1 | 9/2005 | Kahatt |
| 2005/0220675 A1 | 10/2005 | Reed et al. |
| 2005/0227269 A1 | 10/2005 | Lloyd et al. |
| 2005/0233370 A1 | 10/2005 | Ammann et al. |
| 2005/0272079 A1 | 12/2005 | Burns et al. |
| 2006/0041058 A1 | 2/2006 | Yin et al. |
| 2006/0057039 A1 | 3/2006 | Morse et al. |
| 2006/0057629 A1 | 3/2006 | Kim |
| 2006/0094108 A1 * | 5/2006 | Yoder et al. ............... 435/287.2 |
| 2006/0133965 A1 | 6/2006 | Tajima et al. |
| 2006/0134790 A1 | 6/2006 | Tanaka et al. |
| 2006/0148063 A1 | 7/2006 | Fauzzi et al. |
| 2006/0165558 A1 | 7/2006 | Witty et al. |
| 2006/0166233 A1 | 7/2006 | Wu et al. |
| 2006/0177376 A1 | 8/2006 | Tomalia et al. |
| 2006/0183216 A1 | 8/2006 | Handique |
| 2006/0207944 A1 | 9/2006 | Siddiqi |
| 2007/0004028 A1 | 1/2007 | Lair et al. |
| 2007/0009386 A1 | 1/2007 | Padmanabhan et al. |
| 2007/0020699 A1 | 1/2007 | Carpenter et al. |
| 2007/0026421 A1 | 2/2007 | Sundberg et al. |
| 2007/0042441 A1 | 2/2007 | Masters et al. |
| 2007/0092901 A1 | 4/2007 | Ligler et al. |
| 2007/0098600 A1 | 5/2007 | Kayyem et al. |
| 2007/0104617 A1 | 5/2007 | Coulling et al. |
| 2007/0178607 A1 | 8/2007 | Prober et al. |
| 2007/0184547 A1 | 8/2007 | Handique et al. |
| 2007/0215554 A1 | 9/2007 | Kreuwel et al. |
| 2007/0218459 A1 | 9/2007 | Miller et al. |
| 2007/0231213 A1 | 10/2007 | Prabhu et al. |
| 2007/0269861 A1 | 11/2007 | Williams et al. |
| 2007/0292941 A1 | 12/2007 | Handique et al. |
| 2008/0050804 A1 | 2/2008 | Handique et al. |
| 2008/0075634 A1 | 3/2008 | Herchenbach et al. |
| 2008/0095673 A1 | 4/2008 | Xu |
| 2008/0118987 A1 | 5/2008 | Eastwood et al. |
| 2008/0124723 A1 | 5/2008 | Dale et al. |
| 2008/0149840 A1 | 6/2008 | Handique et al. |
| 2008/0160601 A1 | 7/2008 | Handique |
| 2008/0182301 A1 | 7/2008 | Handique et al. |
| 2008/0192254 A1 | 8/2008 | Kim et al. |
| 2008/0247914 A1 | 10/2008 | Edens et al. |
| 2008/0262213 A1 | 10/2008 | Wu et al. |
| 2009/0047713 A1 | 2/2009 | Handique |
| 2009/0129978 A1 | 5/2009 | Wilson et al. |
| 2009/0130719 A1 | 5/2009 | Handique |
| 2009/0130745 A1 | 5/2009 | Williams et al. |
| 2009/0131650 A1 | 5/2009 | Brahmasandra et al. |
| 2009/0134069 A1 | 5/2009 | Handique |
| 2009/0136385 A1 | 5/2009 | Handique et al. |
| 2009/0136386 A1 | 5/2009 | Duffy et al. |
| 2009/0155123 A1 | 6/2009 | Williams et al. |
| 2009/0223925 A1 | 9/2009 | Morse et al. |
| 2010/0009351 A1 | 1/2010 | Brahmasandra et al. |

FOREIGN PATENT DOCUMENTS

| | | |
|---|---|---|
| WO | WO 98/53311 | 11/1998 |
| WO | WO 99/09042 | 2/1999 |
| WO | WO 99/12016 | 3/1999 |
| WO | WO 99/33559 | 7/1999 |
| WO | WO 01/05510 | 1/2001 |
| WO | WO 01/14931 | 3/2001 |
| WO | WO 01/27614 | 4/2001 |

| WO | WO 01/28684 | 4/2001 |
| WO | WO 01/41931 | 6/2001 |
| WO | WO 01/54813 | 8/2001 |
| WO | WO 01/89681 | 11/2001 |
| WO | WO 02/078845 | 10/2002 |
| WO | WO 03/012325 | 2/2003 |
| WO | WO 03/012406 | 2/2003 |
| WO | WO 03/055605 | 7/2003 |
| WO | WO 2004/007081 | 1/2004 |
| WO | WO 2004/074848 | 9/2004 |
| WO | WO 2005/011867 | 2/2005 |
| WO | WO 2005/108620 | 11/2005 |
| WO | WO 2006/079082 | 7/2006 |
| WO | WO 2008/060604 | 5/2008 |
| WO | WO 2009/012185 | 1/2009 |

OTHER PUBLICATIONS

Bollet, C. et al., "A simple method for the isolation of chromosomal DNA from Gram positive or acid-fast bacteria", Nucleic Acids Research, vol. 19, No. 8 (1991), p. 1955.
Breadmore, M.C. et al., "Microchip-Based Purification of DNA from Biological Samples", Anal. Chem., vol. 75 (2003), pp. 1880-1886.
Brody, et al., Diffusion-Based Extraction in a Microfabricated Device, Sensors and Actuators Elsevier, 1997, vol. A58, No. 1, pp. 13-18.
Burns et al., "An Integrated Nanoliter DNA Analysis Device", Science 282:484-487 (1998).
Carlen et al., "Paraffin Actuated Surface Micromachined Valve," in IEEE MEMS 2000 Conference, p. 381-385, Miyazaki, Japan, Jan. 2000.
Chung, Y. et al., "Microfluidic chip for high efficiency DNA extraction", Miniaturisation for Chemistry, Biology & Bioengineering, vol. 4, No. 2 (Apr. 2004), pp. 141-147.
Handique K., et al., On-Chip Thermopneumatic Pressure for Discrete Drop Pumping, Analytical Chemistry, American Chemical Society, Apr. 15, 2001, vol. 73, No. 8, 1831-1838.
Handique, K. et al, "Microflidic flow control using selective hydrophobic patterning", SPIE, vol. 3224, pp. 185-194 (1997).
Handique, K. et al., "Nanoliter-volume discrete drop injection and pumping in microfabricated chemical analysis systems", Solid-State Sensor and Actuator Workshop (Hilton Head, South Carolina, Jun. 8-11, 1998) pp. 346-349.
Handique, K. et al., "Mathematical Modeling of Drop Mixing in a Slit-Type Micochannel", J. Micromech. Microeng., 11:548-554 (2001).
Handique, K. et al., "Nanoliter Liquid Metering in Microchannels Using Hydrophobic Patterns", Anal. Chem., 72:4100-4109 (2000).
He, et al., Microfabricated Filters for Microfludic Analytical Systems, Analytical Chemistry, American Chemical Society, 1999, vol. 71, No. 7, pp. 1464-1468.
Ibrahim, et al., Real-Time Microchip PCR for Detecting Single-Base Differences in Viral and Human DNA, Analytical Chemistry, American Chemical Society, 1998, vol. 70, No. 9, pp. 2013-2017.
Khandurina, et al., Microfabricated Porous Membrane Structure for Sample Concentraction and Electrophoretic Analysis, Analytical Chemistry American Chemical Society, 1999, vol. 71, No. 9, pp. 1815-1819.
Kopp, et al., Chemical Amplification: Continuous-Flow PCR on a Chip, www.sciencemag.org, 1998, vol. 280, pp. 1046-1048.
Kutter, et al., Solid Phase Extraction on Microfludic Devices, J. Microcolumn Separations, John Wiley & Sons, Inc., 2000, vol. 12, No. 2, pp. 93-97.
Lagally, et al., Single-Molecule DNA Amplification and Analysis in an Integrated Microfluidic Device, Analytical Chemistry, American Chemical Society, 2001, vol. 73, No. 3 pp. 565-570.
Livache, T. et al., "Polypyrrole DNA chip on a Silicon Device: Example of Hepatitis C Virus Genotyping", Analytical Biochemistry, vol. 255 (1998), pp. 188-194.
Northrup, et al., A Miniature Analytical Instrument for Nucleic Acids Based on Micromachined Silicon Reaction Chambers, Analytical Chemistry, American Chemical Society, 1998, vol. 70, No. 5, pp. 918-922.
Oleschuk, et al., Trapping of Bead-Based Reagents within Microfluidic Systems,: On-Chip Solid-Phase Extraction and Electrochromatography, Analytical Chemistry, American Chemical Society, 2000, vol. 72, No. 3, pp. 585-590.
Orchid BioSciences, Inc., www.orchid.com, Jul. 6, 2001.
Roche, et al. "Ectodermal commitment of insulin-producing cells derived from mouse embryonic stem cells" Faseb J (2005) 19: 1341-1343.
Ross, et al., Analysis of DNA Fragments from Conventional and Microfabricated PCR Devices Using Delayed Extraction MALDI-TOF Mass Spectrometry, Analytical Chemistry, American Chemical Society, 1998, vol. 70, No. 10, pp. 2067-2073.
Shoffner, M. A. et al., Chip PCR.I. Surface Passivation of Microfabricated Silicon-Glass Chips for PCR, Nucleic Acids Research, Oxford University Press, 1996, vol. 24, No. 2, 375-379.
Smith, K. et al., "Comparison of Commercial DNA Extraction Kits for Extraction of Bacterial Genomic DNA from Whole-Blood Samples", Journal of Clinical Microbiology, vol. 41, No. 6 (Jun. 2003), pp. 2440-2443.
Waters, et al., Microchip Device for Cell Lysis, Multiplex PCR Amplification, and Electrophoretic Sizing, Analytical Chemistry, American Chemical Society, 1998, vol. 70, No. 1, pp. 158-162.
Weigl, et al., Microfluidic Diffusion-Based Separation and Detection, www.sciencemag.org, 1999, vol. 283, pp. 346-347.
Yoza, Brandon et al., DNA extraction using bacterial magnetic particles modified with hyperbranched polyamidoamine dendrimer, Mar. 20, 2003, vol. 101, No. 3, 219-228.
Yoza, et al., "Fully Automated DNA Extraction fro Blood Using Magnetic Particles Modified with a Hyperbranched Polyamidomine Dendrimer", Journal of Bioscience and Bioengineering, 95(1):21-26, 2003.

* cited by examiner

Capillary action of controlled volume of wax causes it to fill up the Wax up to the right interface without blocking the liquid flowable microchannel

MICROFLUIDIC CARTRIDGE

CLAIM OF PRIORITY

This application is a continuation-in-part of U.S. patent application Ser. No. 12/173,023 and U.S. patent application Ser. No. 12/218,498, both filed on Jul. 14, 2008, which claim benefit of priority to U.S. provisional patent application Ser. No. 60/959,437, filed Jul. 13, 2007 all of which are incorporated herein by reference in their entirety. This application is also a continuation-in-part of U.S. utility application Ser. No. 11/985,577, filed Nov. 14, 2007, through which benefit of priority is claimed to U.S. provisional patent application Ser. No. 60/859,284, filed Nov. 14, 2006, both of which are incorporated herein by reference in their entirety. This application also claims benefit of priority to U.S. design patent application Ser. No. 29/308,920, filed Jul. 14, 2008, and incorporated herein by reference in its entirety.

TECHNICAL FIELD

The technology described herein generally relates to microfluidic cartridges. The technology more particularly relates to microfluidic cartridges that are configured to carry out PCR on nucleotides of interest, particularly from multiple biological samples in parallel, within microfluidic channels, and permit detection of those nucleotides.

BACKGROUND

The medical diagnostics industry is a critical element of today's healthcare infrastructure. At present, however, diagnostic analyses no matter how routine have become a bottleneck in patient care. There are several reasons for this. First, many diagnostic analyses can only be done with highly specialist equipment that is both expensive and only operable by trained clinicians. Such equipment is found in only a few locations—often just one in any given urban area. This means that most hospitals are required to send out samples for analyses to these locations, thereby incurring shipping costs and transportation delays, and possibly even sample loss or mishandling. Second, the equipment in question is typically not available 'on-demand' but instead runs in batches, thereby delaying the processing time for many samples because they must wait for a machine to fill up before they can be run.

Understanding that sample flow breaks down into several key steps, it would be desirable to consider ways to automate as many of these as possible. For example, a biological sample, once extracted from a patient, must be put in a form suitable for a processing regime that typically involves using PCR to amplify a vector of interest. Once amplified, the presence or absence of a nucleotide of interest from the sample needs to be determined unambiguously. Preparing samples for PCR is currently a time-consuming and labor intensive step, though not one requiring specialist skills, and could usefully be automated. By contrast, steps such as PCR and nucleotide detection have customarily only been within the compass of specially trained individuals having access to specialist equipment.

There is a need for a method and apparatus of carrying out sample preparation on samples in parallel, followed by PCR and detection on the prepared biological samples, and preferably with high throughput. The PCR should be capable of being carried out by someone requiring minimal training, and should be fast.

The discussion of the background herein is included to explain the context of the inventions described herein. This is not to be taken as an admission that any of the material referred to was published, known, or part of the common general knowledge as at the priority date of any of the claims.

Throughout the description and claims of the specification the word "comprise" and variations thereof, such as "comprising" and "comprises", is not intended to exclude other additives, components, integers or steps.

SUMMARY

The present technology includes a microfluidic substrate, comprising: a plurality of sample lanes, wherein each of the plurality of sample lanes comprises a microfluidic network having, in fluid communication with one another: an inlet; a first valve and a second valve; a first channel leading from the inlet, via the first valve, to a reaction chamber; and a second channel leading from the reaction chamber, via the second valve, to a vent. The present technology further includes a microfluidic cartridge comprising a microfluidic substrate having the aforementioned features.

The technology further includes a microfluidic cartridge, consisting of: a substrate having an upper side and an opposed lower side, wherein the substrate comprises a plurality of microfluidic networks arranged into a plurality of sample lanes; a laminate attached to the lower side; and a label, attached to the upper side. The cartridge can be further configured such that each lane of the plurality of lanes comprises a microfluidic network having, in fluid communication with one another: an inlet; a first valve and a second valve; a first channel leading from the inlet, via the first valve, to a reaction chamber; and a second channel leading from the reaction chamber, via the second valve, to a vent.

The technology further includes a method of carrying out PCR independently on a plurality of polynucleotide-containing samples, the method comprising: introducing the plurality of samples into a microfluidic cartridge, wherein the cartridge has a plurality of PCR reaction chambers configured to permit thermal cycling of the plurality of samples independently of one another; moving the plurality of samples independently of one another into the respective plurality of PCR reaction chambers; isolating the plurality of PCR reaction chambers; and amplifying polynucleotides contained with the plurality of samples, by application of successive heating and cooling cycles independently to the PCR reaction chambers. In certain implementations, PCR is carried out simultaneously on two or more of the plurality of samples.

BRIEF DESCRIPTION OF THE DRAWINGS

FIG. 5A additionally shows an exemplary valve in an open state, and the valve in a closed state.

DETAILED DESCRIPTION

The present technology includes microfluidic cartridges that are configured to carry out PCR on multiple PCR-ready nucleic acid containing samples. The PCR-ready samples have typically been prepared by other devices, or components of an apparatus that accommodates the microfluidic cartridge during use, and introduced into the microfluidic cartridge prior to initiation of PCR.

The microfluidic cartridges described herein are particularly effective for high throughput PCR applications because, for example, the small volumes of sample that are involved permit rapid heating and cooling cycles, and also mean that the PCR can be carried out on all of the samples in parallel in a relatively small space, thereby facilitating real-time analysis of multiple samples on a benchtop in a clinical setting.

Nucleic acid testing (NAT) as used herein is a general term that encompasses both DNA (deoxyribonucleic acid) and RNA (ribonucleic acid) testing. Exemplary protocols that are specific to RNA and to DNA are described herein. It is to be understood that generalized descriptions where not specific to RNA or to DNA either apply to each equally or can be readily adapted to either with minor variations of the description herein as amenable to one of ordinary skill in the art. The terms nucleic acid and polynucleotide are used interchangeably herein.

Where used herein, the term "module" should be taken to mean an assembly of components, each of which may have separate, distinct and/or independent functions, but which are configured to operate together to produce a desired result or results. It is not required that every component within a module be directly connected or in direct communication with every other. Furthermore, connectivity amongst the various components may be achieved with the aid of a component, such as a processor, that is external to the module.

Figure 1:
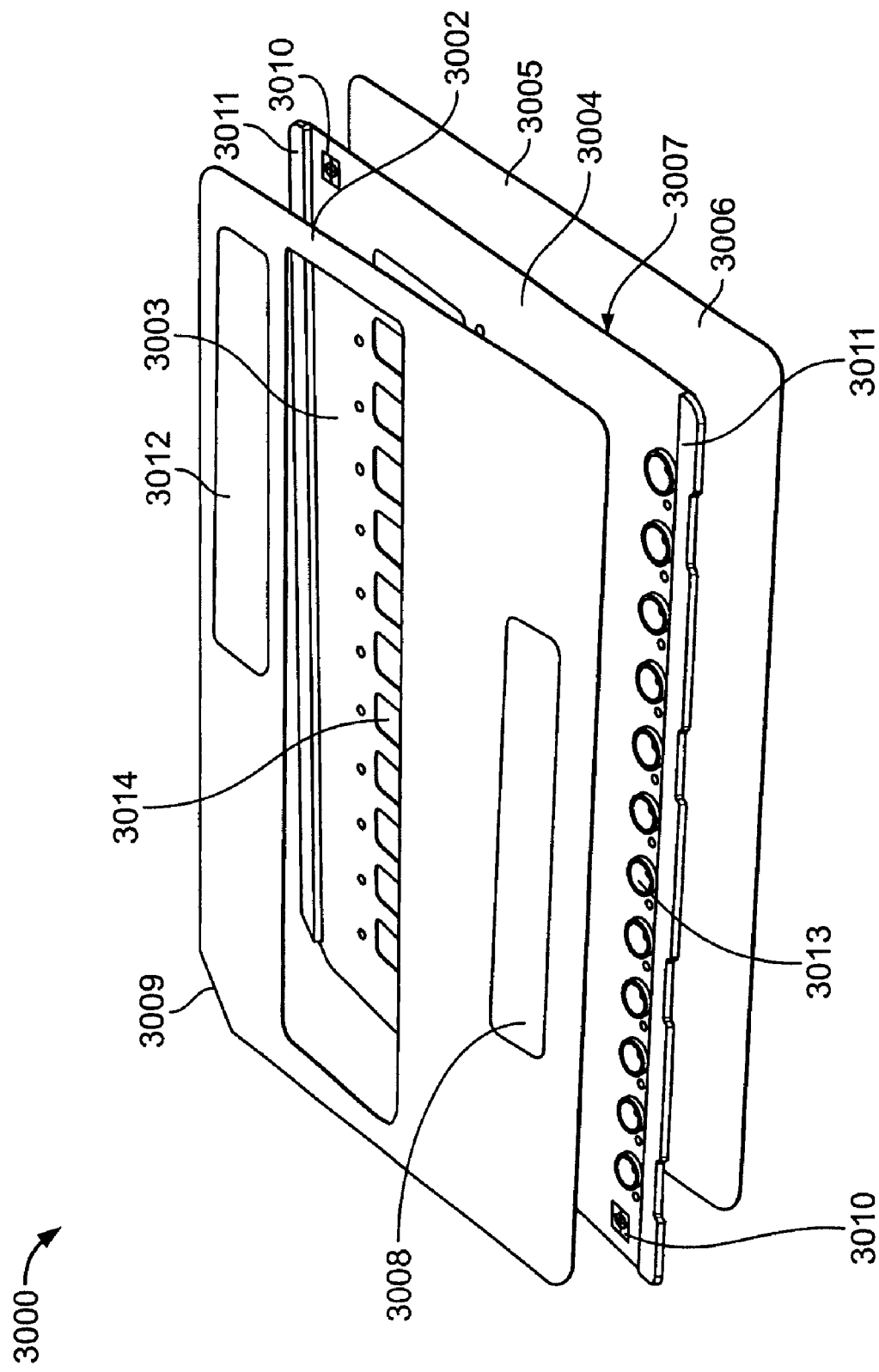
FIG. 1 shows an exemplary microfluidic cartridge having a 3-layer construction.

The microfluidic cartridges described herein are typically configured for use in a method and apparatus for carrying out sample preparation on biological samples in parallel, to create prepared (PCR-ready) samples, with PCR and detection on the prepared samples, and preferably with high throughput. Aspects of the operation of such apparatuses and their manner of communicating with microfluidic cartridges, are further described herein Microfluidic Cartridge One aspect of the present technology relates to a microfluidic cartridge that includes a first, second, and third layers that together define a plurality of microfluidic networks, each network having various components configured to carry out PCR on a sample having one or more polynucleotides whose presence is to be determined. The cartridge includes one or more sample lanes in parallel, wherein each lane is independently associated with a given sample for simultaneous processing, and each lane contains an independently configured microfluidic network. The cartridge typically processes the one or more samples by increasing the concentration of (such as by amplification) one or more polynucleotides to be determined, as present in each of the samples. An exemplary cartridge having such a construction is shown in FIG. 1. Such a cartridge is simple to manufacture, and permits PCR to be carried out in a concentrated reaction volume (~4 µl) and enables rapid thermocycling, at ~20 seconds per cycle.

Although other layers may be found in cartridges having comparable performance and ease of manufacture, the cartridge herein includes embodiments having only three layers in their construction, as shown in the embodiment 3000 of FIG. 1, which has a substrate 3004, a laminate 3006, and a label 3002. In cartridge 3000, a microfluidic substrate 3004 has an upper side 3005 and, on an opposite side of the substrate (not visible in FIG. 1), a lower side 3007, wherein the substrate comprises a plurality of microfluidic networks, arranged into a corresponding plurality of sample lanes 3003; a laminate 3006 attached to the lower side 3007 of the substrate to seal the various components (such as valves) of the microfluidic networks, and to provide an effective thermal transfer layer between a dedicated heating element (further described herein) and components in the microfluidic networks; and a label 3002, attached to the upper side 3005 of the substrate 3004, which also covers and seals holes that are used in the manufacturing process to load components such as valves of the microfluidic networks with thermally responsive materials.

Thus, embodiments of microfluidic cartridges herein include embodiments consisting of three layers, a substrate, a laminate, and a label, though other, additional, features other than layers may be consistent with such characterizations. Embodiments herein further include microfluidic cartridges consisting essentially of three layers, a substrate, a laminate, and a label, though other, additional, features other than layers may be consistent with such characterizations. Furthermore, embodiments herein still further include microfluidic cartridges comprising three layers, a substrate, a laminate, and a label.

The microfluidic substrate layer 3004 is typically injection molded out of a plastic, preferably a zeonor plastic (cyclic olefin polymer), and contains a number of microfluidic networks (not shown in FIG. 1), each having a PCR chamber, channels, and valves on a first (e.g., lower) side (disposed towards the laminate), and vent channels and various inlet holes, including wax loading holes and liquid inlet holes, on a second (e.g., upper) side (disposed toward the label). Typically, in a given cartridge, all of the microfluidic networks together, including the PCR reactors, the inlet holes and the valves for isolating the PCR reaction chambers, are defined in a single substrate 3004. The substrate is made of a material that confers rigidity on the substrate (and hence the cartridge), and is impervious to air or liquid, so that entry or exit of air or liquid during operation of the cartridge is only possible through the inlets or the various vent.

Channels of a microfluidic network in a lane of cartridge 3000 typically have at least one sub-millimeter cross-sectional dimension. For example, channels of such a network may have a width and/or a depth of less than 1 mm (e.g., about 750 microns or less, about 500 microns, or less, or about 250 microns or less).

The heat sealable laminate layer 3006 (typically between about 100 and about 125 microns thick) can be attached to the bottom surface of the microfluidic substrate using, for example, heat bonding, pressure bonding, or a combination thereof. The laminate layer 3006 may also be made from a material that has an adhesive coating on one side only, that side being the side that contacts the underside of the microfluidic substrate. This layer may be made from a single coated tape having a layer of Adhesive 420, made by 3M. Exemplary tapes include single-sided variants of double sided tapes having product nos. 9783, 9795, and 9795B, and available from 3M. The laminate layer is typically 50-200µ thick, for example 125µ thick. Other acceptable layers may be made from adhesive tapes that utilize micro-capsule based adhesives.

Typically, the label 3002 is made from polypropylene or other plastic with pressure sensitive adhesive (typically between about 50 and 150 microns thick) and is configured to seal the wax loading holes of the valves in the substrate, trap air used for valve actuation, and serve as a location for operator markings. The label can be in two or more separate pieces, though it would be understood by one of ordinary skill in the art that in many embodiments a single piece layer would be appropriate.

The label may be printed with various information, such as a manufacturer's logo, a part number, index numbers for each of the sample lanes, and an area 3012 where a user can make annotations. In various embodiments, the label comprises a computer-readable or scannable portion 3008 that may contain certain identifying indicia such as a lot number, expiry date, or a unique identifier. For example, the label can include a bar code, a radio frequency tag, or one or more computer-readable, or optically scannable, characters. The readable portion of the label can be positioned such that it can be read by a sample identification verifier as further described herein.

Microfluidic cartridge 3000 can be fabricated as desired, as further described herein.

A multi-lane cartridge, such as shown in FIG. 1, is configured to accept a number of samples, in particular embodiments 12 samples, through a number of inlets 3013 wherein the samples include at least a first sample and a second sample, wherein the first sample and the second sample each contain one or more polynucleotides in a form suitable for amplification. The polynucleotides in question may be the same as, or different from one another, in different lanes of a cartridge. The multi-sample cartridge comprises at least a first microfluidic network and a second microfluidic network, adjacent to one another, wherein each of the first microfluidic network and the second microfluidic network is as elsewhere described herein, and wherein the first microfluidic network accepts the first sample, and wherein the second microfluidic network accepts the second sample.

A sample lane, as further described herein, includes a network of microfluidic elements, controllable independently of those in another sample lane, by which a sample can be accepted and analyzed, according to methods described herein. A lane comprises at least a sample inlet, and a microfluidic component, as further described elsewhere herein. In some embodiments, each microfluidic network additionally comprises an overflow reservoir to contain surplus liquid dispensed into the cartridge.

A microfluidic network, in a microfluidic substrate of a cartridge, can include, in fluidic communication, one or more components selected from the group consisting of: gates, valves such as thermally actuated valves, channels, vents, and reaction chambers. Particular components of exemplary microfluidic networks are further described elsewhere herein.

The microfluidic network in each lane is typically configured to carry out PCR on a PCR-ready sample, such as one containing nucleic acid (DNA or RNA) extracted from a raw biological sample using other aspects of the apparatus as further described herein. A PCR-ready sample is thus typically a mixture comprising the PCR reagent(s) and the neutralized polynucleotide sample, suitable for subjecting to thermal cycling conditions that create PCR amplicons from the neutralized polynucleotide sample. For example, a PCR-ready sample can include a PCR reagent mixture comprising a polymerase enzyme, a positive control plasmid, a fluorogenic hybridization probe selective for at least a portion of the plasmid and a plurality of nucleotides, and at least one probe that is selective for a polynucleotide sequence. Examples of such reagents, and probes, are described elsewhere herein. A sample lane further typically includes a region 3014 of the substrate above a PCR reactor that permits a detector to monitor progress of the reaction and also to detect fluorescence from a probe that binds to a quantity of amplified nucleotides.

In various embodiments, a lane of a microfluidic cartridge can include a sample inlet port 3013, a first thermally actuated valve, a second thermally actuated valve, a PCR reaction chamber, and one or more channels connecting the inlet port to the PCR reaction chamber via the first valve, and one or more channels connecting the PCR reaction chamber to an exit vent via the second valve. The sample inlet valve can be configured to accept a quantity of sample at a pressure differential compared to ambient pressure of between about 100 to 5,000 Pa, such as can be delivered by an automated liquid dispenser (as described in U.S. patent application Ser. No.

12/212,403, filed Sep. 17, 2008, and incorporated herein by reference in its entirety). It should be noted that the lower the loading pressure, the higher the fill time for a aliquot of reaction mix to fill the microfluidic network. Applying more pressure will reduce the fill time, but if the time for which the pressure is applied is not determined correctly, the sample could be blown out through the microfluidic cartridge (if an end hydrophobic vent is not present). Therefore the time for which the pressure is applied should to be properly determined, such as by methods available to one of ordinary skill in the art, to prevent underfill or overfill. In general, the fill time is inversely proportional to the viscosity of the solution.

The sample inlets of adjacent lanes are reasonably spaced apart from one another to prevent any contamination of one sample inlet from another sample when a user introduces a sample into any one cartridge. In some embodiments, the multi-sample cartridge is designed so that a spacing between the centroids of sample inlets is 8 mm, which is an industry-recognized standard. This means that, in certain embodiments the center-to-center distance between inlet holes in the cartridge, as further described herein, is 8 mm. A spacing of 8 mm is convenient both for interfacing the cartridge with an automated pipetting apparatus, as described elsewhere herein, as well as for interfacing with pipettes controlled manually that, e.g., transfer samples from PCR tubes to the cartridge. Thus, when used in conjunction with an automated sample loader having 4 heads, spaced equidistantly at 8 mm apart, the inlets having a 8 mm spacing can be loaded in three batches of 4 inlets: e.g., inlets 1, 4, 7, and 10 together, followed by 2, 5, 8, and 11, then finally 3, 6, 9, and 12, wherein the 12 inlets are numbered consecutively from one side of the cartridge to the other.

One skilled in the art would recognize that other spacings, such as 6 mm, 9 mm, 10 mm, and 12 mm, between centroids of sample inlets are consistent operation of the cartridge, as described elsewhere herein.

In some embodiments, the sample inlets are configured so as to prevent subsequent inadvertent introduction of sample into a given lane after a sample has already been introduced into that lane.

The inlet holes 3013 can be manufactured frusto-conical in shape with an appropriate conical angle so that industry-standard pipette tips (2 µl, 20 µl, 200 µl, volumes, etc.) fit snugly, entering from the widest point of the inlet. Thus, in certain embodiments, an inlet comprises an inverted frusto-conical structure of at least 1 mm height, and having a diameter at its widest point that accepts entry of a pipette tip, of from 1-5 mm. The apparatus herein may be adapted to suit other, later-arising, industry standards for pipette tips not otherwise described herein. Typically the volume of sample accepted via an inlet into a microfluidic network in a sample lane is from 1-20 µl, and may be from 3-5 µl. The inlet hole can be designed to fit a pipette tip snugly and to create a good seal around the pipette tip, within the cone of the inlet hole. Once the pipette tip lands within the cone, the conical shape guides the pipette and mechanically seals the combination to provide error free dispensing or withdrawal of fluid into the cartridge. However, the cone is designed such that the sealing is reversible because it is undesirable if the seal is so tight that the cartridge can be pulled away from its tray, or location in the receiving bay, when the pipette tips are lifted after the dispensing operations.

In some embodiments, the microfluidic cartridge further comprises a registration member 3009 that ensures that the cartridge is received by a complementary diagnostic apparatus in a single orientation, for example, in a receiving bay of the apparatus. The registration member may be a simple cut-out from an edge or a corner of the cartridge (as shown in FIG. 1), or may be a series of notches, wedge or curved-shaped cutouts, or some other configuration of shapes that require a unique orientation of placement in the apparatus.

In some embodiments, the multi-sample cartridge has a size substantially the same as that of a 96-well plate as is customarily used in the art. Advantageously, then, the cartridge may be used with plate handlers used elsewhere in the art.

In some embodiments, the microfluidic cartridge comprises two or more positioning elements, or fiducials 3010, for use when filling the valves with thermally responsive material. The positioning elements may be located on the substrate, typically the upper face thereof. In the embodiment of FIG. 1, they are shown on diagonally opposed corners of the substrate but are not limited to such positions.

After PCR has been carried out on a sample, and presence or absence of a polynucleotide of interest has been determined, it is typical that the amplified sample remains on the cartridge and that the cartridge is either used again (if one or more lanes remain open), or disposed of. Should a user wish to run a post amplification analysis, such as gel electrophoresis, the user may pierce a hole through the laminate of the cartridge, and recover an amount—typically about 1.5 microliter—of PCR product. The user may also place the individual PCR lane on a special narrow heated plate, maintained at a temperature to melt the wax in the valve, and then aspirate the reacted sample from the inlet hole of that PCR lane.

The microfluidic cartridges may also be stackable, such as for easy storage or transport, or may be configured to be received by a loading device, as further described herein, that holds a plurality of cartridges in close proximity to one another, but without being in contact with one another. In order to accomplish either or both of these characteristics, the substrate may comprise two ledges or ridges, one of each of which is situated along each of two opposite edges of the cartridge, the ledges or ridges typically disposed on the upper side of the substrate. Thus, where a cartridge has a rectangular aspect (ignoring any registration member or mechanical key), the two ridges may be situated along the long sides, or along the short sides, of the cartridge. In the embodiment of FIG. 1, the two ridges 3011 are situated along the long sides of the cartridge. The ridges can be, e.g., 2 mm wide, and in general are sufficiently wide to accomplish stacking. The inlet holes are positioned sufficiently far from the ridges to prevent interference with liquid inputting operations.

In various embodiments, during transport and storage, the microfluidic cartridge can be further surrounded by a sealed pouch to reduce effects of, e.g., water vapor. The microfluidic cartridge can be sealed in the pouch with an inert gas. The microfluidic cartridge can be disposable, such as intended for a single use.

In use, a microfluidic cartridge, as described herein, is typically thermally associated with an array of heat sources configured to operate the components (e.g., valves, gates, and PCR reactor) of the microfluidic networks. In some embodiments, the heat sources are controlled by an operating system, which operates the device during use. The operating system includes a processor (e.g., a computer) configured to actuate the heat sources according to a desired protocol. Processors configured to operate microfluidic devices are described in, e.g., U.S. application Ser. No. 09/819,105, filed Mar. 28, 2001, which application is incorporated herein by reference.

The application of pressure (such as ~1 psi) to contact the cartridge to the heater of the instrument assists in achieving better thermal contact between the heater and the heat-receivable parts of the cartridge, and also prevents the bottom laminate structure from expanding, as would happen if the PCR channel was partially filled with liquid and the entrapped air would be thermally expanded during thermocycling.

Three further exemplary embodiments of a microfluidic cartridge are shown in, respectively, FIGS. 2A-2E, 3, and 4.

Figure 2A:
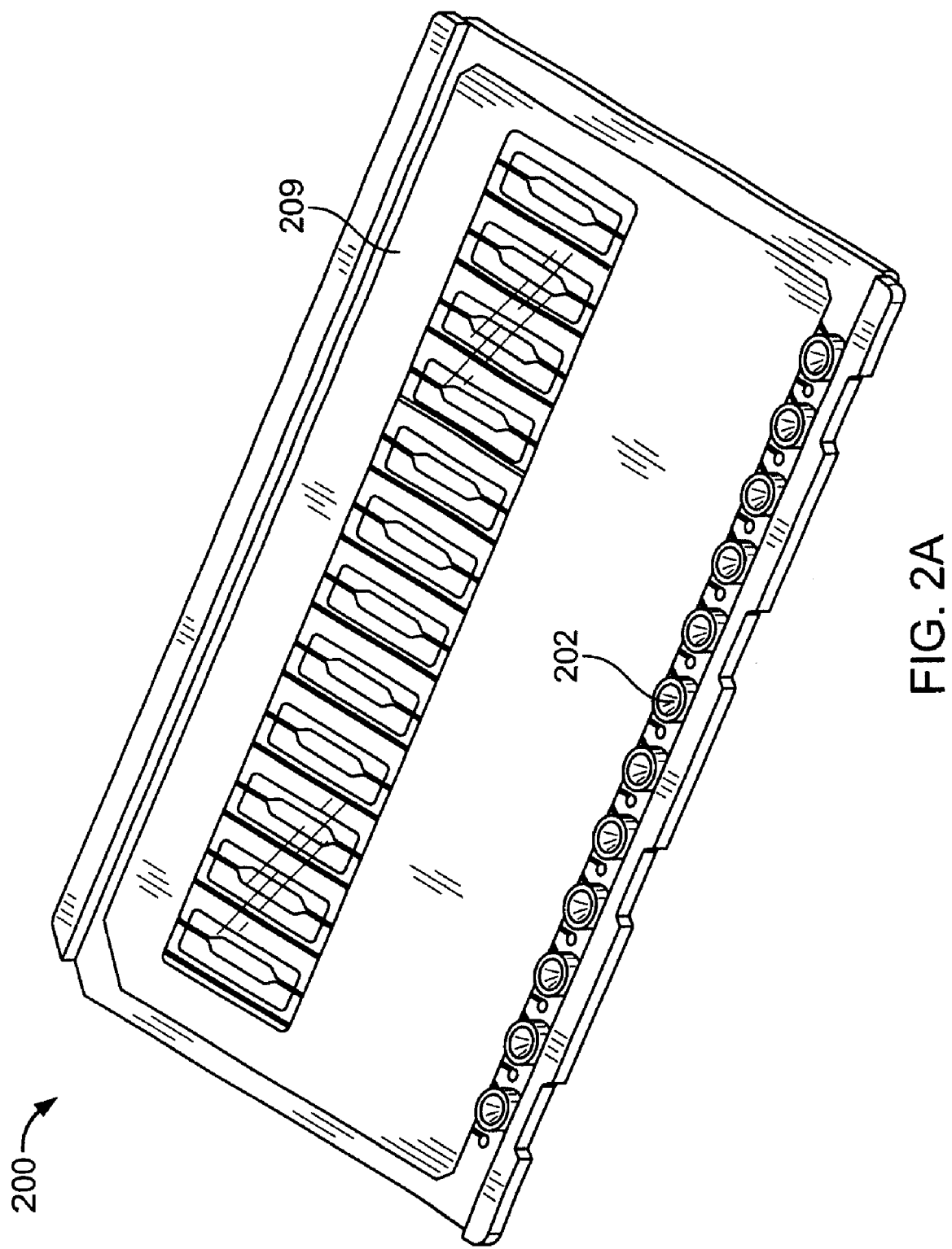
FIGS. 2A-2E show various views of an embodiment of a microfluidic cartridge.
Figure 2B:
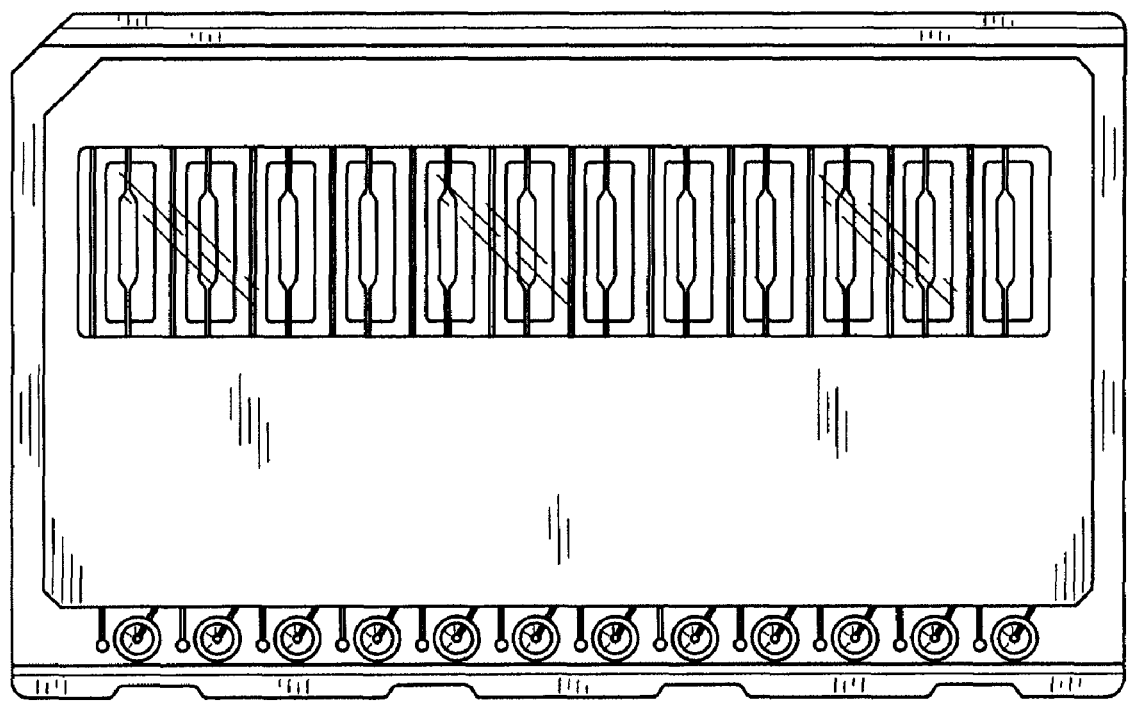
Figure 2C:
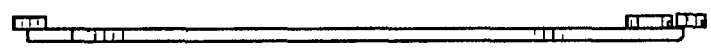
Figure 2D:
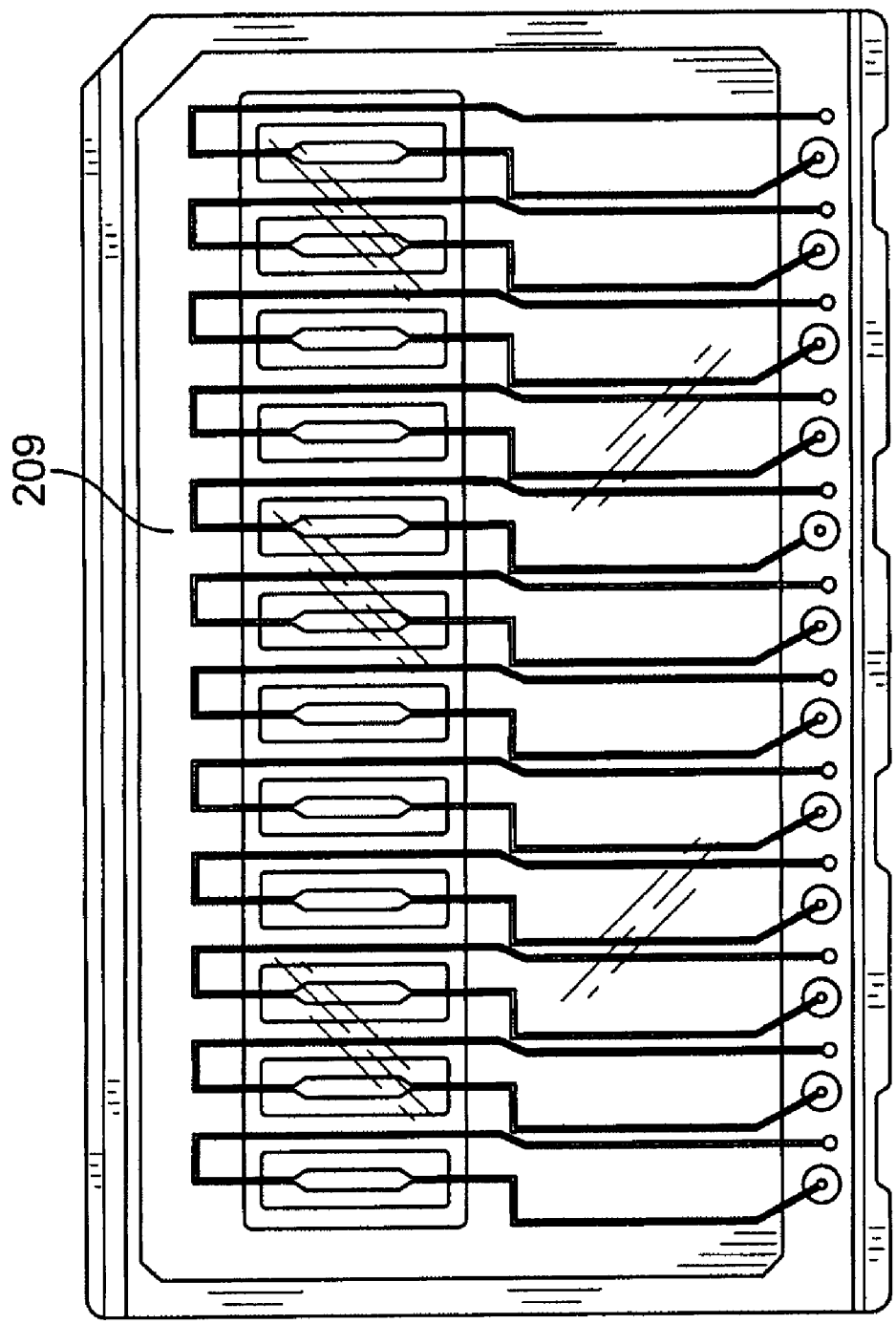

FIG. 2A shows a perspective view of a portion of an exemplary microfluidic cartridge 200 according to the present technology. The cartridge may be referred to as a multi-lane PCR cartridge. FIGS. 2B, 2C, and 2D show respectively top plan, side, and bottom plan views of the cartridge of FIG. 2A. Visible in FIGS. 2A-2D are various representative components of cartridge 200. In particular, the embodiment of FIGS. 2A-2D contains twelve independent sample lanes 209 capable of independent (simultaneous or successive) processing of samples. Each lane has a dedicated pipette inlet 202. For example, sample inlet 202 is configured to accept a syringe, a pipette, or a PCR tube containing a PCR ready sample. More than one inlet 202 is shown, wherein one inlet operates in conjunction with a single lane. Various components of microfluidic circuitry in each lane are also visible and/or shown in FIG. 2E. For example, microvalves 204 and 206 are microfluidic components that are parts of microfluidic circuitry in a given lane. Also shown is an ultrafast PCR reactor 210, which, as further described herein, is a microfluidic channel that is long enough to permit PCR to occur in a sample. Typical dimensions of a PCR reactor are 150μ deep by 700μ wide, and a typical volume is ~1.6 μl. Above PCR reactor 210 is a window 212 that permits optical detection, such as detection of fluorescence from a fluorescent substance, such as a fluorogenic hybridization probe, in PCR reactor 210 when a detector is situated above window 212.

Figure 3:
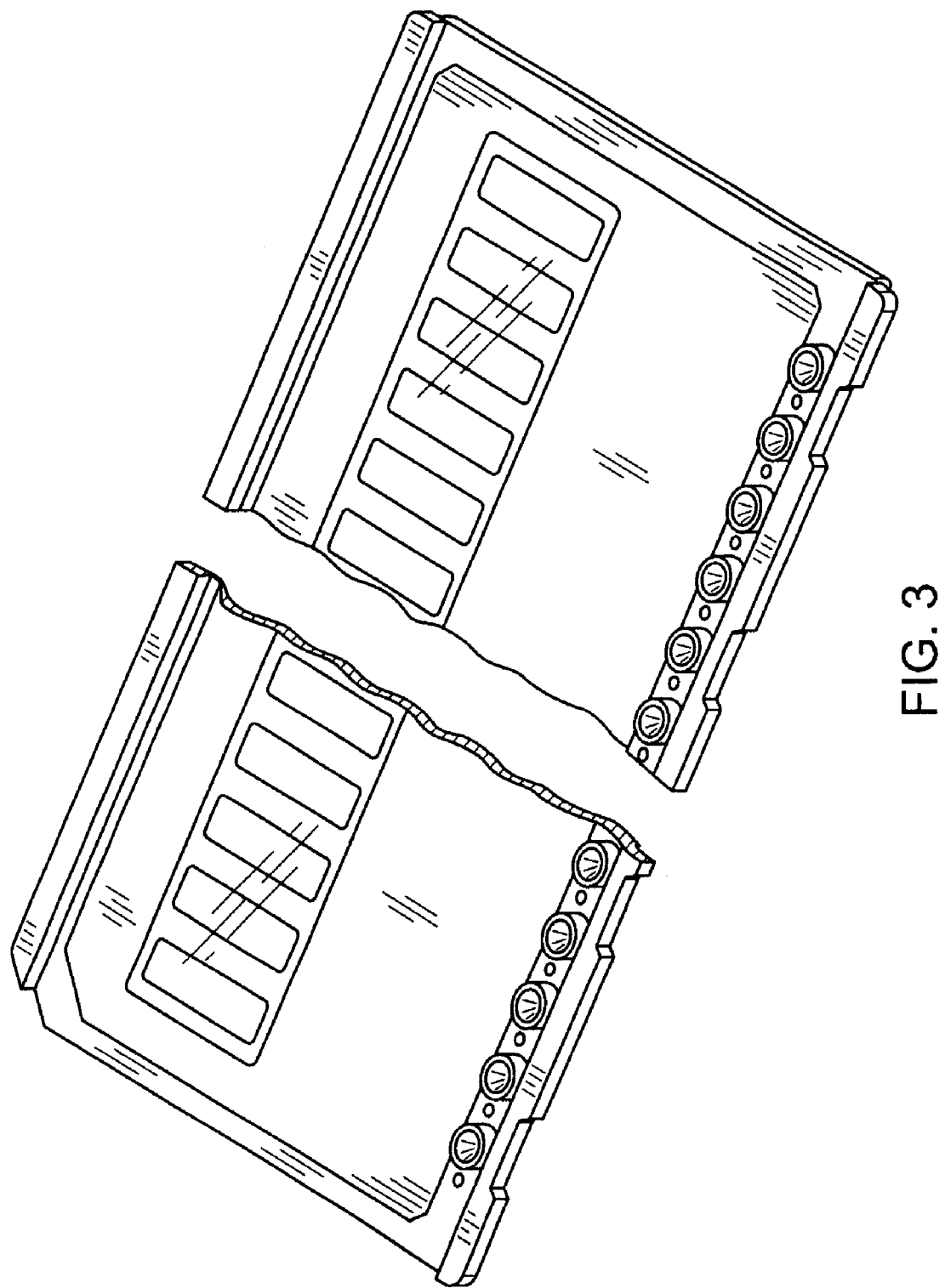
FIG. 3 shows a perspective view of an embodiment of a microfluidic cartridge.

FIG. 3 shows schematically an aspect of the cartridge herein, that it is not limited to twelve lanes. The broken section in FIG. 3 illustrates that embodiments of the cartridge may differ in their aspect ratios so as to accommodate fewer than, or more than, twelve lanes. Numbers of lanes that may be found in embodiments of microfluidic cartridges consistent with the other description herein, include but are not limited to, 4, 6, 8, 10, 15, 16, 20, 24, 30, 32, 36, 40, and 48.

Figure 4A:
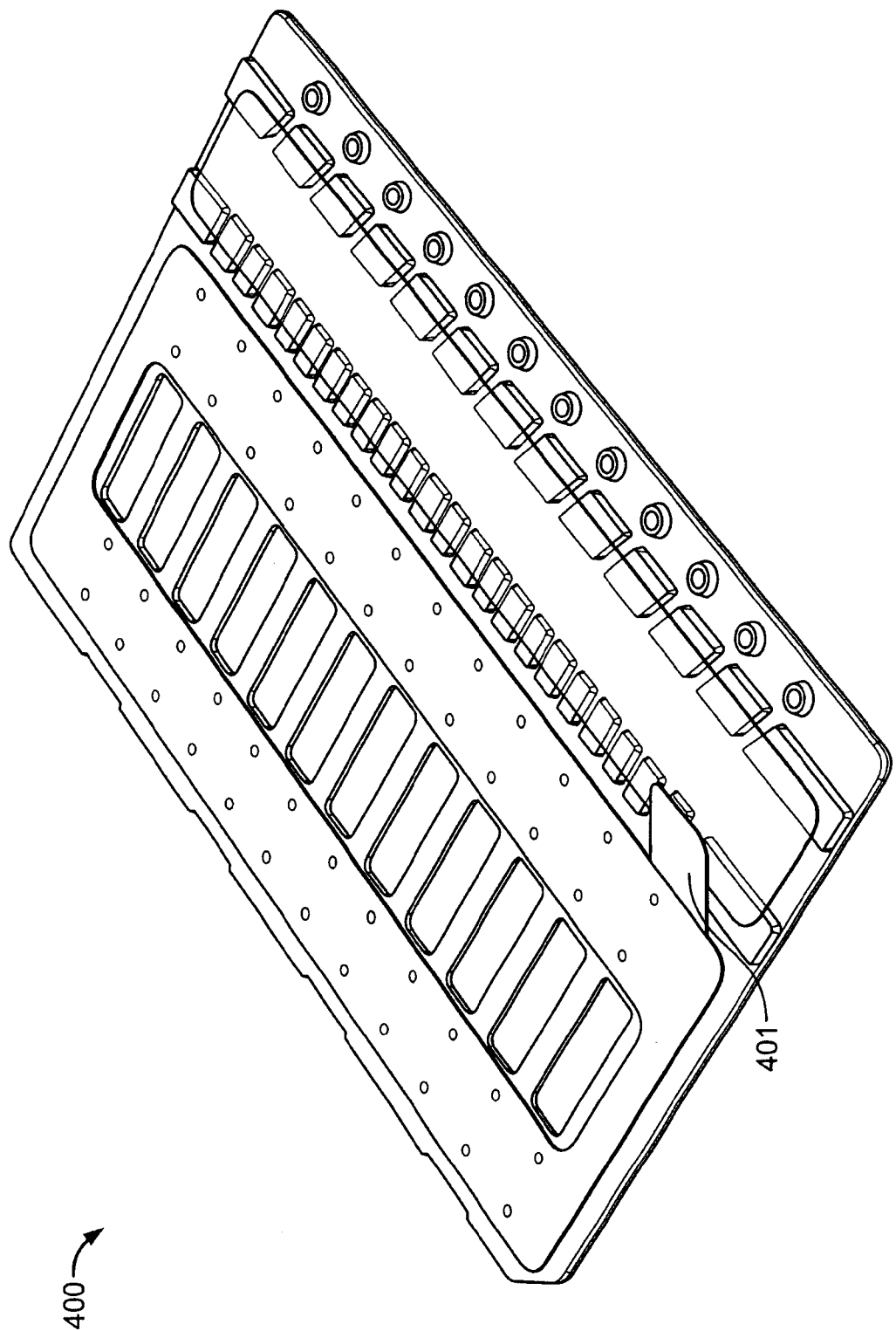
FIGS. 4A-4D show various views of an embodiment of a microfluidic cartridge.

FIG. 4A shows a perspective view of an exemplary microfluidic cartridge 400 having 12 lanes 409, though as with other cartridges herein, other numbers of lanes are consistent with the operation of this cartridge. The cartridge is particularly configured to accept samples from a manual pipetting device, rather than an automated pipette head. Tab 401 is optional, and when present facilitates removal of the cartridge from a receiving bay into which it is loaded during use. Thus, a user grabs the tab 401, and pulls the cartridge out from a recessed location that hinders gripping the cartridge by is edges.

Figure 4B:
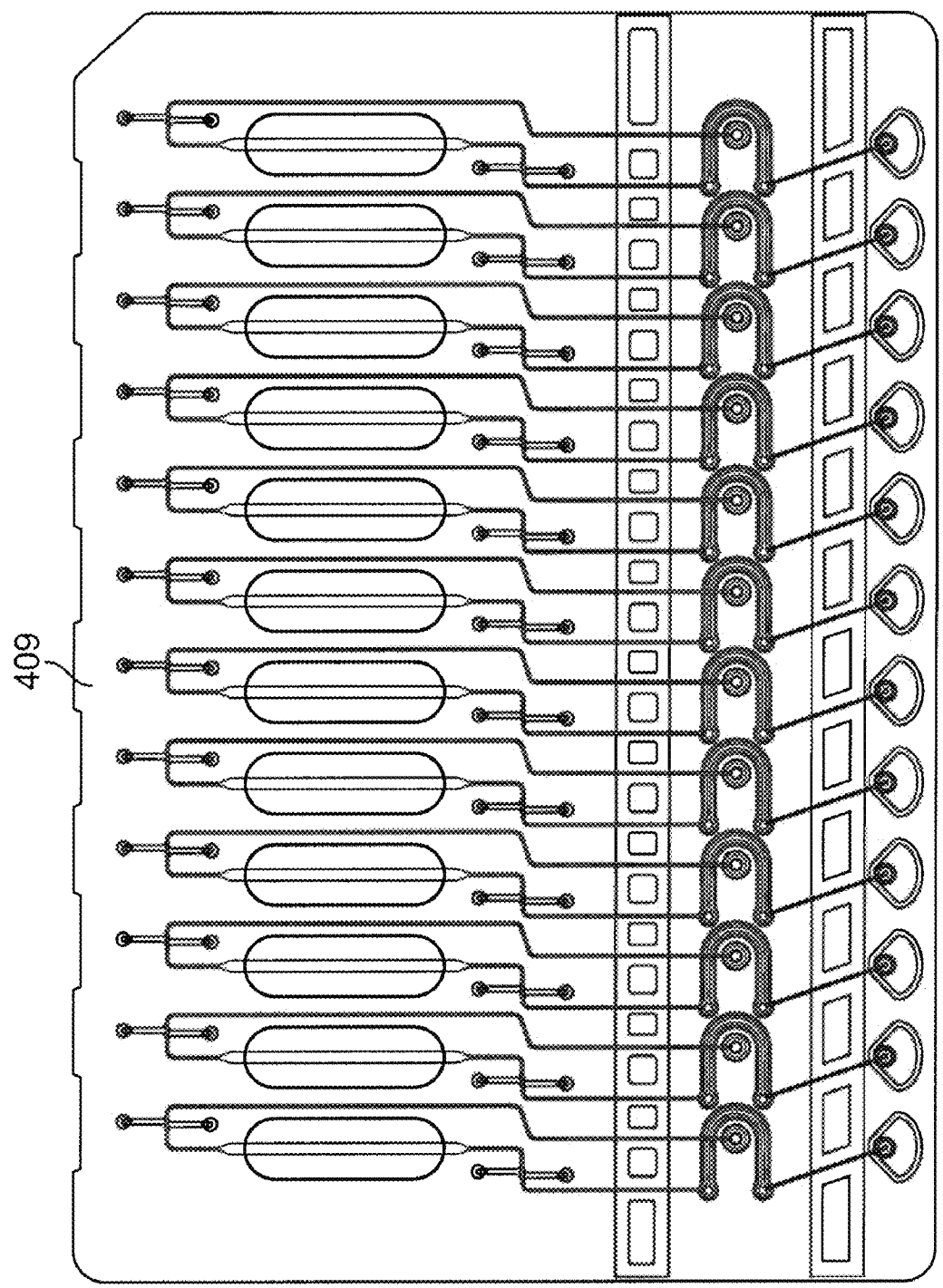
Figure 4C:
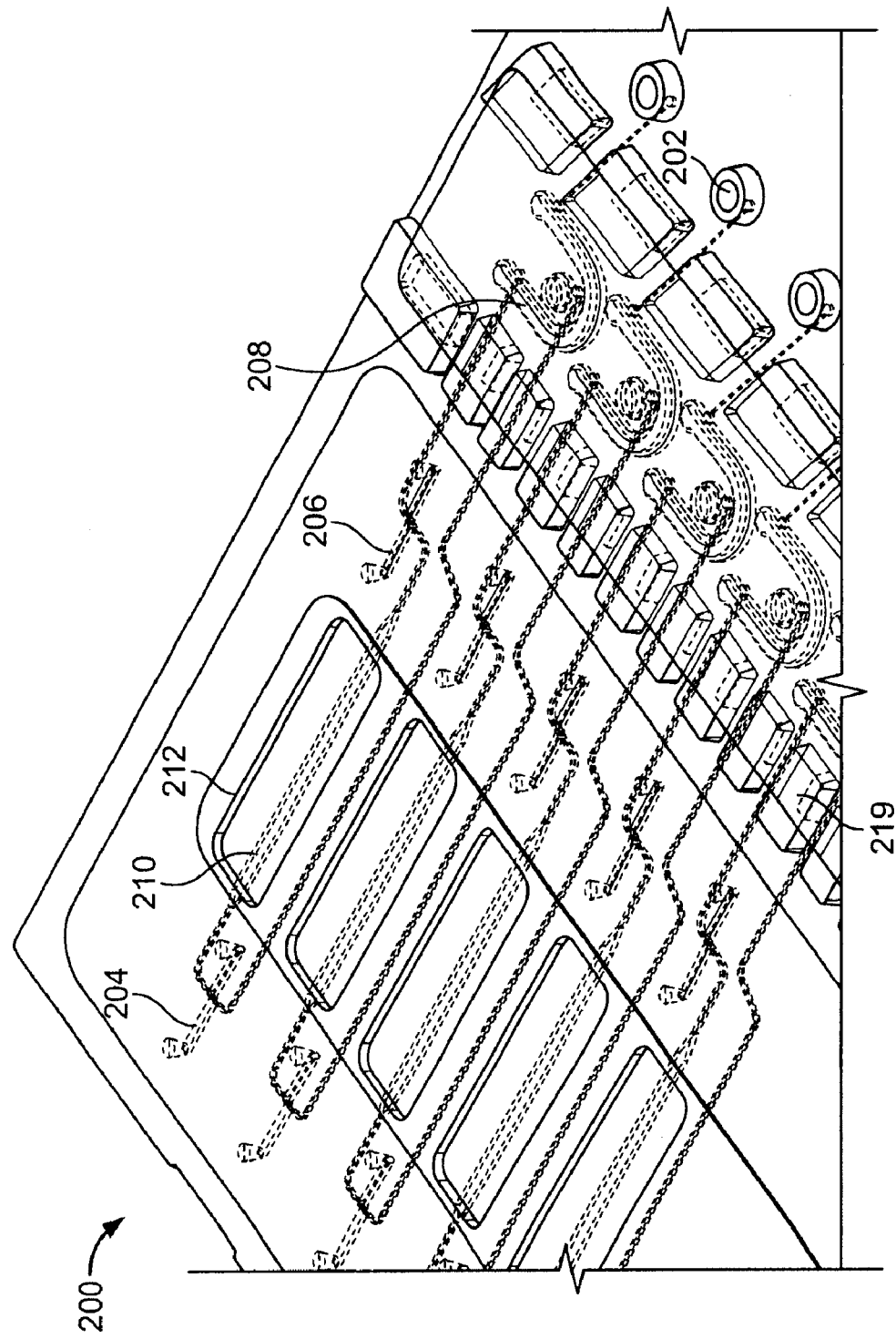
Figure 4D:
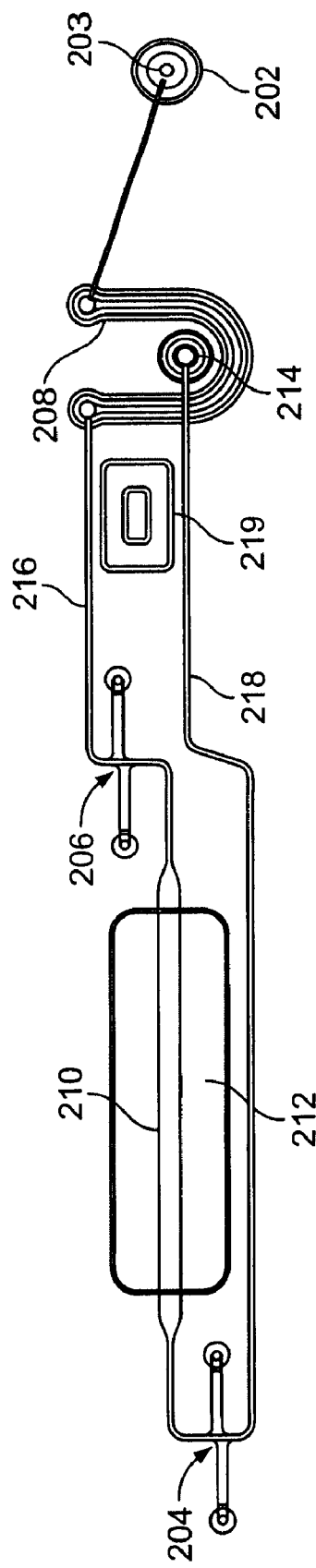

FIG. 4B shows a plan view of the underside of the embodiment of FIG. 4A, and depicts the microfluidic networks in each lane. FIG. 4C shows a perspective cutaway view of a portion of the top of the cartridge of FIG. 4A, showing various aspects of the microfluidic circuits. FIG. 4D shows the microfluidic circuit of a single lane of the cartridge of FIG. 4A.

Microfluidic Networks

Figure 2E:
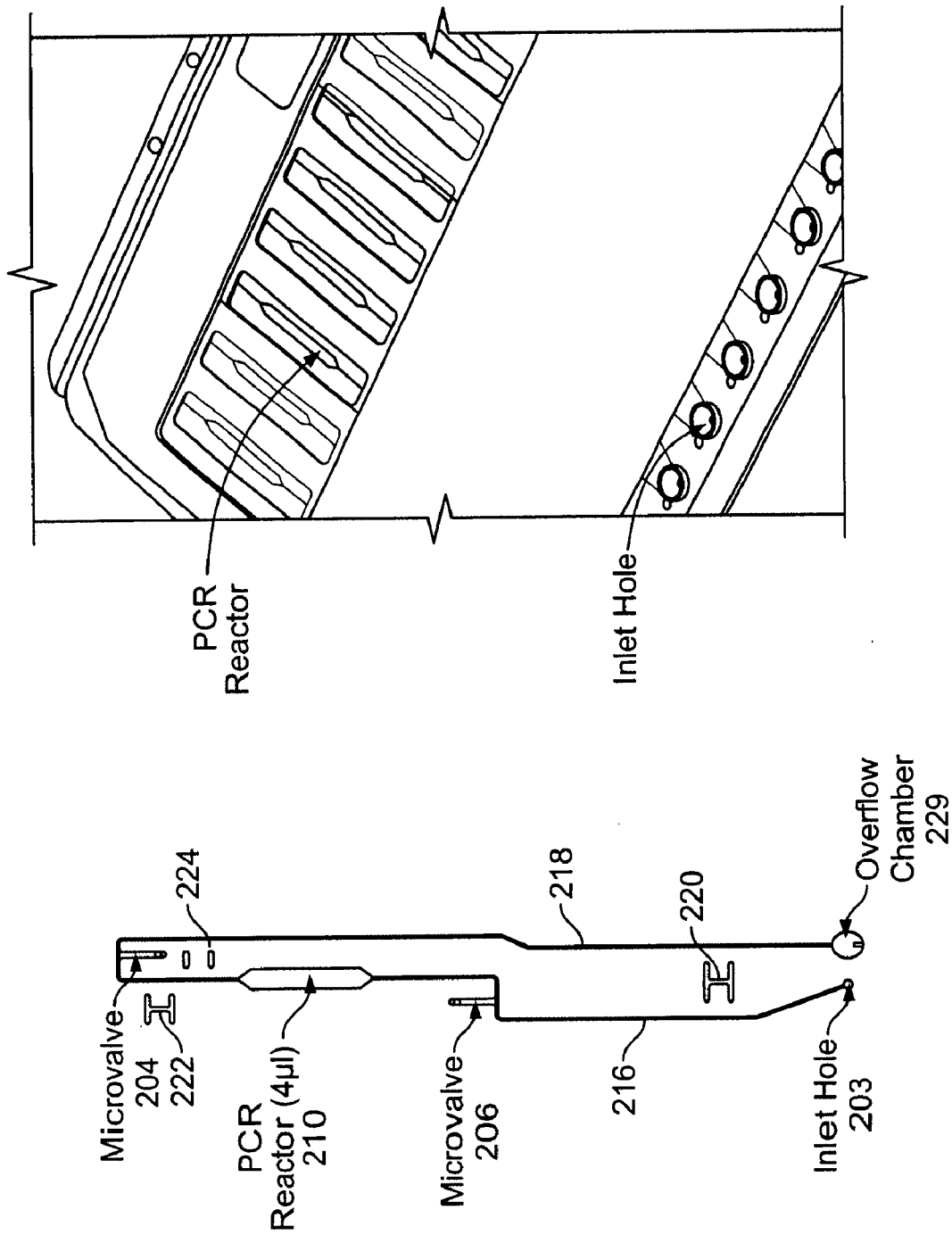

FIG. 2E (left panel) shows a plan view of a representative microfluidic circuit found in one lane of a multi-lane cartridge such as shown in FIG. 2A. FIG. 2E (right panel) shows how the circuit is visible through the cartridge construction.

FIG. 4D shows a plan view of a representative microfluidic circuit found in one lane of a multi-lane cartridge such as shown in FIGS. 4A and 4B.

Other configurations of microfluidic network, not shown in FIGS. 2E and 4D, would be consistent with the function of the cartridges and apparatus described herein.

The microfluidic networks of FIGS. 2E and 4D are now described, wherein it is apparent that like reference numerals refer to like elements. Throughout the operation of cartridge 200 the fluid is manipulated as a microdroplet (not shown in FIGS. 2E, 4D).

In sequence, sample-containing solution is introduced through liquid inlet 202 that communicates with inlet hole 203. The network optionally includes a bubble removal vent channel 208 into which sample flows and which permits adventitious air bubbles introduced into the sample during entry to escape. Typically, when using a robotic dispenser of liquid sample (e.g., as described in U.S. patent application Ser. No. 12/212,403, filed Sep. 17, 2008, and incorporated herein by reference), the volume is dispensed accurately enough that formation of bubbles is not a significant problem, and the presence of vent channel 208 is not necessary. Conversely, vent channel 208 finds most use when sample is introduced into the network via manual pipetting. After passing through the bubble vent, if present, sample continues along a channel 216; if there is no bubble removal vent, as in FIG. 2E, the sample solution flows directly from the inlet into channel 216.

Channel 216 is shown as kinked around the location of microvalve 206. Such a kink is not necessary, but merely convenient to ensure that the whole network occupies as small an area of the microfluidic substrate as is practical.

Typically, the microfluidic network is configured so that the time required for a microdroplet of sample to pass from the inlet to the second valve is less than 50% of the time required for the sample to travel up to the exit vent. Typically, the microfluidic network is designed to have an increased flow resistance downstream of the two valves without increasing the total volume of the microfluidic network in comparison to the amount required to fill from the first valve to the end vent of the network.

Valves 204 and 206 are shown in FIG. 4D as double-valves, having a source of thermally responsive material (also referred to as a temperature responsive substance) on either side of the channel where they are situated. However, as shown in FIG. 2E, valves 204 and 206 may either or both be single valves that have a source of thermally responsive material on only one side of the respective channels. Valves 204 and 206 are initially open, so that a microdroplet of sample-containing fluid can be pumped into PCR reactor 210 from inlet hole 202. Upon initiating of processing of the sample, the detector present on top of the PCR reactor checks for the presence of liquid in the PCR reactor, and then, if liquid is present, communicates that fact to a processor controller that causes valves 204 and 206 to be closed to thereby isolate the PCR reaction mix from the channels on either side. Both valves 204 and 206 are closed prior to thermocycling to prevent any evaporation of liquid, bubble generation, or movement of fluid from the PCR reactor, during PCR. The use of microvalves configured such as valves 204 and 206 prevents both loss of liquid or vapor thereby enabling even a partially filled reactor to successfully complete a PCR thermocycling reaction.

The PCR reactor 210 is a microfluidic channel that is heated through a series of cycles to carry out amplification of nucleotides in the sample, as further described herein. Typically the PCR reactor has a volume of 3-5 μl, and in particular embodiments has a volume of 4 μl, or 4.5 μl. For PCR reactors of such volumes, the input volume of fluid is typically from 4 μl to 6 μl. The inside walls of the channel in the PCR reactor are made very smooth and polished to a shiny finish (for example, using a polish such as SPI A1, SPI A2, SPI A3, SPI b1, or SPI B2) during manufacture. This is in order to minimize any microscopic air trapping in the surface of the PCR reactor, which would causing bubbling during the thermocycling steps. The presence of bubbles especially in the detection region of the PCR reactor might cause a false reading for, e.g., completion of PCR. Furthermore, the PCR reactor 210 is made shallow such that the temperature gradient across the depth of the channel is minimized. The region 212 of the substrate above PCR reactor 210 permits a detector to monitor progress of the reaction and also to detect fluorescence from a probe that binds to a quantity of amplified nucleotide. The region 212 is made of thinner material than the rest of the cartridge so as to permit the PCR reactor to be more responsive to a heating cycle (for example, to rapidly heat and cool between temperatures appropriate for denaturing and annealing steps), and so as to reduce glare, autofluorescence, and undue absorption of fluorescence.

In some embodiments, an end vent 214 prevents a user from introducing any excess amount of liquid into the microfluidic cartridge, such as can easily be done during manual pipetting. As further described herein, an end vent is typically covered by a membrane. In other embodiments, an overflow chamber 229 plays a role of containing any sample from spilling over to unintended parts of the cartridge. An overflow chamber is typically configured to capture 1-2 microliters of fluid. In still other embodiments, both an end vent and an overflow chamber 229 are present, and such that usually the end vent follows downstream of the overflow chamber. A user may input sample volumes as small as an amount to fill from the bubble removal vent (where present) to the middle of the PCR reactor, or up to valve 204 or beyond valve 204. The end vent, overflow chamber, or combination thereof, serve to prevent excess fluid from flooding the microfluidic networks.

Also shown in FIG. 2E are residual portions 220 and 222, and 224 of structures that are removed from the cartridge substrate after manufacture. The presence of the structures during manufacture is to help with proper filling of the cartridge when molten plastic is flowed into the mold (mold flow). Items 220 and 224 are often called "dogbones" because of their shape. Still other shapes are of course possible and consistent with methods of manufacture and use, as described herein.

Also shown in FIG. 4D is a projection of a spacer element 219. This item is also shown in FIG. 4C. It supports a label affixed over the vent such a way that it does not touch the vent.

In various embodiments, the microfluidic network can optionally include at least one reservoir configured to contain waste.

Table 1 outlines volumes, pumping pressures, and operation times associated with various components of a microfluidic network, as found in microfluidic cartridges described herein.

TABLE 1

| Operation | Pumping Pressure | Displacement Volume | Time of Operation |
| --- | --- | --- | --- |
| Mixing displacements | ~2 psi | 10-25 μl | 1-2 minutes |
| Moving valve wax plugs | ~1-2 psi | <1 μl | 5-15 seconds |

| Operation | Pump Used | Pump Design | Pump Actuation |
| --- | --- | --- | --- |
| Mixing displacements | Expancel Pump | Same as above | Same as above |
| Moving valve wax plugs | Thermopneumatic pump | 1 μl of trapped air | Heat trapped air to ~70-90 C. |

Valves

A valve is a microfluidic component that has a normally open state allowing material to pass along a channel from a position on one side of the valve (e.g., upstream of the valve) to a position on the other side of the valve (e.g., downstream of the valve). Various valves find application in the microfluidic networks herein.

Figure 5A:
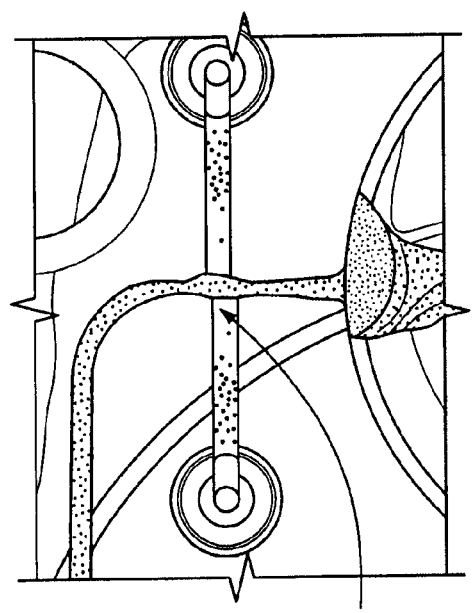
FIGS. 5A-5B show diagrams of an exemplary microfluidic double valve.
Figure 5B:
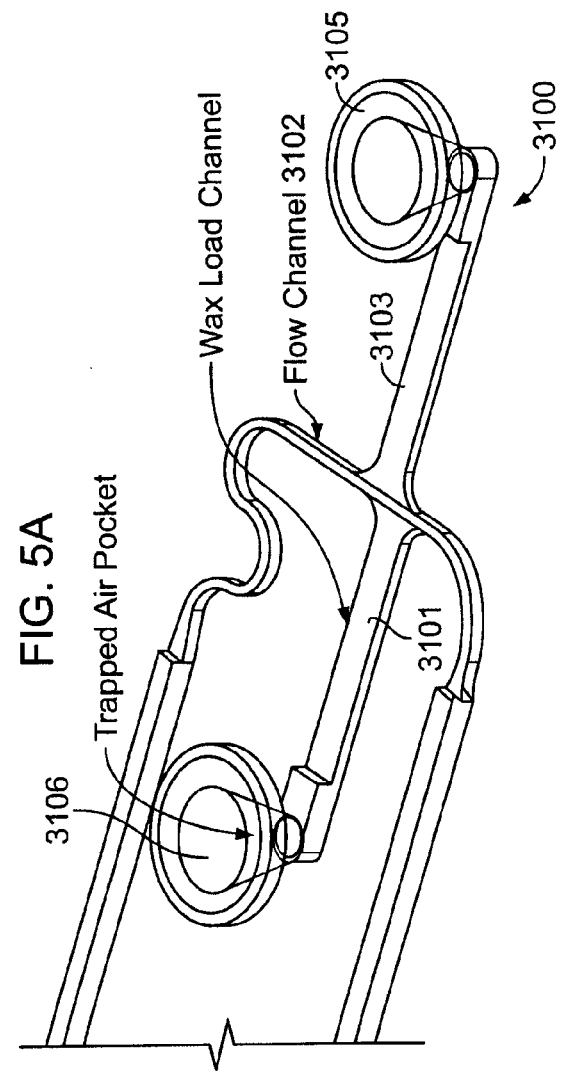

An exemplary double valve 3100 is shown in FIGS. 5A and 5B. A double valve has two channels 3101, 3103, one on either side of the channel 3102 whose flow it regulates, whereas a single valve, such as in FIGS. 6A, 6B, has just one channel, disposed on one side of the channel whose flow it regulates. Channels 3101, 3103 are referred to as loading channels because a thermally responsive substance (TRS) is loaded into such channels, for example via fluidly connected valve inlets 3105 and 3106.

Upon actuation, e.g., by application of heat, the valve transitions to a closed state that prevents material, such as a microdroplet of PCR-ready sample, from passing along the channel 3102 from one side of the valve to the other. For example, a valve includes one or more masses of a thermally responsive substance (TRS) that is relatively immobile at a first temperature and more mobile at a second temperature. Actuation of the valve involves transitioning the TRS from a temperature at or lower than the first temperature to a temperature that is at or higher than the second temperature.

A mass of TRS can be an essentially solid mass or an agglomeration of smaller particles that cooperate to obstruct the passage upon actuation. Examples of TRS's include a eutectic alloy (e.g., a solder), wax (e.g., an olefin), polymers, plastics, and combinations thereof. The first and second temperatures are insufficiently high to damage materials, such as polymer layers of a microfluidic cartridge in which the valve is situated. Generally, the second temperature is less than about 90° C. and the first temperature is less than the second temperature (e.g., about 70° C. or less).

For each mass of TRS associated with a valve, a chamber is in gaseous communication with the mass. Upon heating gas (e.g., air) in the chamber(s) and heating the one or more masses of TRS to the second temperature, gas pressure within a chamber moves the corresponding mass into the channel obstructing material from passing therealong. Other valves of the microfluidic network have the same structure and operate in the same fashion as the valves described herein.

In order to make the valve sealing very robust and reliable, the flow channel 3102 at the valve junction is made narrow (150 μm wide and 150 μm deep or narrower) and the constricted portion of the channel is made at least 0.5 or 1 mm long such that the wax seals up a long narrow channel thereby reducing any leakage of fluid sample through the walls of the channel. In the case of a bad seal, there is leakage of fluid around the walls of the channel, past the wax. So the flow channel is narrowed as much as possible, and made longer, e.g., as long as ~1 mm.

The valve is operated by heating trapped pockets of air in the valve inlets (also referred to as wax-loading ports), which forces the TRS forwards in a manner so that it does not come back to its original position. In this way, both air and TRS are heated during operation of the valve.

Figure 6A:
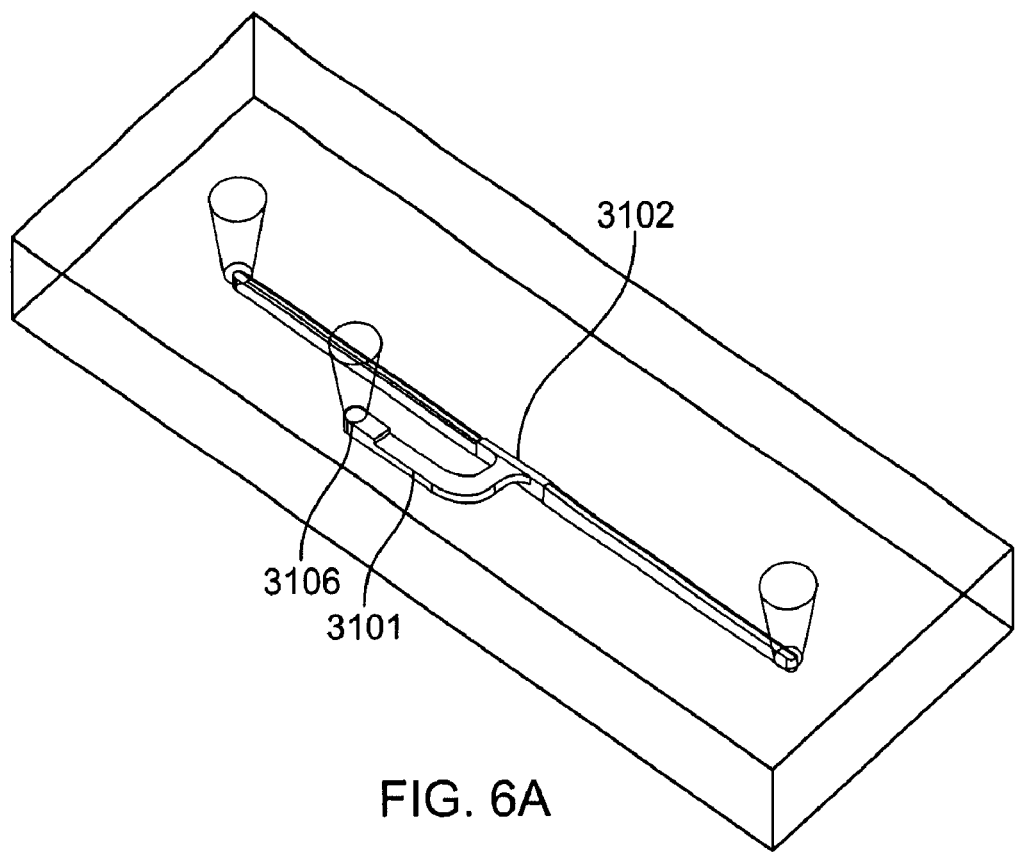
FIGS. 6A-6B show diagrams of exemplary single microfluidic valves.
Figure 6B:
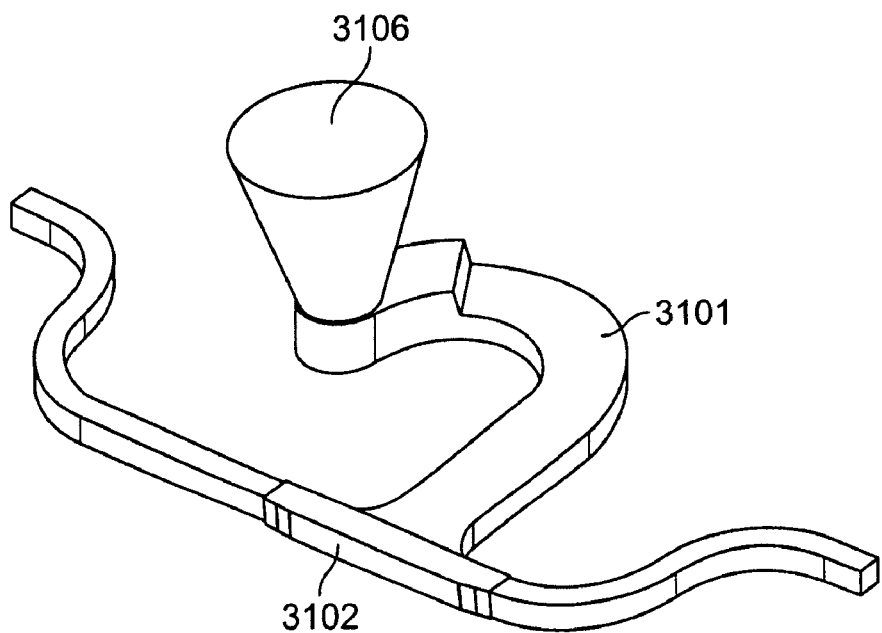

FIGS. 6A and 6B show embodiments of single valves whose structures are consistent with use in the microfluidic networks described herein.

In various embodiments, the microfluidic network can include a single valve, also referred to as a bent valve, as shown in FIG. 6A (as a single valve) to reduce the footprint of the valve on the cartridge and hence reduce cost per part for manufacturing highly dense microfluidic substrates. In the valve of FIG. 6A, the loading hole for TRS is in the center of the valve; the structures at either end are an inlet and an outlet and are shown for illustrative purposes only.

In various embodiments, the network can include a curved valve as shown in FIG. 6B, also as a single valve, in order to reduce the effective cross-section of the microvalve, also enabling manufacture of cheaper dense microfluidic devices.

Vents

A hydrophobic vent (e.g., vent 3200 in FIG. 7) is a structure that permits gas to exit a channel while limiting (e.g., preventing) liquid from exiting the channel. Typically, hydrophobic vents include a layer of porous hydrophobic material (e.g., a porous filter such as a porous hydrophobic membrane from Osmonics) that defines a wall of the channel. As discussed herein, hydrophobic vents can be used to position a microdroplet of sample at a desired location within a microfluidic network. In embodiments such as shown in FIGS. 4A-4D, the membrane is present as a layer (such as of a oleophobic or hydrophobic material) positioned underneath one or more of the labels, and configured to cover the vent channels of microfluidic substrate. It can be applied using heat bonding. A suitable material is a 0.2 to 1.0 micron poresize membrane of modified polytetrafluoroethylene (typically between about 25 and about 100 microns thick).

The hydrophobic vents of the cartridge are preferably constructed so that the amount of air that escapes through them is maximized while minimizing the volume of the channel below the vent surface. Accordingly, it is preferable that the vent is constructed so as to have a hydrophobic membrane of large surface area and a shallow cross section of the microchannel below the vent surface. An exemplary membrane is a PTFE membrane having 0.22µ pore size. Other pore sizes are consistent with operation of the vents herein, and according to application.

Bubble removal hydrophobic vents typically have a length of at least about 2.5 mm (e.g., at least about 5 mm, at least about 7.5 mm) along a channel. The length of the hydrophobic vent is typically at least about 5 times (e.g., at least about 10 times, at least about 20 times) larger than a depth of the channel 3201 within the hydrophobic vent. For example, in some embodiments, the channel depth within the hydrophobic vent is about 300 microns or less (e.g., about 250 microns or less, about 200 microns or less, about 150 microns or less). Bubble vents are optional in the microfluidic networks of the microfluidic cartridges described herein.

The depth of the channel within the hydrophobic vent is typically about 75% or less (e.g., about 65% or less, about 60% or less) of than the depth of the channel upstream and downstream of the hydrophobic vent. For example, in some embodiments the channel depth within the hydrophobic vent is about 150 microns and the channel depth upstream and downstream of the hydrophobic vent is about 250 microns.

A width of the channel within the hydrophobic vent is typically at least about 25% wider (e.g., at least about 50% wider) than a width of the channel upstream from the vent and downstream from the vent. For example, in an exemplary embodiment, the width of the channel within the hydrophobic vent is about 400 microns and the width of the channel upstream and downstream from the vent is about 250 microns.

Figure 7:
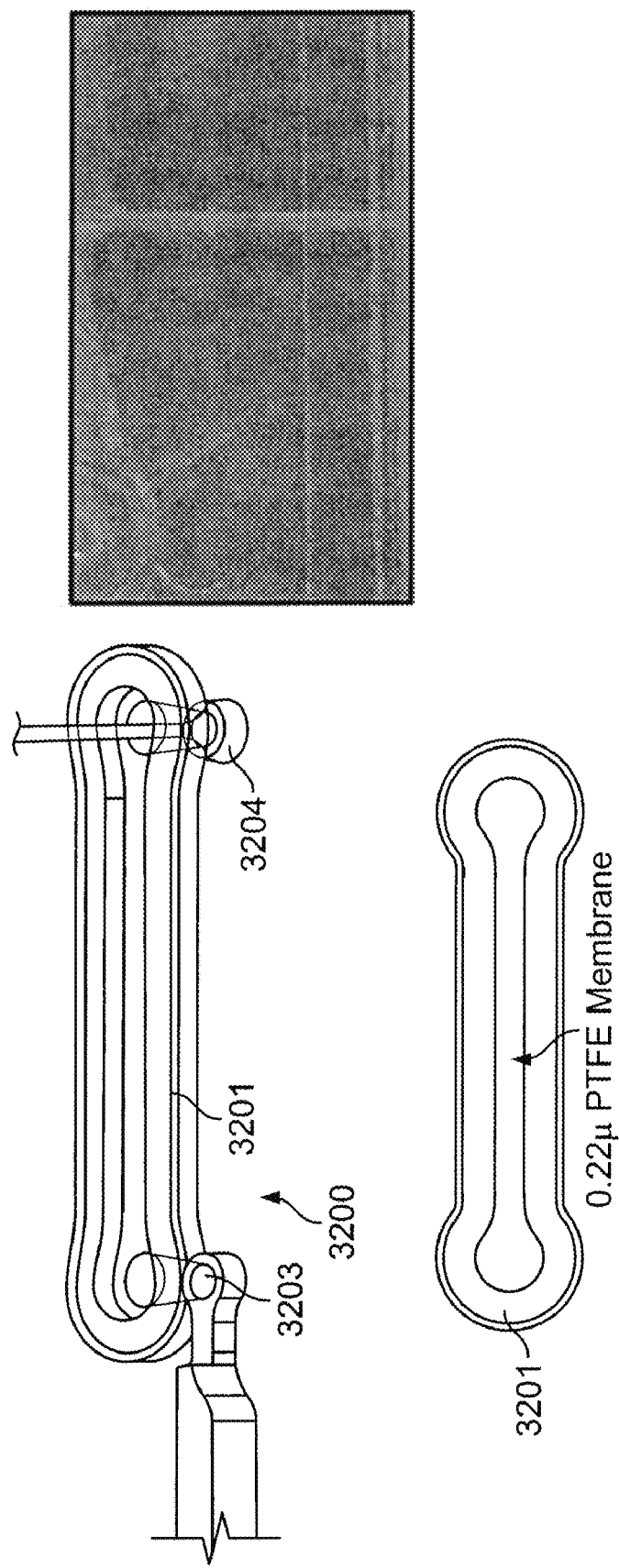
FIG. 7 shows a hydrophobic vent suitable for use in a microfluidic network described elsewhere.

The vent of FIG. 7 is a hydrophobic vent having a linear channel 3201, connected via an inlet 3203 and an outlet 3204 to the rest of the microfluidic network. The right hand panel of FIG. 7 shows the vent in top plan view, and indicates where the membrane is situated.

Manufacturing Process for Cartridge

Figure 8:
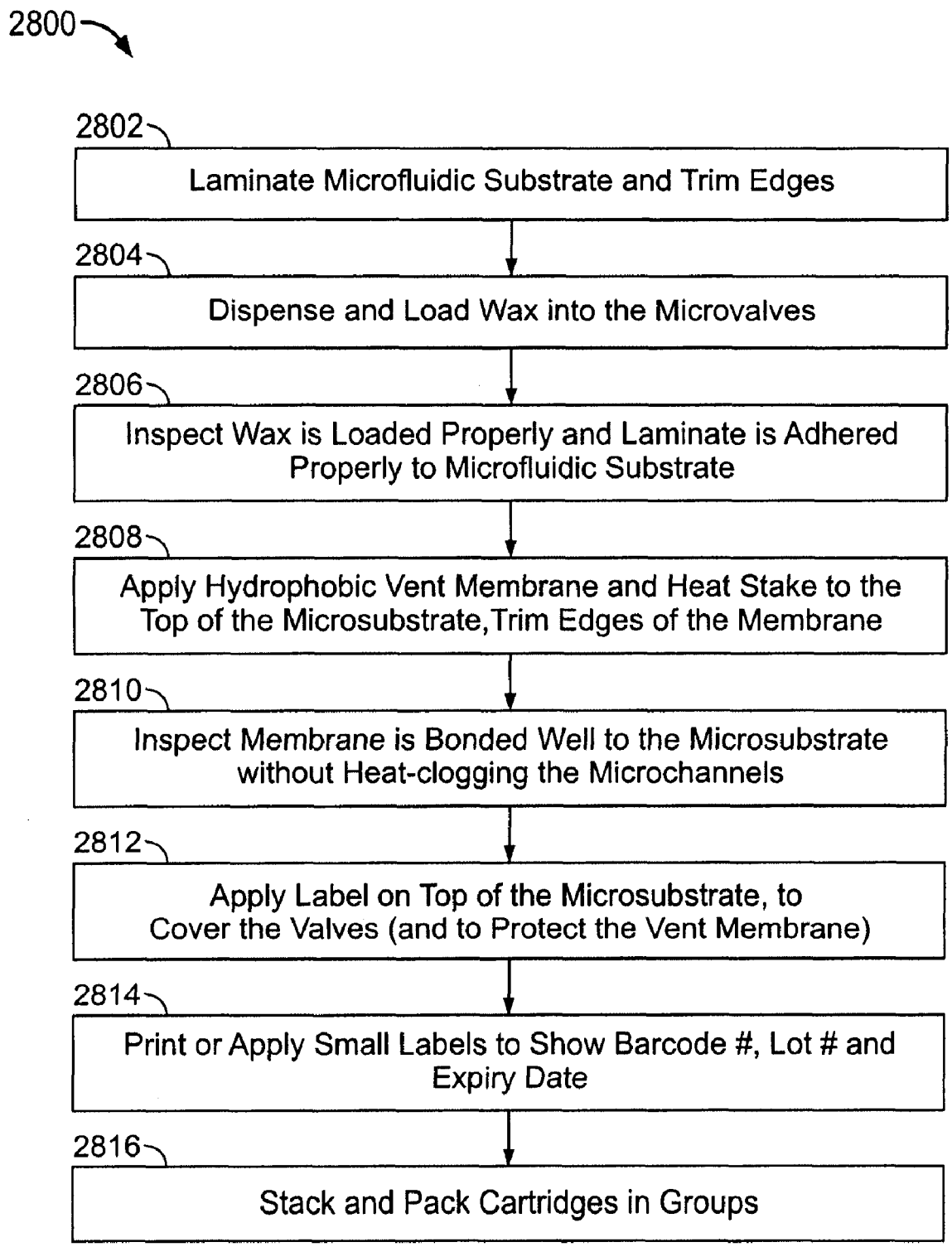
FIG. 8 shows an assembly process for a cartridge as further described herein.

FIG. 8 shows a flow-chart 2800 depicting an assembly process for an exemplary cartridge as further described herein. It would be understood by one of skill in the art, both that various steps may be performed in a different order from that set forth in FIG. 8, and additionally that any given step may be carried out by alternative methods to those set forth in the figure. It would also be understood that, where separate steps are illustrated for carrying out two or more functions, such functions may be performed synchronously and combined into single steps and still be consistent with the overall process described herein.

At 2802, a laminate layer is applied to a microfluidic substrate that has previously been engineered to have a plurality of microfluidic networks constructed in it; edges are trimmed from the laminate where they spill over the bounds of the substrate. The laminate seals in various components of the microfluidic networks.

At 2804, a thermally responsive substance such as wax is dispensed and loaded into the microvalves of the microfluidic network in the microfluidic substrate from the opposite side of the substrate to that sealed by the laminate. An exemplary process for carrying this out is further described herein.

At 2806, the cartridge is inspected to ensure that wax from 2804 is loaded properly and that the laminate from 2802 adheres properly to the microfluidic substrate. If a substrate does not satisfy either or both of these tests, it is discarded. If substrates repeatedly fail either or both of these tests, then the wax dispensing, or laminate application steps, as applicable, are reviewed.

Optionally, at 2808, for cartridge embodiments that employ a hydrophobic vent, a hydrophobic vent membrane is applied to, and heat bonded to, the top of the microfluidic substrate over the wax-loaded valves, and on the opposite face of the substrate from the laminate. Edges of the membrane that are in excess of the boundary of the substrate are trimmed.

Optionally, at 2810 if a vent membrane has been applied (2808), the assembly is inspected to ensure that the hydrophobic vent membrane is bonded well to the microfluidic substrate without heat-clogging the microfluidic channels. If any of the channels is blocked, or if the bond between the membrane and the substrate is imperfect, the assembly is discarded, and, in the case of repeated discard events, the foregoing process is reviewed.

At 2812, a label layer is applied to the top of the microfluidic substrate, situated to cover the valves. It would be understood that a multiple label parts, instead of a single layer, may be devised to fulfill both of these roles. In the embodiments in which a membrane has been affixed, the label(s) may comprise a portion that protects the vent membrane. The label typically has identifying indicia, such as a barcode, printed on it before it is applied to the top of the substrate.

At 2814 optionally, additional indicia are printed or applied to the label layer to show identifying characteristics, such as a barcode #, lot # and expiry date on the cartridge. Typically one or more of the labels has a space and a writable surface that permits a user to make an identifying annotation on the label, by hand.

At 2816, to facilitate transport and delivery to a customer, assembled and labeled cartridges are stacked and pack cartridges in groups, such as groups of 24 or 25, or groups of 10, or groups of 20, or groups of 50. Preferably the packaging is via an inert and/or moisture-free medium.

Wax Loading in Valves

Figure 9A:
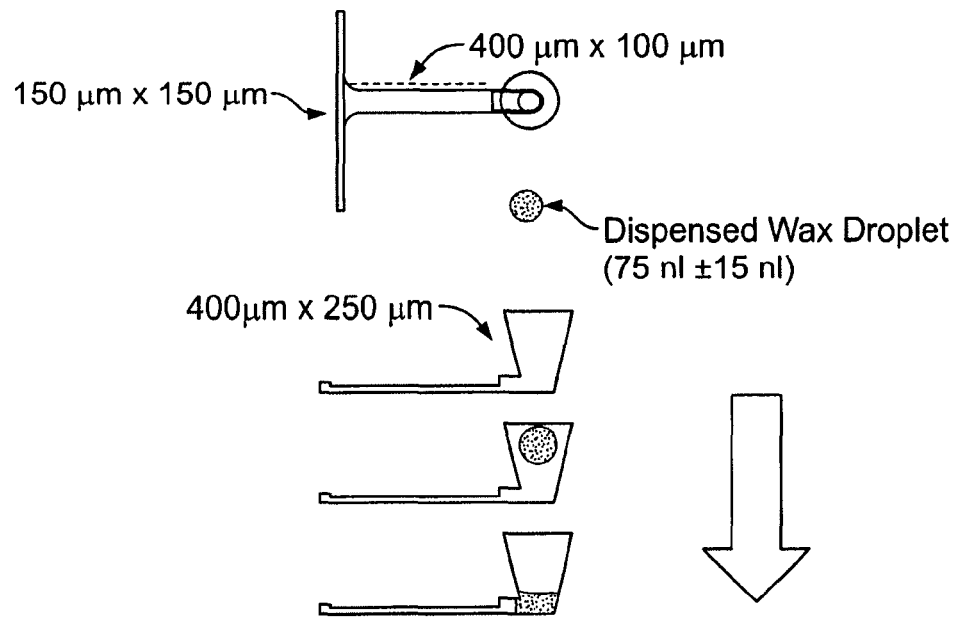
FIGS. 9A and 9B show exemplary deposition of wax droplets into microfluidic valves.
Figure 9B:
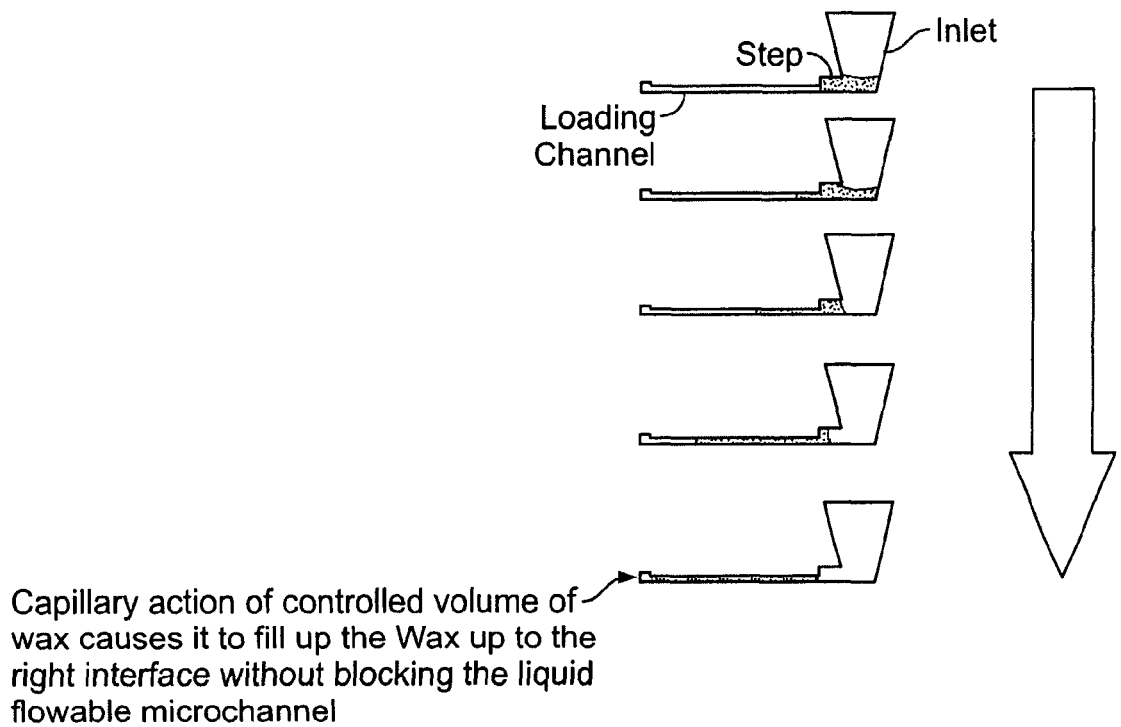

FIGS. 9A and 9B show how a combination of controlled hot drop dispensing via a heated microchannel device of the right dimensions and geometry is used to accurately load wax into a microchannel of a microfluidic cartridge to form a valve. The heated dispenser head (not shown in FIGS. 10A, 10B) can be accurately positioned over an inlet hole of the microchannel in the microfluidic device, and can dispense molten wax drops in volumes as small as 75 nanoliters with an accuracy of +/−20%. The inlet hole of the microchannel device is dimensioned in such a way that the droplet of 75 nl can be accurately shot to the bottom of the inlet hole using, for example, compressed air, or in a manner similar to an inkjet printing method, or by using a DJ-9000 manufactured by Asymtek, as further described herein.

The microchannel device is maintained at a temperature above the melting point of the wax thereby permitting the wax to stay in a molten state immediately after it is dispensed. After the drop falls to the bottom of the inlet hole, the molten wax is drawn into the narrow channel by capillary action. The volume of the narrow section is designed to be approximately equal to a maximum typical amount that is dispensed into the inlet hole.

The valve, shown in cross-section in FIGS. 9A and 9B, contains a step between the inlet and the loading channel. The step facilitates retention of the thermally responsive substance.

Exemplary Wax-Deposition Process

Figure 10A:
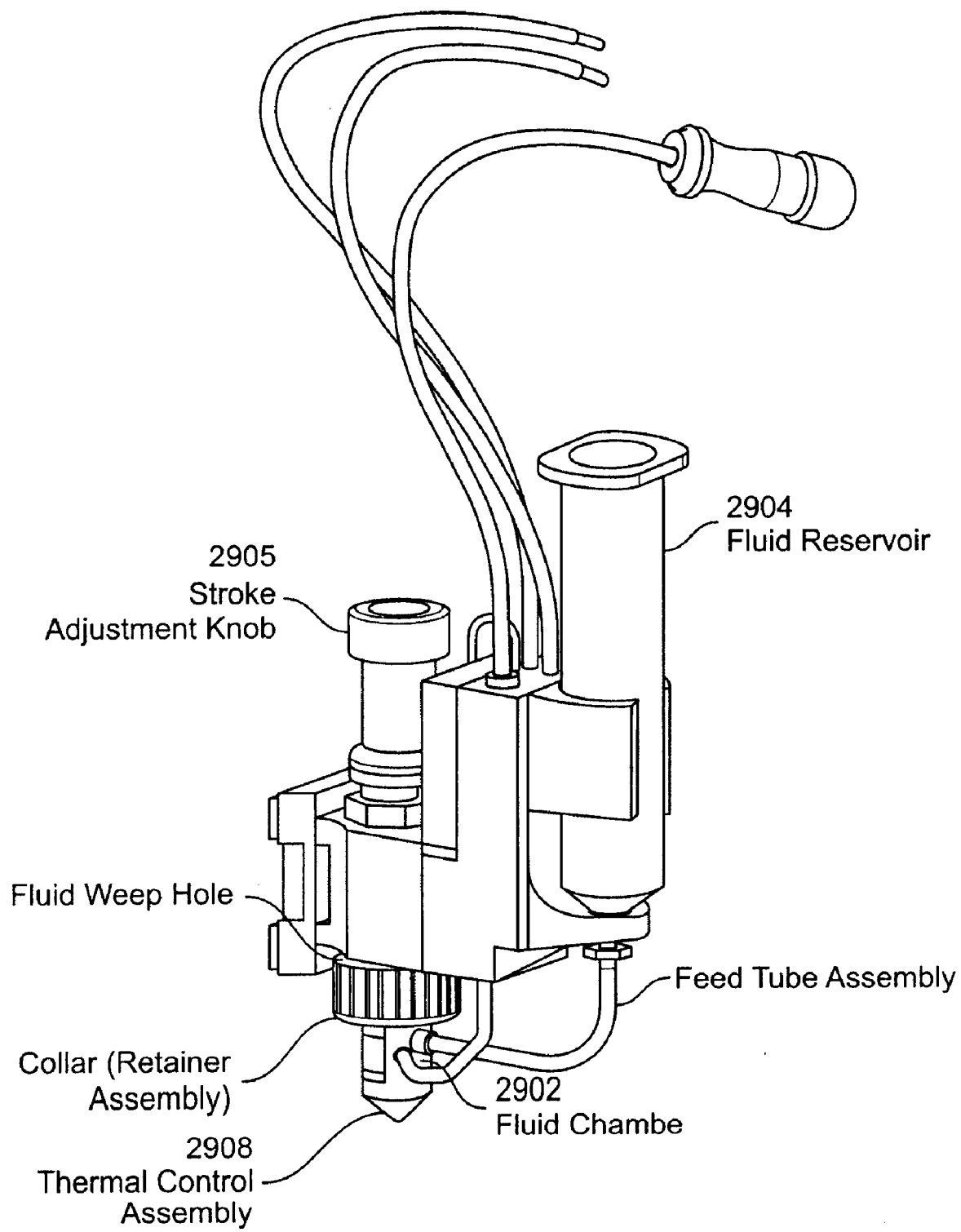
FIGS. 10A and 10B show an exemplary apparatus for carrying out wax deposition.
Figure 10B:
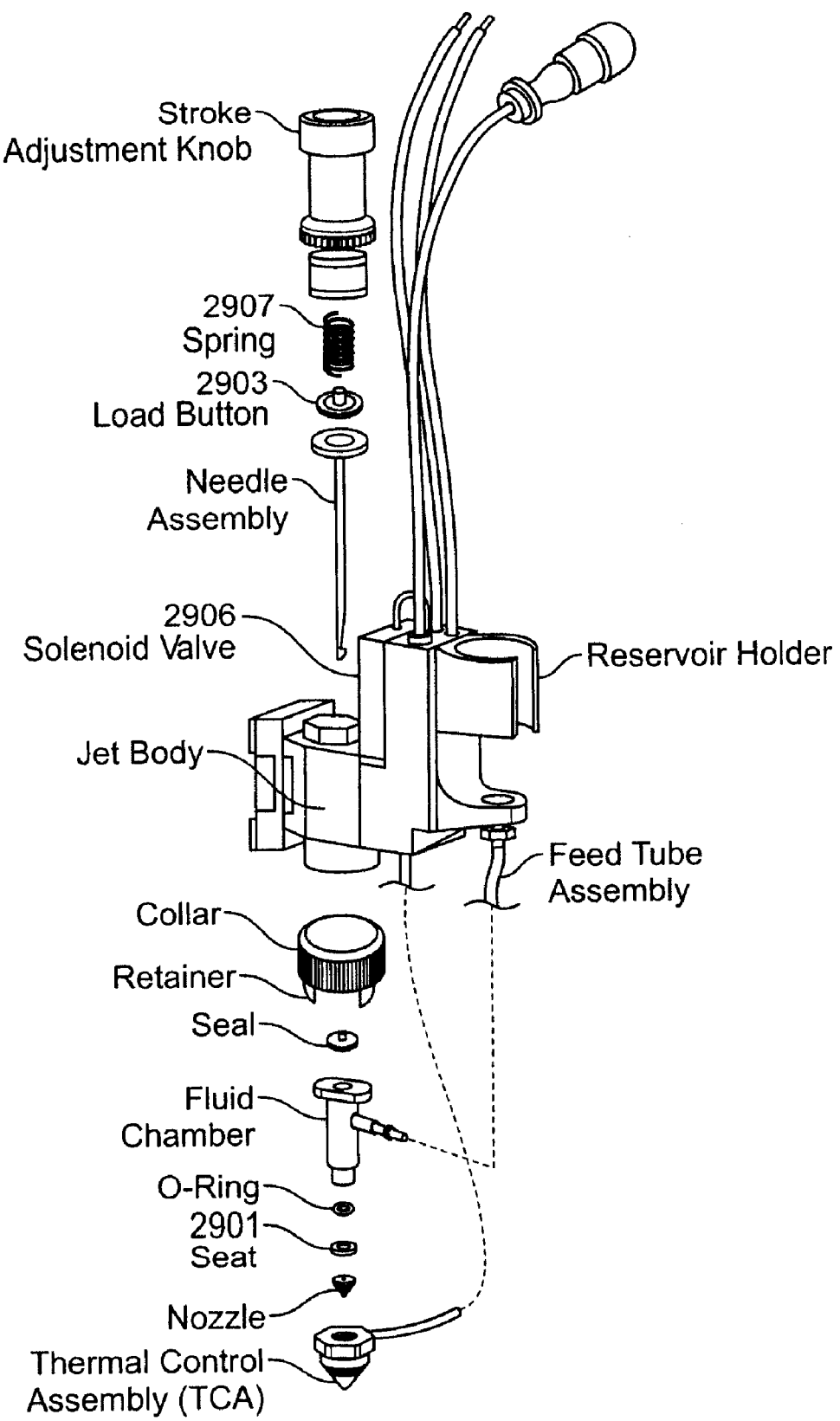

Deposition of wax in valves of the microfluidic network, as at step 2804 (FIG. 8) may be carried out with the exemplary equipment shown in FIGS. 10A and 10B. The DispenseJet Series DJ-9000, FIGS. 10A and 10B (exploded view) is a non-contact dispenser that provides high-speed delivery and exceptional volumetric control for various fluids, including surface mount adhesive, underfill, encapsulants, conformal coating, UV adhesives, and silver epoxy.

The DJ-9000 jets in tight spaces as small as 200 micrometers and creates fillet wet-out widths as small as 300 micrometers on the dispensed side of a substrate such as a die. It dispenses fluid either as discrete dots or a rapid succession of dots to form a 100-micron (4 mil) diameter stream of fluid from the nozzle. It is fully compatible with other commercially available systems such as the Asymtek Century C-718/C-720, Millennium M-2000, and Axiom X-1000 Series Dispensing Systems.

A DJ-9000 is manufactured by Asymtek under manufacturing quality control standards aim to provide precise and reliable performance. Representative specifications of the apparatus are as follows.

| Characteristic | Specification |
| --- | --- |
| Size | Width: 35 mm |
|  | Height: 110 mm |
|  | Depth: 100 mm |
| Weight | 400 grams - dry |
| Feed Tube Assembly | Nylon - Fitting |
|  | Polyurethane - Tube |
| Fluid Chamber | Type 303 Stainless Steel |
| Seat and Nozzle | 300/400 Series S/S, Carbide |
| Needle Assembly | 52100 Bearing Steel - Shaft |
|  | Hard Chrome Plate |
|  | Carbide - Tip |
| Fluid Seal | PEEK/Stainless Steel |
| Fluid Chamber O-Ring | Ethylene Propylene |
| Jet Body | 6061-T6 Aluminum |
|  | Nickel Plated |
| Needle Assembly Bearings | PEEK |
| Thermal Control Body | 6061-T6 Aluminum |
|  | Nickel Plated |
| Reservoir Holder | Acetyl |
| Reservoir Size | 5, 10, or 30 cc (0.17, 0.34, or 1.0 oz) |
| Feed Tube Assembly Fitting | Female Luer per ANSI/HIMA MD70.1-1983 |
| Maximum Cycle Frequency | 200 Hz. |
| Minimum Valve Air Pressure | 5.5 bar (80 psi) |
| Operating Noise Level | 70 db* |
| Solenoid | 24 VDC, 12.7 Watts |
| Thermal Control Heater | 24 VDC, 14.7 Watts, 40 ohms |
| Thermal Control RTD | 100 ohm, platinum |
| Maximum Heater Set Point | 80 C. |

*At Maximum Cycle Rate

The DJ-9000 has a normally closed, air-actuated, spring-return mechanism, which uses momentum transfer principles to expel precise volumes of material. Pressurized air is regulated by a high-speed solenoid to retract a needle assembly 2903 from seat 2901. Fluid, fed into the fluid chamber 2902 from the fluid reservoir 2904, flows over the seat. When the air is exhausted, the needle travels rapidly to the closed position, displacing fluid through the seat and nozzle in the form of a droplet. Multiple droplets fired in succession can be used to form larger dispense volumes and lines when combined with the motion of a dispenser robot that controls motion and positioning of the dispense head.

The equipment has various adjustable features: The following features affect performance of the DJ-9000 and are typically adjusted to fit specific process conditions.

Fluid Pressure should be set so that fluid fills to the seat, but should not be influential in pushing the fluid through the seat and nozzle. In general, higher fluid pressure results in a larger volume of material jetted.

The stroke adjustment knob 2905 controls the travel distance of the needle assembly 2903. For example, the control can be turned counterclockwise to increase needle assembly travel, or turned clockwise to decrease travel. An increase of travel distance will often result in a larger volume of material jetted.

The solenoid valve 2906 controls the valve operation. When energized, it allows air in the jet air chamber to compress a spring 2907 and thereby raise the needle assembly. When de-energized, the air is released and the spring forces the piston down so that the needle tip contacts the seat.

The seat and nozzle geometry are typically the main factors controlling dispensed material volume. The seat and nozzle size are determined based on the application and fluid properties. Other parameters are adjusted in accordance with seat and nozzle choices. Available seat and nozzle sizes are listed in the table hereinbelow.

Fluid temperature often influences fluid viscosity and flow characteristics. The DJ-9000 is equipped with a thermal control assembly 2908 that assures a constant fluid temperature.

In addition to the DJ-9000 hardware configuration and settings, Dot and Line Parameters can be set in a software program (for example, one referred to as FmNT) to control the size and quality of dots and lines dispensed.

Packaging

The microfluidic cartridge described herein may be provided in a convenient package containing multiple cartridges, and made easily accessible, but suitably protected during carriage. In some implementations, the packaging comprises a plastic pouch to protect the cartridges from moisture, but this is not a requirement. The packaging material in general comprise one or more of paper, foam, and cardboard. In some implementations, the packaging facilitates lifting a stack, such as 24 cartridges, for easy transfer into a cartridge auto-loader, as described elsewhere herein.

Apparatus Overview

The microfluidic cartridges as described herein find application to analyzing any nucleic acid containing sample for any purpose, including, but not limited to, genetic testing, and clinical testing for various infectious diseases in humans, and food testing, for example of agricultural products.

The microfluidic cartridges herein are configured for use with a diagnostic apparatus. Such an apparatus is described in U.S. patent application Ser. No. 12/173,023, filed Jul. 14, 2008, incorporated herein by reference. Salient features of such an apparatus are now described herein. However, it would be understood that cartridges such as those herein could be configured for use with other types of apparatus not otherwise described herein, for example an apparatus that is configured to just perform PCR on samples that had previously been brought into PCR-ready form by some other apparatus, or manually.

Figure 11:
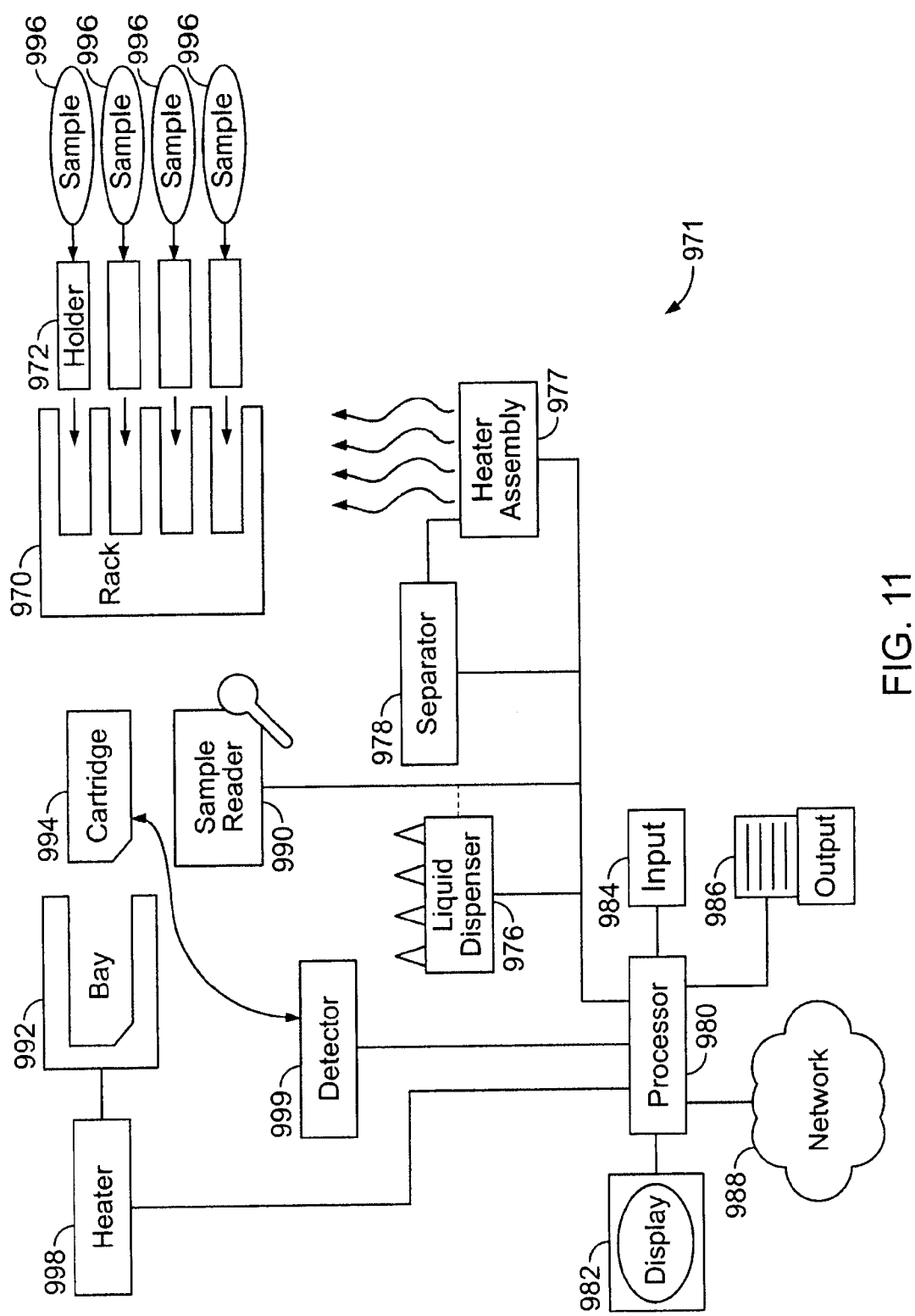
FIG. 11 shows a schematic of a diagnostic apparatus.

The apparatus of FIG. 11 is configured to act on a disposable microfluidic cartridge containing multiple sample lanes in parallel, and comprises a reusable instrument platform that can actuate on-cartridge operations, can detect and analyze the products of the PCR amplification in each of the lanes separately, in all simultaneously, or in groups simultaneously, and, optionally, can display the results on a graphical user interface.

A schematic overview of an apparatus 981 for carrying out automated sample preparation and diagnostic testing on multiple samples in parallel, according to steps exemplified elsewhere herein, is shown in FIG. 11. The geometric arrangement of the components of system 981 is exemplary and not intended to be limiting. In overview, multiple samples are introduced into the apparatus and individually placed into a form suitable for applying PCR to amplify one or nucleotides contained therein. The PCR-ready samples are transferred to a microfluidic cartridge that is acted on by the apparatus and caused to amplify nucleotides in the samples by carrying out PCR thereon, whilst in the cartridge. Results of the amplifications can be detected while the amplified nucleotides are in the cartridge.

A processor 980, such as a microprocessor, is configured to control functions of various components of the system as shown, and is thereby in communication with each such component requiring control, for example via a bus. It is to be understood that many such control functions can optionally be carried out manually, and not under control of the processor. Furthermore, the order in which the various functions are described, in the following, is not limiting upon the order in which the processor executes instructions when the apparatus is operating. A suitable processor 980 can be designed and manufactured according to, respectively, design principles and semiconductor processing methods known in the art.

Processor 980 can be configured to accept user instructions from an input device 984, where such instructions may include instructions to start analyzing the sample, and choices of operating conditions. Processor 980 can be also configured to communicate with a display 982, so that, for example, information about an analysis is transmitted to the display and thereby communicated to a user of the system. Such information includes but is not limited to one or more of: the current status of the apparatus; progress of PCR thermocycling; and a warning message in case of malfunction of either system or cartridge. Additionally, processor 980 may transmit one or more questions to be displayed on display 982 that prompt a user to provide input in response thereto. Thus, in certain embodiments, input 984 and display 982 are integrated with one another.

Processor 980 can be optionally further configured to transmit results of an analysis to an output device 986 such as a printer, a visual display such as display 982 or a second display, a display that utilizes a holographic projection, or a speaker, or a combination thereof. Processor 980 can be still further optionally connected via a communication interface such as a network interface to a computer network 988.

Processor 980 can be further configured to control various aspects of sample preparation and diagnosis, as follows in overview. In FIG. 1, the apparatus 981 is configured to operate in conjunction with a complementary rack 970. Apparatus 981 may be capable of receiving multiple racks, such as 1, 2, 3, 4, or 6 racks.

Embodiments of rack 970 are further described in U.S. patent application Ser. Nos. 12/173,023, filed by Express Mail on Jul. 14, 2008 (and entitled "Integrated Apparatus for Performing Nucleic Acid Extraction and Diagnostic Testing on Multiple Biological Samples", in the name of Williams, et al.), and 12/178,584, filed on Jul. 23, 2008, and entitled "Rack For Sample Tubes And Reagent Holders", in the name of Duffy, et al., both of which are incorporated herein by reference in their entireties. A rack 970 is itself configured to receive a number of biological samples 996, such as nucleic-acid containing samples, in a form suitable for work-up and subsequent diagnostic analysis, and a number of holders 972—as further described herein, such as in connection with FIG. 2, that are equipped with various reagents, pipette tips and receptacles. The rack is configured so that, during sample work-up, samples are processed in the respective holders, the processing including being subjected, individually, to heating and cooling via heater assembly 977.

The heating functions of the heater assembly 977 can be controlled by the processor 980. Heater assembly 977 operates in conjunction with a separator 978, such as a magnetic separator, that also can be controlled by processor 980 to move into and out of close proximity to one or more processing chambers associated with the holders 972, wherein particles such as magnetic particles are present. Assembly 977 and separator 978 are further described in U.S. patent application Ser. No. 12/178,586, filed on Jul. 23, 2008, and entitled "Integrated Heater and Magnetic Separator", in the name of Handique, which is incorporated herein by reference in its entirety.

Processor 980 can be configured to receive data about a sample to be analyzed, e.g., from a sample reader 990, which may be a barcode reader, an optical character reader, or an RFID scanner (radio frequency tag reader). Thus, sample reader 990 is configured to transmit identifying indicia about the sample, and in some instances the holder, to processor 980. In some embodiments, the sample reader is movable from one sample position to another. In some embodiments a sample reader is attached to the liquid dispenser 976 and can thereby read indicia about a sample above which the liquid dispenser is situated. In other embodiments the sample reader is not attached to the liquid dispenser and is independently movable, under control of the processor.

Liquid dispenser 976, which similarly can be controlled by processor 980 and is further described herein, is configured to carry out various suck and dispense operations on respective samples in rack 970, and fluids and reagents in the holders 972, to achieve extraction of nucleic acid from the samples. Liquid dispenser 976 can carry out such operations on multiple holders simultaneously, and is further described herein.

In the embodiment of a diagnostic apparatus shown in FIG. 1, a cartridge 994 is received in bay 992. The receiving bay is in communication with a heater 998 that itself can be controlled by processor 980 in such a way that specific regions of the cartridge 994 are heated at specific times during analysis. Liquid dispenser 976 is configured to take aliquots of fluid containing nucleic acid extracted from one or more samples and direct them to one or more respective inlets in cartridge 994. Cartridge 994 is configured to amplify, such as by providing chambers for carrying out PCR on, the respective nucleic acids. The processor is also configured to control and receive data from a detector 999 that receives an indication of a diagnosis from the cartridge 994. The diagnosis can be transmitted to the output device 986 and/or the display 982, as described hereinabove.

Embodiments of the apparatus shown in outline in FIG. 1, as with other exemplary embodiments described herein, are advantageous because they do not require locations within the apparatus suitably configured for storage of reagents. Therefore, the apparatus in FIG. 1 is self-contained and operates in conjunction with holders 972 and cartridges 994, wherein the holders are pre-packaged with reagents, such as in locations within it dedicated to reagent storage, and wherein the cartridges are supplied with separately packaged PCR reagents appropriate for mixing with PCR-ready sample, prior to introduction into the cartridge.

The apparatus of FIG. 1 may be configured to carry out operation in a single location, such as a laboratory setting, or may be portable so that they can accompany, e.g., a physician, or other healthcare professional, who may visit patients at different locations. The apparatus is typically provided with a power-cord so that it can accept AC power from a mains supply or generator. The apparatus may also be configured to operate by using one or more batteries and therefore is also typically equipped with a battery recharging system, and various warning devices that alert a user if battery power is becoming too low to reliably initiate or complete a diagnostic analysis.

The apparatus of FIG. 1 may further be configured, in other embodiments, for multiplexed sample analysis and/or analysis of multiple batches of samples, where, e.g., a single rack holds a single batch of samples. Each component shown in FIG. 1 may therefore be independently present as many times as there are batches of samples (or some fraction thereof), though the multiple instances of the various components may be configured in a common housing.

In various embodiments, preparation of a PCR-ready sample for use in subsequent diagnosis using the apparatus as further described herein can include one or more of the following steps: contacting a neutralized polynucleotide sample with a PCR reagent mixture comprising a polymerase enzyme and a plurality of nucleotides (in some embodiments, the PCR reagent mixture can further include a positive control plasmid and a fluorogenic hybridization probe selective for at least a portion of the plasmid); in some embodiments, the PCR reagent mixture can be in the form of one or more lyophilized pellets, as stored in a receptacle on a holder, and the method can further include reconstituting the PCR pellet with liquid to create a PCR reagent mixture solution.

The apparatus herein can be configured to run on a laboratory benchtop, or similar environment, and can test approximately 45 samples per hour when run continuously throughout a normal working day. Results from individual raw samples are typically available in less than 1 hour.

Figure 12A:
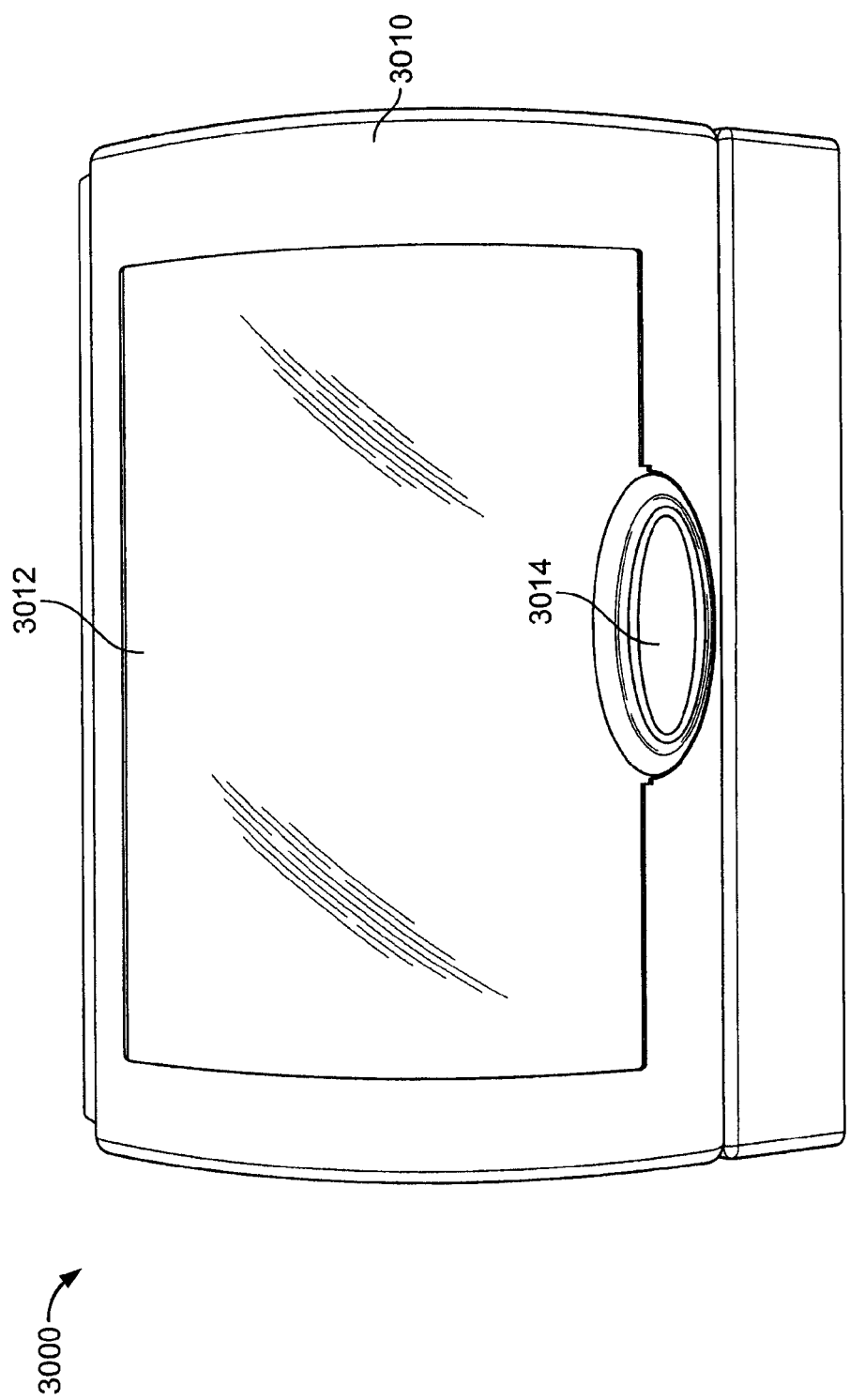
FIGS. 12A and 12B show exterior views of an exemplary apparatus.
Figure 12B:
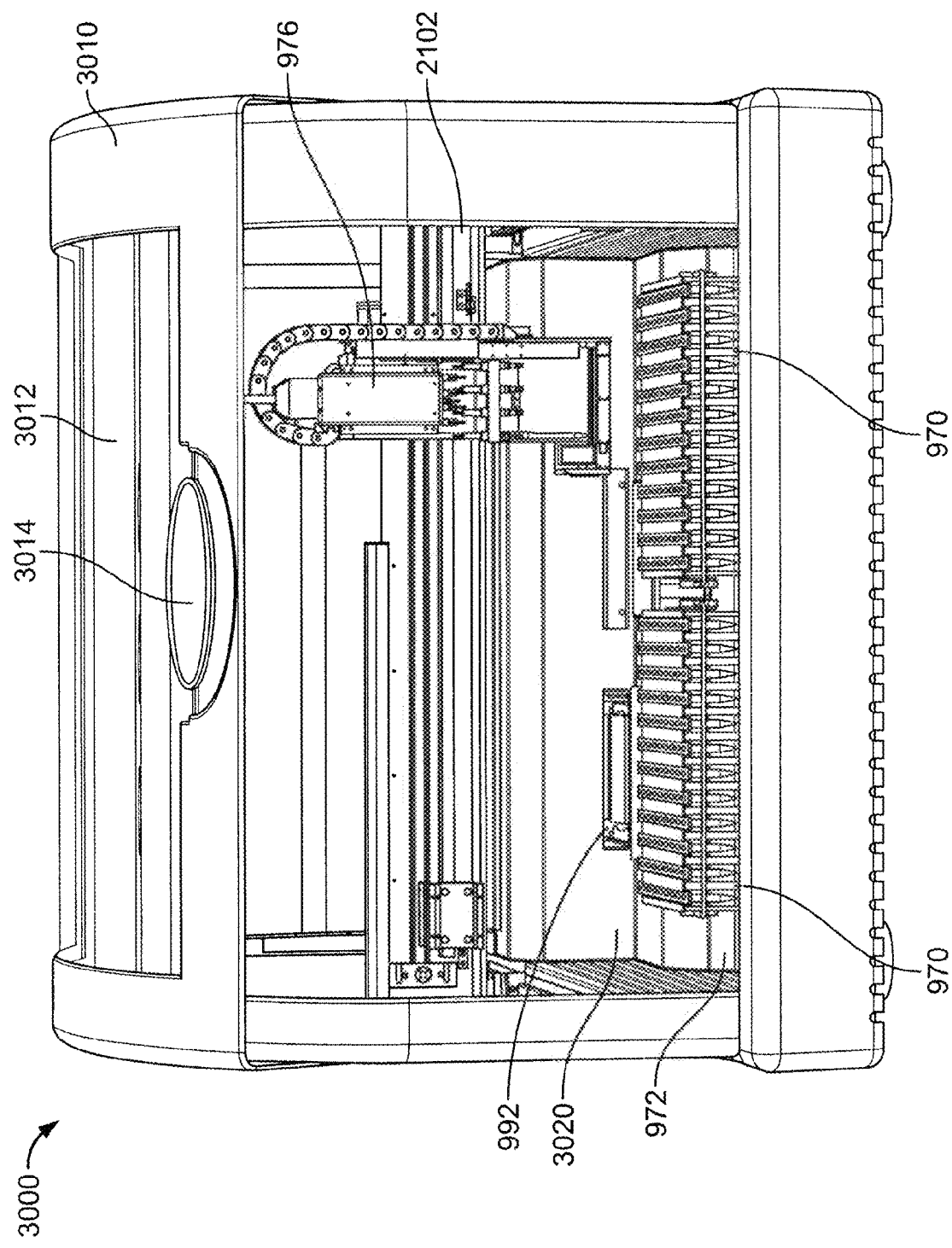

FIGS. 12A and 12B show views of an exemplary diagnostic apparatus 3000 incorporating various elements of FIG. 11. Shown in FIG. 12A, a front plan view of apparatus 3000 has a hinged cover 3010, shown in a closed position, bearing an optional clear window 3012 (that provides a user with an at-a-glance indication of the apparatus' status) and a handle 3014 that facilitates opening and closing of the cover.

Shown in FIG. 12B is a front plan view of apparatus 3000 with cover 3010 moved to an open position revealing certain elements of the interior 3020 of the apparatus. Aspects of the interior of the apparatus that are visible in the view of FIG. 12B include: two removable racks 970, each bearing 12 holders 972, a liquid dispenser 976, mounted on a gantry 2102, and a receiving bay 992 for holding a microfluidic cartridge, as further described herein.

Various aspects of an apparatus configured for use with a microfluidic cartridge are now further described.

Cartridge Receiving Bay

In some embodiments, an apparatus includes a bay configured to selectively receive a microfluidic cartridge, at least one heat source thermally coupled to the bay and coupled to a processor as further described herein, such that the heat source is configured to heat individual sample lanes in the cartridge, and the processor is configured to control application of heat to the individual sample lanes, separately, in all simultaneously, or in groups simultaneously.

In various embodiments, the microfluidic networks in the cartridge can be configured to couple heat from an external heat source, such as in the receiving bay, to a sample mixture comprising PCR reagent and PCR-ready, such as neutralized, polynucleotide sample and caused to undergo thermal cycling conditions suitable for creating PCR amplicons from the PCR-ready sample.

Figure 13:
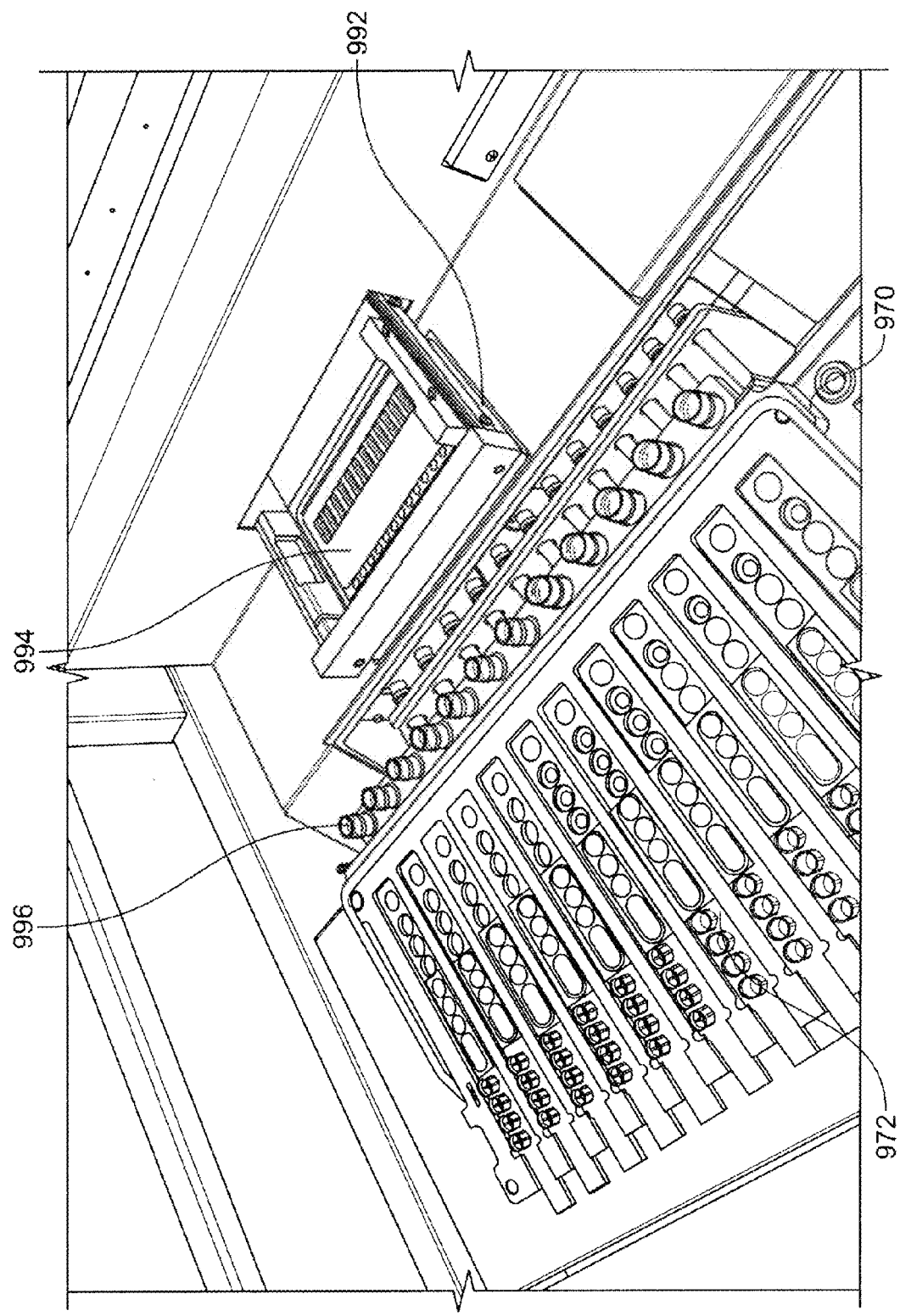
FIG. 13 shows an exemplary interior view of an apparatus, illustrating a cartridge receiving bay.

FIG. 13 shows an interior view of an exemplary apparatus, showing a rack holding a number of sample tubes and reagent holders, and a cartridge 994 situated in receiving bay 992.

Figure 14:
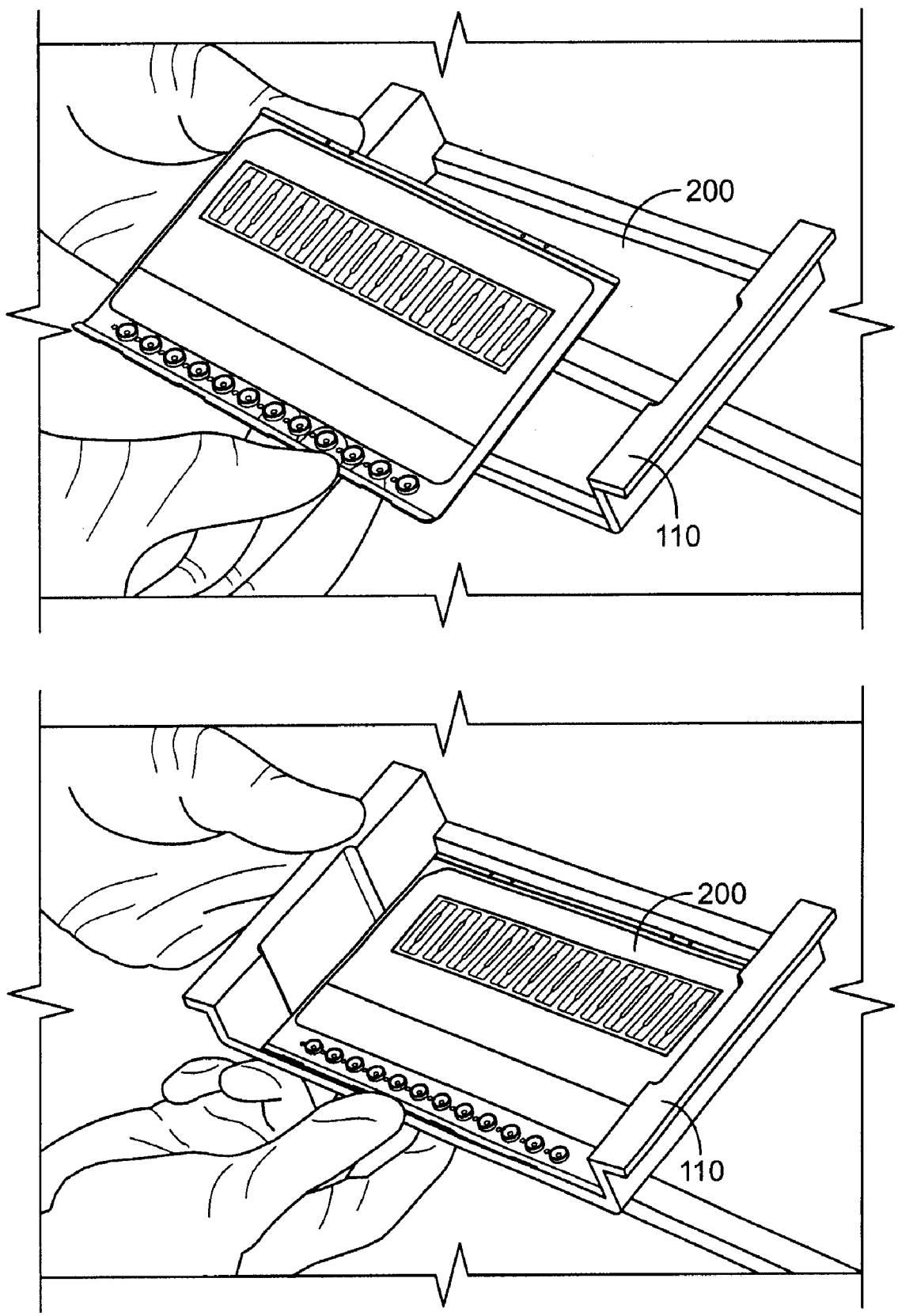
FIG. 14 shows a microfluidic cartridge, and a cartridge tray.

FIG. 14 shows a perspective view of an exemplary cartridge 200 that contains multiple sample lanes, and a removeable receptacle shown as tray 110 that, optionally, can accommodate cartridge 200 prior to insertion of the cartridge in a receiving bay in an apparatus. Tray 110 makes it easier for the user to place the cartridge into a receiving bay such as in a diagnostic apparatus. Alignment of the cartridge into a removeable receptacle such as tray 110 is often easier than trying to seat the cartridge directly into a recessed area. Thus, tray 110 typically has a registration member that engages with a registration member, such as a notch or corner-cut-out, on the cartridge, and tray 110 also has raised portions that can be held in a user's hand during placement and removal of the tray+cartridge into a receiving bay. Tray 110 is also typically configured so that it holds the cartridge but structural elements of the tray do not interpose themselves between the cartridge and, e.g., a detector or a heating element, when the cartridge is in use.

The bay can be a portion of the apparatus that is configured to selectively receive the microfluidic cartridge. For example, the bay and the microfluidic cartridge can be complementary in shape so that the microfluidic cartridge is selectively received in, e.g., a single orientation. For example, the microfluidic cartridge can have a registration member that fits into a complementary feature of the bay. The registration member can be, for example, a cut-out on an edge of the cartridge, such as a corner that is cut-off, or one or more notches that are made on one or more of the sides. By selectively receiving the cartridge, the bay can help a user to place the cartridge so that the apparatus can properly operate on the cartridge. In this way, error-free alignment of cartridges can be achieved. Moreover, the cartridge can be designed to be slightly smaller than the receiving bay by approximately 200-300 micron for easy placement and removal of the cartridge. The apparatus can further include a sensor configured to sense whether the microfluidic cartridge is selectively received The bay can also be configured so that various components of the apparatus that can operate on the microfluidic cartridge (heat sources, detectors, force members, and the like) are positioned to properly operate on the microfluidic cartridge while the cartridge is received in the bay. For example, a contact heat source can be positioned in the bay such that it can be thermally coupled to a distinct location at a microfluidic cartridge that is selectively received in the receiving bay.

Alternatively, in connection with alignment of microheaters in the heater module with corresponding heat-requiring microcomponents (such as valves, pumps, gates, reaction chambers, etc), the microheaters can be designed to be slightly bigger than the heat requiring microfluidic components so that even though the cartridge may be off-centered from the heater, the individual microfluidic components can still function effectively.

The heat source can be, for example, a heat source such as a resistive heater or network of resistive heaters, a reversible heat source such as a liquid-filled heat transfer circuit or a thermoelectric element, a radiative heat source such as a xenon lamp, and the like.

In preferred embodiments, the at least one heat source can be a contact heat source selected from a resistive heater (or network thereof), a radiator, a fluidic heat exchanger and a Peltier device. The contact heat source can be configured at the receiving bay to be thermally coupled to one or more distinct locations of a microfluidic cartridge received in the bay, whereby the distinct locations are selectively heated. At least one additional contact heat source can be included, wherein the contact heat sources are each configured at the bay to be independently thermally coupled to a different distinct location in a microfluidic cartridge received in the bay, whereby the distinct locations are independently heated. The contact heat source can be configured to be in direct physical contact with a distinct location of a microfluidic cartridge received in the bay. In various embodiments, each contact source heater can be configured to heat a distinct location having an average diameter in 2 dimensions from about 1 millimeter (mm) to about 15 mm (typically about 1 mm to about 10 mm), or a distinct location having a surface area of between about 1 $mm^2$ about 225 $mm^2$ (typically between about 1 $mm^2$ and about 100 $mm^2$, or in some embodiments between about 5 $mm^2$ and about 50 $mm^2$).

In various embodiments, at least one heat source can be a radiative heat source configured to direct heat to a distinct location of a microfluidic cartridge received in the receiving bay. The bottom surface of the cartridge typically mates with the heating surface to form a snug fit.

In various embodiments, the apparatus includes one or more force members that are configured to apply force to thermally couple the at least one heat source to at least a portion of the microfluidic cartridge received in the bay. The one or more force members can be configured to operate a mechanical member at the microfluidic cartridge. Typically the mechanical member at the cartridge is held in place by a motor that applies pressure to the member. In some embodiments, a force member can be manually operated. At least one force member can be mechanically coupled to a lid at the receiving bay, whereby operation of the lid operates the force member. In various embodiments, the force applied by the motor or the one or more force members can result in an average pressure at an interface between a portion of the receiving bay and a portion of the microfluidic cartridge of about 1 psi. The application of force is important to ensure consistent thermal contact between the heater wafer and the PCR reactor and microvalves in the microfluidic cartridge.

In various embodiments, the apparatus can further include a lid at the receiving bay, the lid being operable to at least partially exclude ambient light from the bay. The lid can be, for example, a sliding lid but is more typically a hinged, sprung, or motor operated lid that comes down on the cartridge from above. The lid can include the optical detector. A major face of the lid at the bay can vary from planarity by less than about 100 micrometers, for example, less than about 25 micrometers. The lid can be configured to be removable from the apparatus. The lid can include a latching member that ensures that the lid is securely closed before amplification reactions are applied to the samples in the cartridge.

Figure 15:
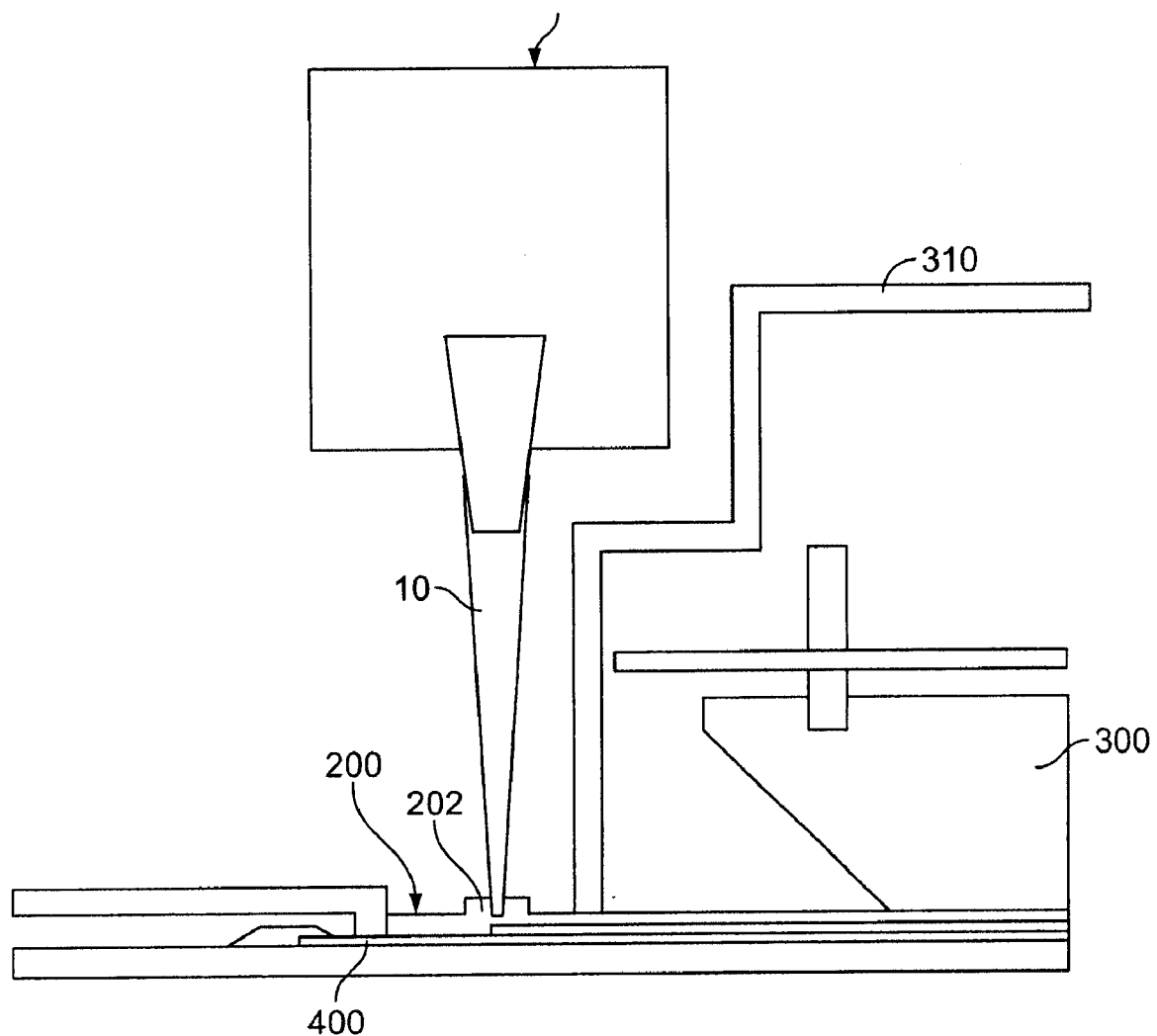
FIG. 15 shows a cross-section of a pipetting head and a cartridge in position in a microfluidic apparatus.

FIG. 15 shows a schematic cross-sectional view of a part of an apparatus as described herein, showing input of sample into an inlet 202 of cartridge 200 via a pipette tip 10 (such as a disposable pipette) attached to an automated dispensing head. Although not shown, there are as many inlets 202 as samples to be input into cartridge 200. Inlet 202 is preferably configured to receive a pipette or the bottom end of a PCR tube and thereby accept sample for analysis with minimum waste, and with minimum introduction of air. Cartridge 200 is disposed on top of and in contact with a heater substrate 400. Read head 300 is positioned above cartridge 200 and a cover for optics 310 restricts the amount of ambient light that can be detected by the read head.

The detector can be, for example, an optical detector, as further described herein. For example, the detector can include a light source that selectively emits light in an absorption band of a fluorescent dye, and a light detector that selectively detects light in an emission band of the fluorescent dye, wherein the fluorescent dye corresponds to a fluorescent polynucleotide probe or a fragment thereof. Alternatively, for example, the optical detector can include a bandpass-filtered diode that selectively emits light in the absorption band of the fluorescent dye and a bandpass filtered photodiode that selectively detects light in the emission band of the fluorescent dye; or for example, the optical detector can be configured to independently detect a plurality of fluorescent dyes having different fluorescent emission spectra, wherein each fluorescent dye corresponds to a fluorescent polynucleotide probe or a fragment thereof; or for example, the optical detector can be configured to independently detect a plurality of fluorescent dyes at a plurality of different locations on a microfluidic cartridge, wherein each fluorescent dye corresponds to a fluorescent polynucleotide probe or a fragment thereof in a different sample.

Advantageously, in some embodiments the receiving bay design allows easy placement of the microfluidic cartridge, such as by a user, or an auto-loading device as further described herein. Such a design also accommodates multiple sample pipetting of liquid using a robotic dispenser, and optical detection in situ. Furthermore, it is typically easier to move a cartridge and heater in and out of position than a detector.

Heater Configurations to Ensure Uniform Heating of a Region

Another aspect of the apparatus described herein relates to uniform control of the heating of a region of a microfluidic network, the region including to one or more microfluidic components. In an exemplary embodiment, multiple heaters can be configured to simultaneously and uniformly heat a region, such as the PCR reaction zone, of a microfluidic network in the microfluidic cartridge.

In preferred embodiments, a microfluidic cartridge having one or more microfluidic networks, each comprising one or more microfluidic components, is brought into contact with a heat source, within a suitably configured apparatus. The heat source is configured so that particular heating elements are situated to heat specific components of the microfluidic networks of the cartridge.

Figure 16:
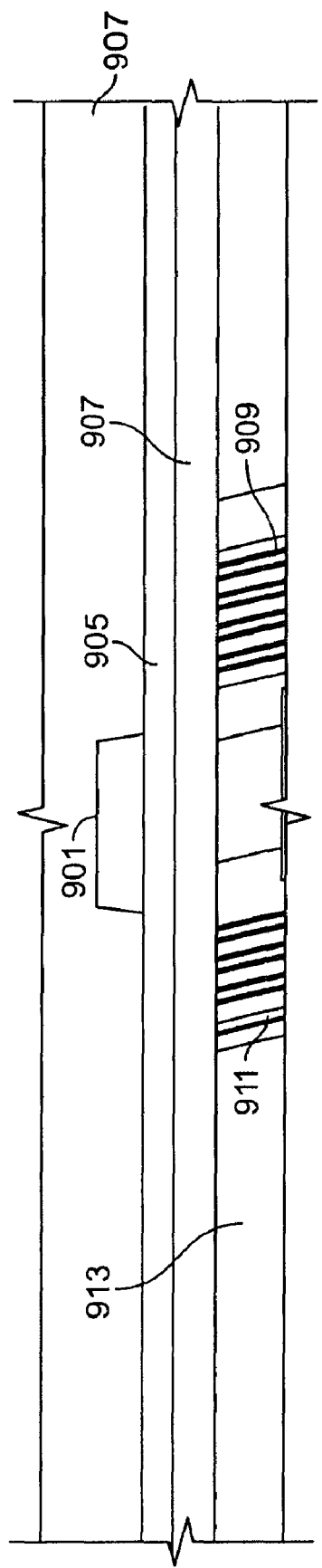
FIG. 16 shows a view in cross-section of a microfluidic cartridge situated in a receiving bay, adjacent a heater unit.

FIG. 16 shows a cross-sectional view of an exemplary microfluidic cartridge, situated in a receiving bay, to show relative location of PCR chamber 901 in relation to the heaters when the cartridge is placed in the instrument. PCR chamber 901 is shown in a substrate layer 907 of the cartridge. A laminate layer 905 of the cartridge is directly under the PCR chamber 901.

Two long heaters 909 and 911 that run alongside (when viewed from above) PCR chamber 901 are situated in a substrate layer 913 of the receiving bay, directly under and in contact with the laminate layer of the cartridge. The heaters are photolithographically defined and etched metal layers of gold (typically about 3,000 Å thick). Layers of 400 Å of TiW are deposited on top and bottom of the gold layer to serve as an adhesion layer. The substrate used can be a glass, fused silica, or quartz wafer having a thickness of 0.2-1 mm, such as 0.4 mm, 0.5 mm or 0.7 mm, or 1 mm. A thin electrically-insulative layer of 2 µm silicon oxide serves as an insulative layer on top of the metal layer. Additional thin electrically insulative layers such as 2-4 µm of parylene may also be deposited on top of the silicon oxide surface.

Figure 17A:
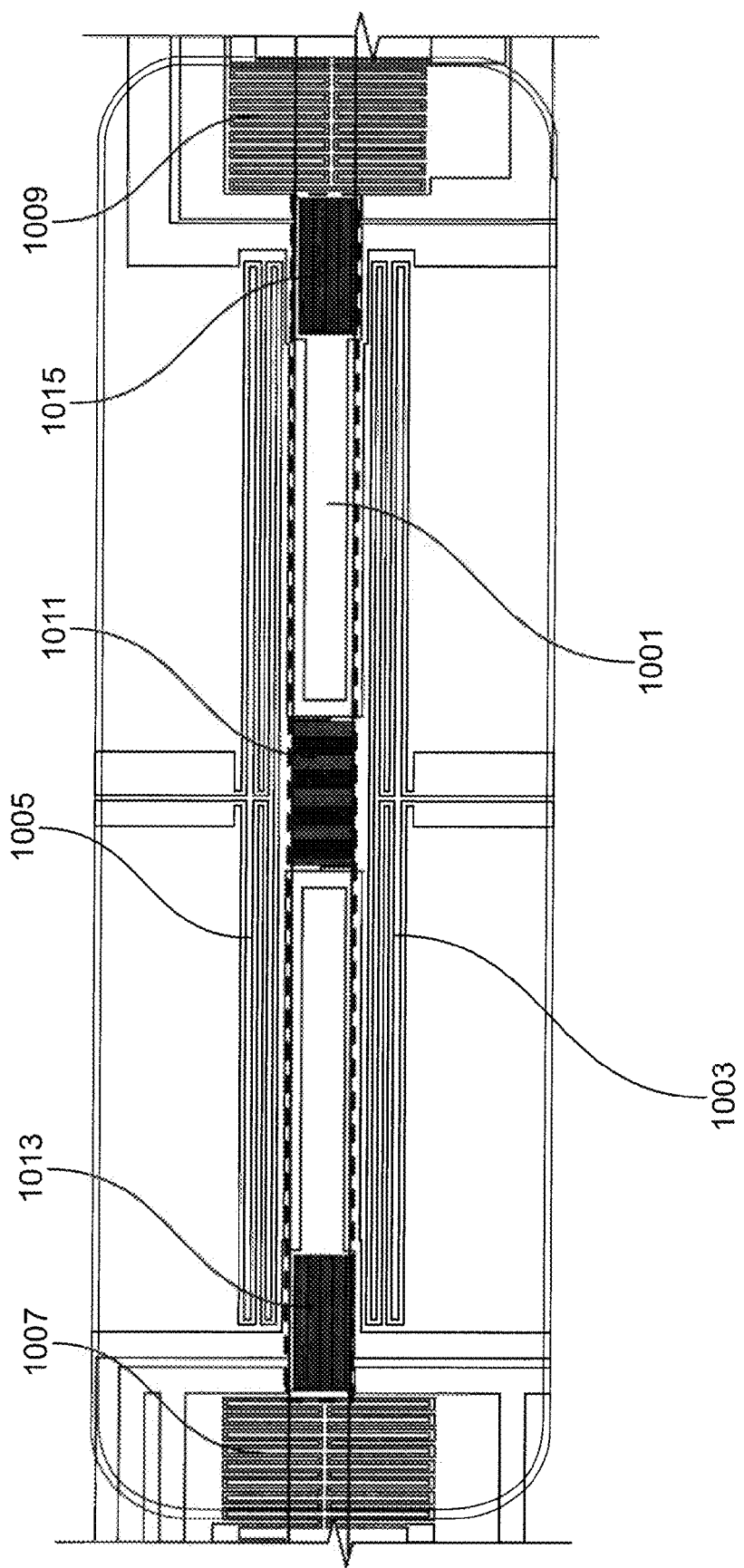
FIGS. 17A, 17B show a PCR reaction chamber and associated heaters.
Figure 17B:
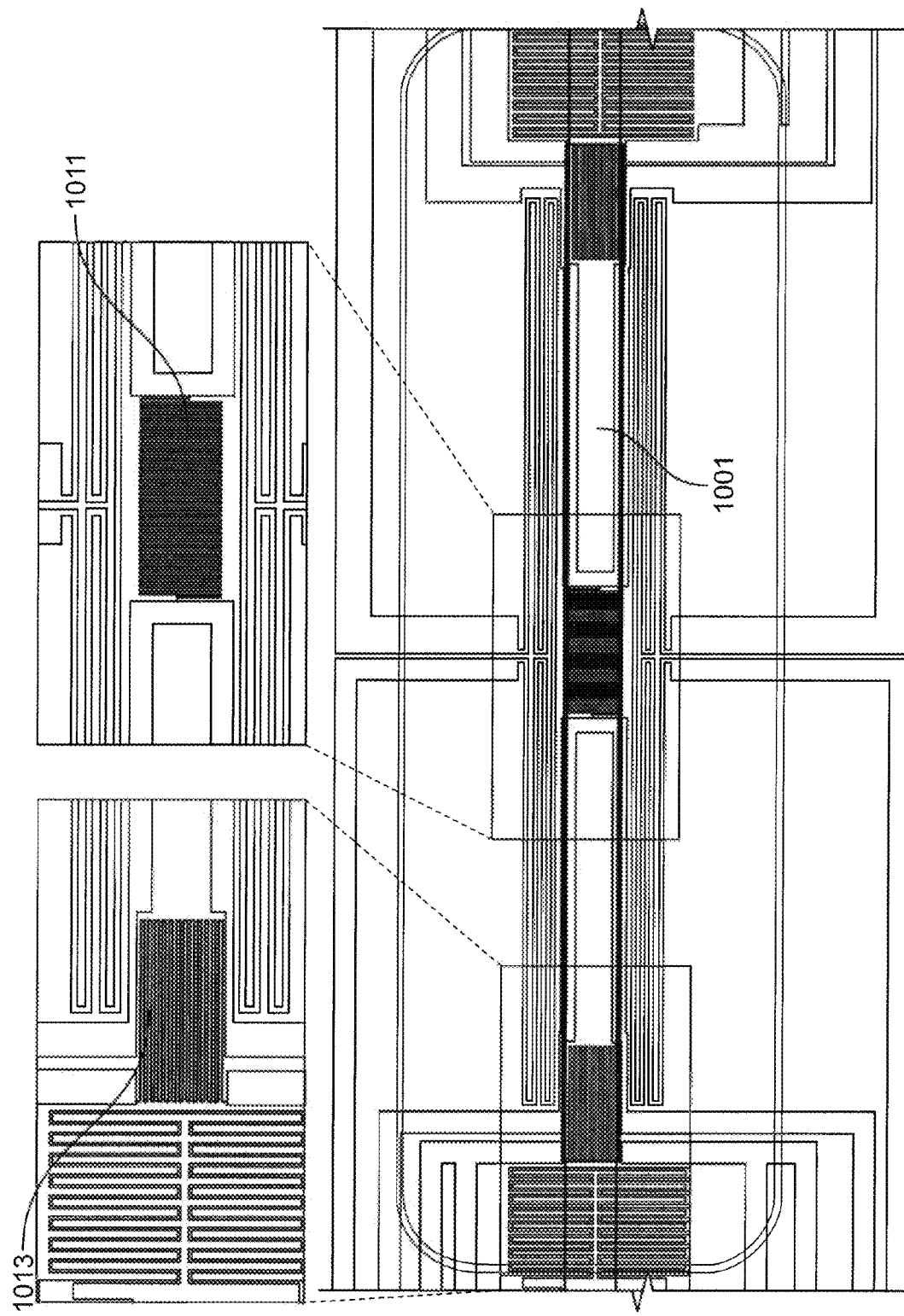

Referring to FIGS. 17A and 17B, the PCR reaction chamber 1001 is configured with a long side and a short side, each with an associated heating element. The apparatus therefore preferably includes four heaters disposed along the sides of, and configured to heat, the PCR reaction zone: long top heater 1005, long bottom heater 1003, short left heater 1007, and short right heater 1009. The small gap between long top heater 1005 and long bottom heater 1003 results in a negligible temperature gradient (less than 1° C. across the width of the PCR channel at any point along the length of the PCR reaction zone) and therefore an effectively uniform temperature throughout the PCR reaction zone. The heaters on the short edges of the PCR reactor provide heat to counteract the gradient created by the two long heaters from the center of the reactor to the edge of the reactor.

It would be understood by one of ordinary skill in the art that still other configurations of one or more heater(s) situated about a PCR reaction zone are consistent with the methods and apparatus described herein. For example, a 'long' side of the reaction zone can be configured to be heated by two or more heaters. Specific orientations and configurations of heaters are used to create uniform zones of heating even on substrates having poor thermal conductivity because the poor thermal conductivity of glass, or quartz, or fused silica substrates is utilized to help in the independent operation of various microfluidic components such as valves and independent operation of the various PCR lanes.

In preferred embodiments, each heater has an associated temperature sensor. In the embodiment of FIG. 17A, a single temperature sensor 1011 is used for both long heaters. A temperature sensor 1013 for short left heater, and a temperature sensor 1015 for short right heater are also shown. The temperature sensor in the middle of the reactor is used to provide feedback and control the amount of power supplied to the two long heaters, whereas each of the short heaters has a dedicated temperature sensor placed adjacent to it in order to control it. As further described herein, temperature sensors are preferably configured to transmit information about temperature in their vicinity to the processor at such times as the heaters are not receiving current that causes them to heat. This can be achieved with appropriate control of current cycles.

In order to reduce the number of sensor or heater elements required to control a PCR heater, the heaters may be used to sense as well as heat, and thereby obviate the need to have a separate dedicated sensor for each heater. In another embodiment, each of the four heaters may be designed to have an appropriate wattage, and connect the four heaters in series or in parallel to reduce the number of electronically-controllable elements from 4 to just 1, thereby reducing the burden on the electronics.

FIG. 17B shows expanded views of heaters and temperature sensors used in conjunction with a PCR reaction zone of FIG. 17A. Temperature sensors 1001 and 1013 are designed to have a room temperature resistance of approximately 200-300 ohms. This value of resistance is determined by controlling the thickness of the metal layer deposited (e.g., a sandwich of 400 Å TiW/3000 Å Au/400 Å TiW), and etching the winding metal line to have a width of approximately 10-25 µm and 20-40 mm length. The use of metal in this layer gives it a temperature coefficient of resistivity of the order of 0.5-20° C./ohms, preferably in the range of 1.5-3° C./ohms. Measuring the resistance at higher temperatures will enable determination of the exact temperature of the location of these sensors.

The configuration for uniform heating, shown in FIG. 17A for a single PCR reaction chamber, can be applied to a multi-lane PCR cartridge in which multiple independent PCR reactions occur.

Figure 18:
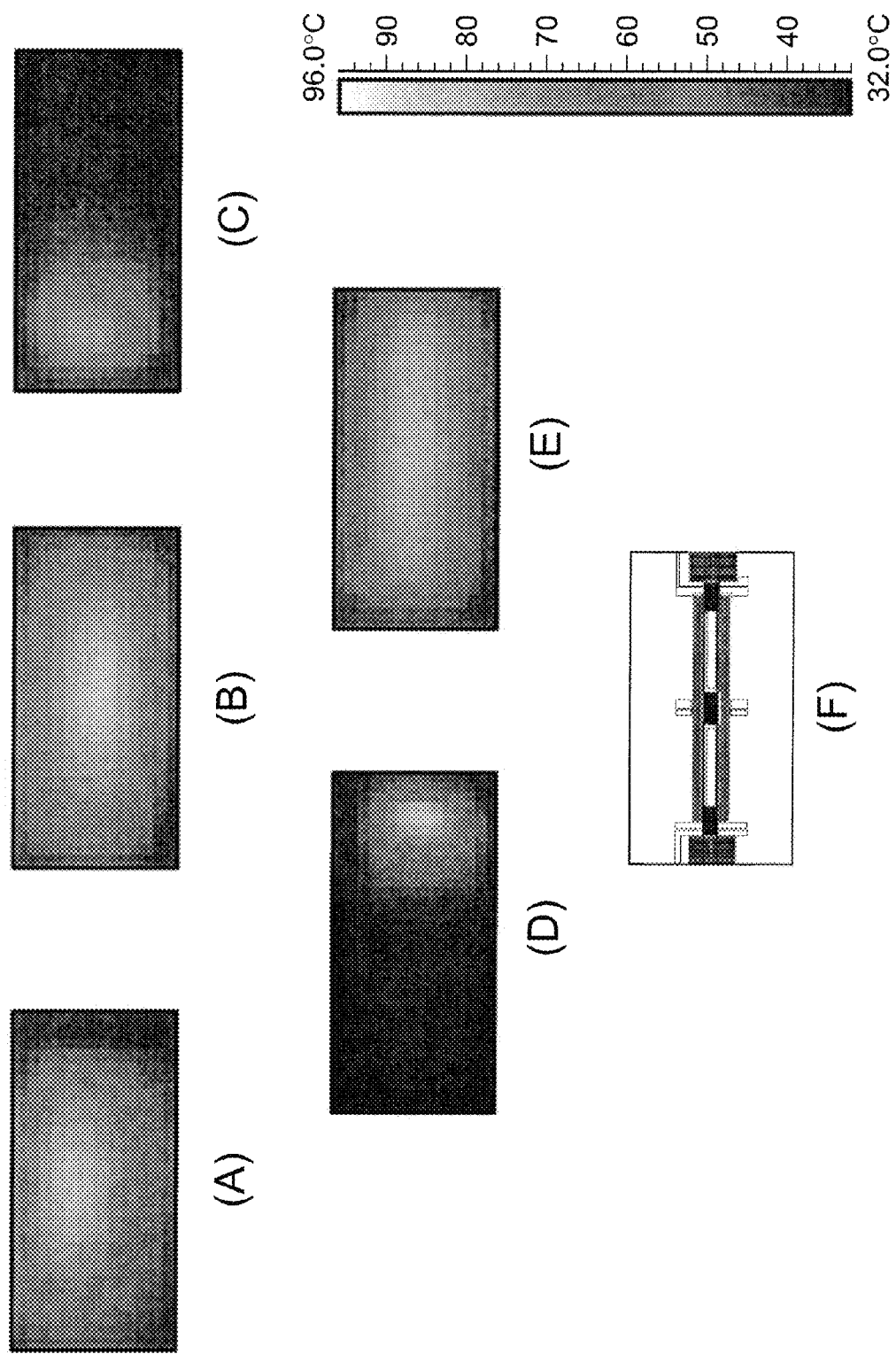
FIG. 18 shows thermal images of heater circuitry in operation.

Each heater can be independently controlled by a processor and/or control circuitry used in conjunction with the apparatus described herein. FIG. 18 shows thermal images, from the top surface of a microfluidic cartridge having heaters configured as in FIGS. 17A and 17B, when each heater in turn is activated, as follows: (A): Long Top only; (B) Long Bottom only; (C) Short Left only; (D) Short Right only; and (E) All Four Heaters on. Panel (F) shows a view of the reaction zone and heaters on the same scale as the other image panels in FIG. 18. Also shown in the figure is a temperature bar.

Use of Cutaways in Cartridge and Heater Substrates to Improve Rate of Cooling During PCR Cycling During a PCR amplification of a nucleotide sample, a number of thermal cycles are carried out. For improved efficiency, the cooling between each application of heat is preferably as rapid as possible. Improved rate of cooling can be achieved with various modifications to the cartridge and to the heating substrate, as shown in FIGS. 19A-19C.

Figure 19A:
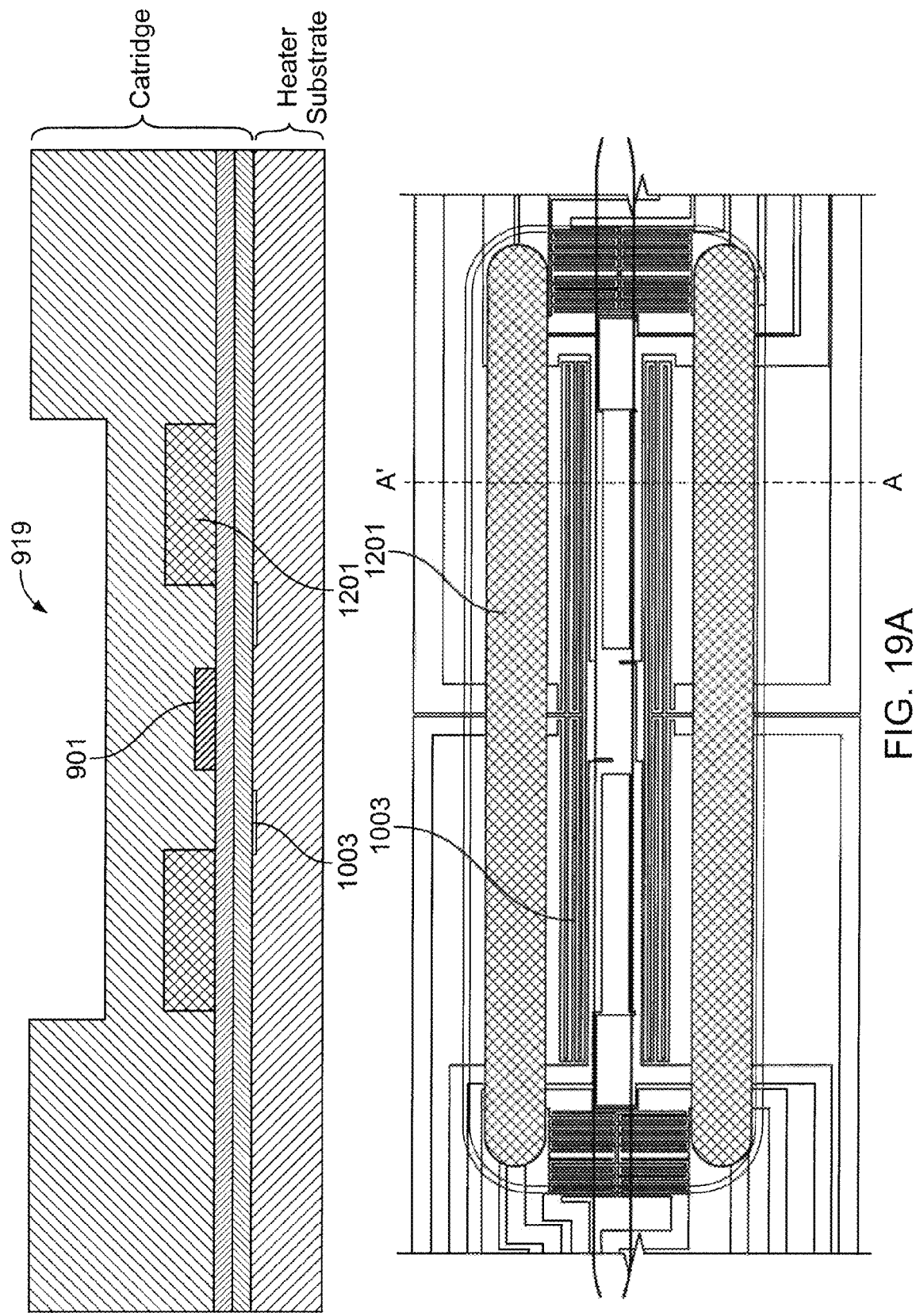
FIGS. 19A-19C shows various cut-away sections that can be used to improve cooling rates during PCR thermal cycling.

One way to achieve rapid cooling is to cutaway portions of the microfluidic cartridge substrate, as shown in FIG. 19A. The upper panel of FIG. 19A is a cross-section of an exemplary microfluidic cartridge and heater unit taken along the dashed line A-A' as marked on the lower panel of FIG. 19A. PCR reaction chamber 901, and representative heaters 1003 are shown. Also shown are two cutaway portions, one of which labeled 1201, that are situated alongside the heaters that are situated along the long side of the PCR reaction zone. Cutaway portions such as 1201 reduce the thermal mass of the cartridge, and also permit air to circulate within the cutaway portions. Both of these aspects permit heat to be conducted away quickly from the immediate vicinity of the PCR reaction zone. A further cutout portion 919 in the cartridge directly above the PCR chamber serves to both reduce thermal mass and background fluorescence. The latter is useful because, since cutout 919 is situated directly above the PCR chamber, the amount of material between the chamber and a fluorescence detector is reduced. Other configurations of cutouts, such as in shape, position, and number, are consistent with the present technology.

Figure 19B:
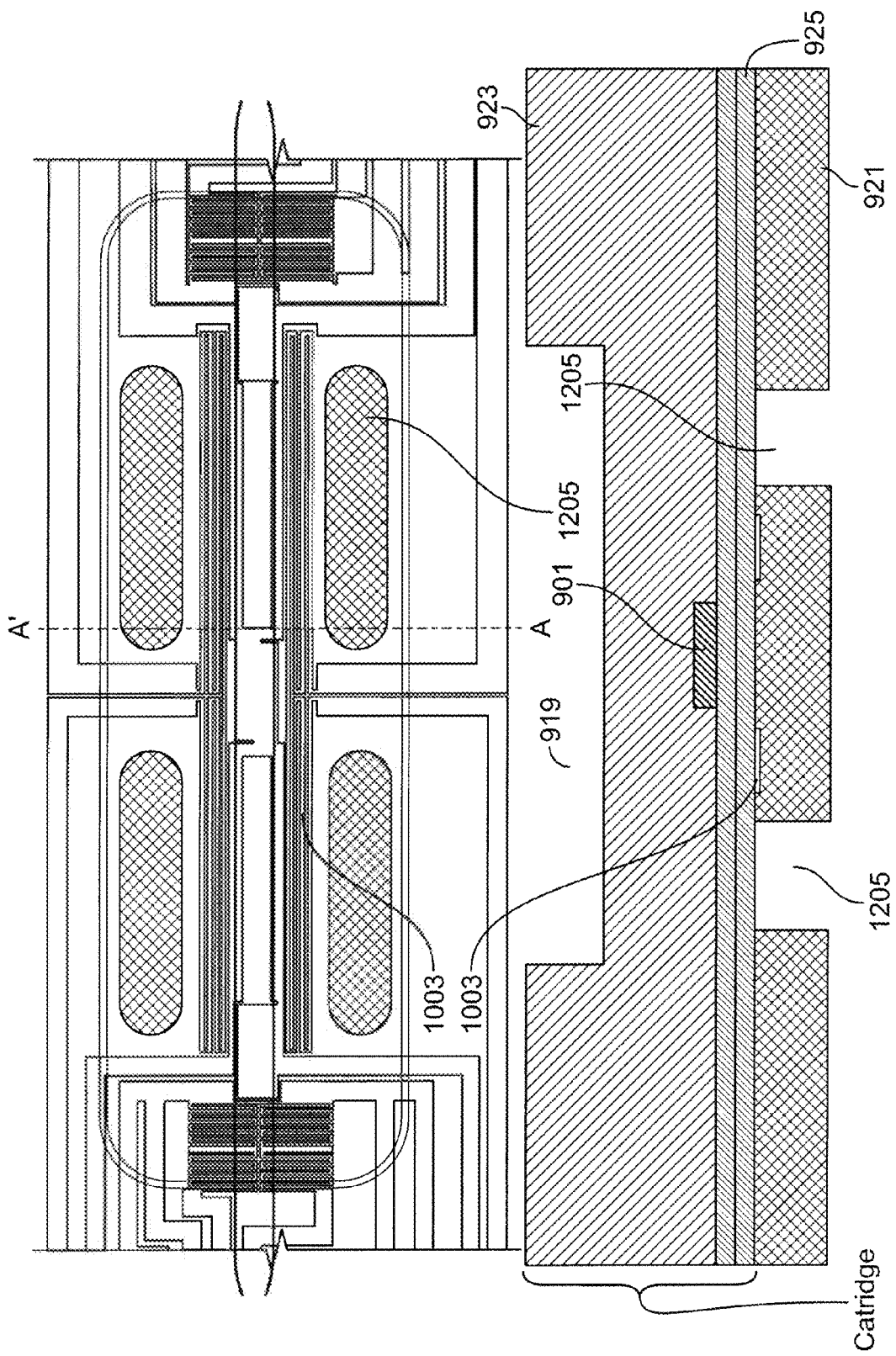

Another way to achieve rapid cooling is to cutaway portions of the heater substrate, as shown in FIG. 19B. The lower panel of FIG. 19B is a cross-section of an exemplary microfluidic cartridge and heater substrate 921 taken along the dashed line A-A' as marked on the upper panel of FIG. 19B. PCR reaction chamber 901 situated in substrate 923 of the cartridge, and representative heaters 1003 are shown. Laminate layer 921 of the cartridge is situated on top of heater substrate 921. The cartridge has a cutout 919 above the PCR chamber, as described in connection with FIG. 19A. Also shown in FIG. 19B are four cutaway portions, one of which labeled 1205, that are situated alongside the heaters that are situated along the long side of the PCR reaction zone. (Cutaways 1205 are shown cross-hatched in the upper panel of FIG. 19B, even though they are shown as clear (no cross-hatching) in the lower panel.) Cutaway portions such as 1205 reduce the thermal mass of the heater substrate, and also permit air to circulate within the cutaway portions. Both of these aspects permit heat to be conducted away quickly from the immediate vicinity of the PCR reaction zone. Four separate cutaway portions are shown in FIG. 19B. Multiple cutaway portions are typically used so that control circuitry to the various heaters is not disrupted. Other configurations of cutouts, such as in shape, position, and number, are consistent with the present technology. These cutouts may be created by a method selected from: selective etching using wet etching processes, deep reactive ion etching, selective etching using $CO_2$ laser or femtosecond laser (to prevent surface cracks or stress near the surface), selective mechanical drilling, selective ultrasonic drilling, or selective abrasive particle blasting. Care has to be taken to maintain mechanical integrity of the heater while reducing as much material as possible.

Figure 19C:
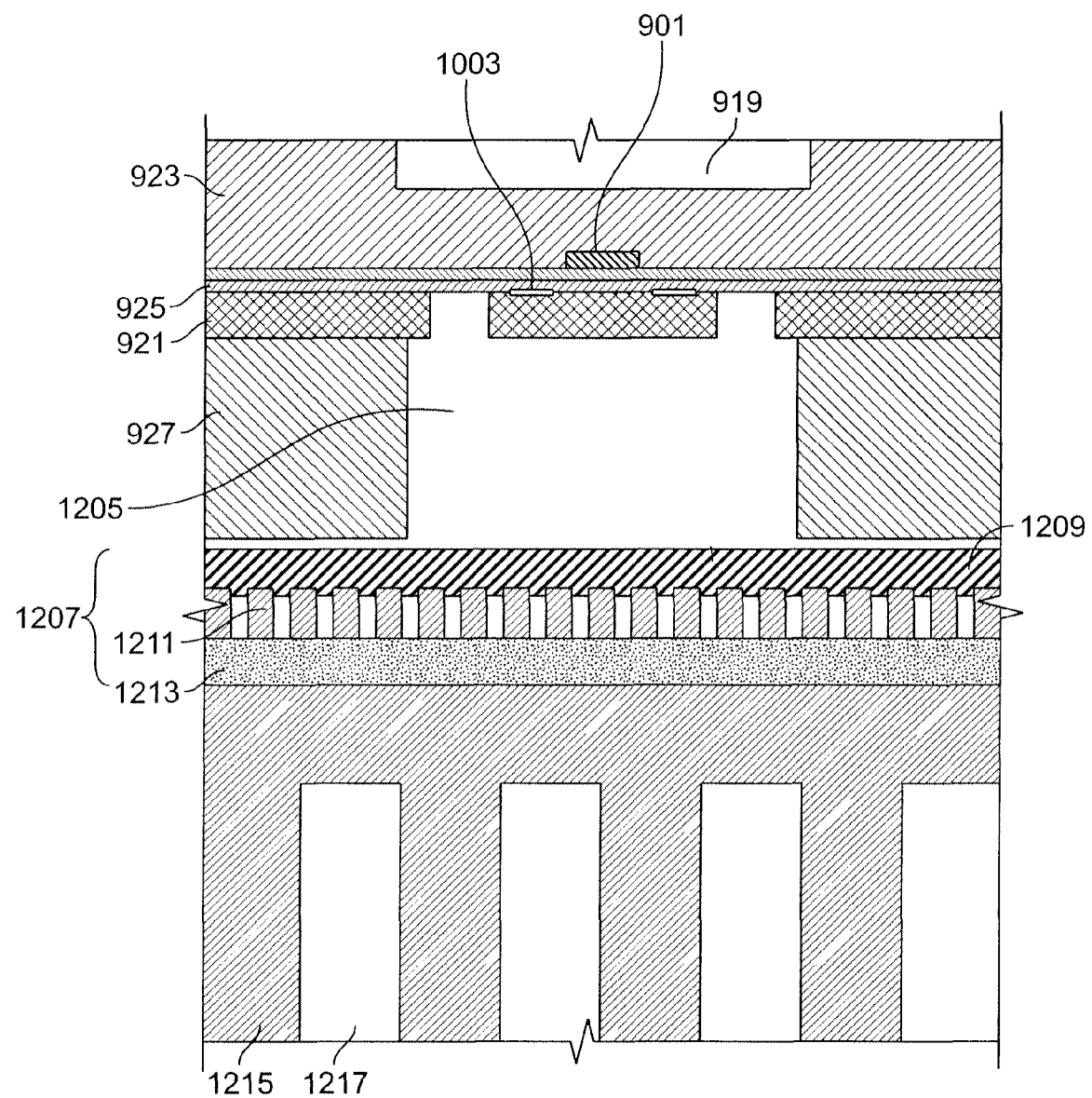

FIG. 19C shows a combination of cutouts in cartridge (comprising substrate 923 and laminate layer 925) and heater substrate 921, and use of ambient air cooling to increase the cooling rate during the cooling stages of thermocycling. A substantial amount of cooling happens by convective loss from the bottom surface of the heater surface to ambient air. The driving force for this convective loss is the differential in temperatures between the heater substrate surface (typically made of glass) and the air temperature. By decreasing the ambient air temperature by use of, for example, a peltier cooler 1207, the rate of cooling can be increased. The convective heat loss may also be increased by keeping the air at a velocity higher than zero. Peltier cooler 1207 is situated beneath a printed circuit board, layer 927 as shown in cross-section in FIG. 19C. Peltier cooler comprises a cooling surface 1209, a number of p-n junctions 1211 on a substrate 1213. The substrate itself can be mounted on a finned heat sink 1215, in which are one or more cutouts 1217 to facilitate cooling.

Figure 20:
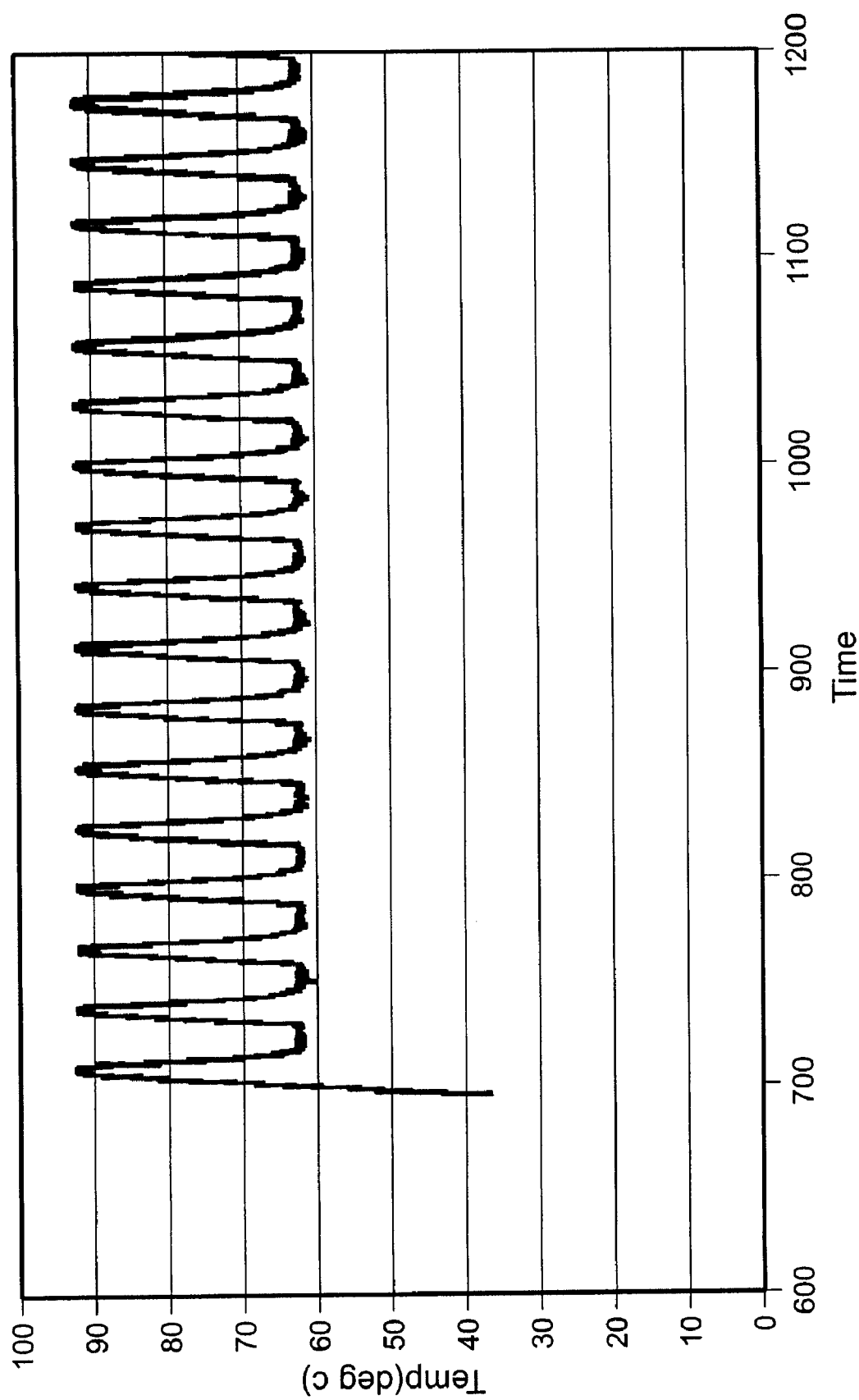
FIG. 20 shows a plot of temperature against time during a PCR process, as performed on a microfluidic cartridge as described herein.

An example of thermal cycling performance obtained with a configuration as described herein, is shown in FIG. 20 for a protocol that is set to heat up to 92° C., and stay there for 1 second, then cool to 62° C., and stay for 10 seconds. Cycle time is about 29 seconds, with 8 seconds required to heat from 62° C. and stabilize at 92° C., and 10 seconds required to cool from 92° C., and stabilize at 62° C.

Highly Multiplexed Embodiments

Embodiments of the apparatus and cartridge described herein may be constructed that utilize high-density microfluidic circuitry on a single cartridge that thereby permit processing of multiple samples in parallel, or in sequence, on a single cartridge. Preferred numbers of such multiple samples include 36, 40, 48, 50, 64, 72, 80, 84, 96, and 100, but it would be understood that still other numbers are consistent with the apparatus and cartridge herein, where deemed convenient and practical.

Accordingly, different configurations of lanes, sample inlets, and associated heater networks that can facilitate processing such numbers of samples on a single cartridge are within the scope of the instant disclosure.

Figure 21A:
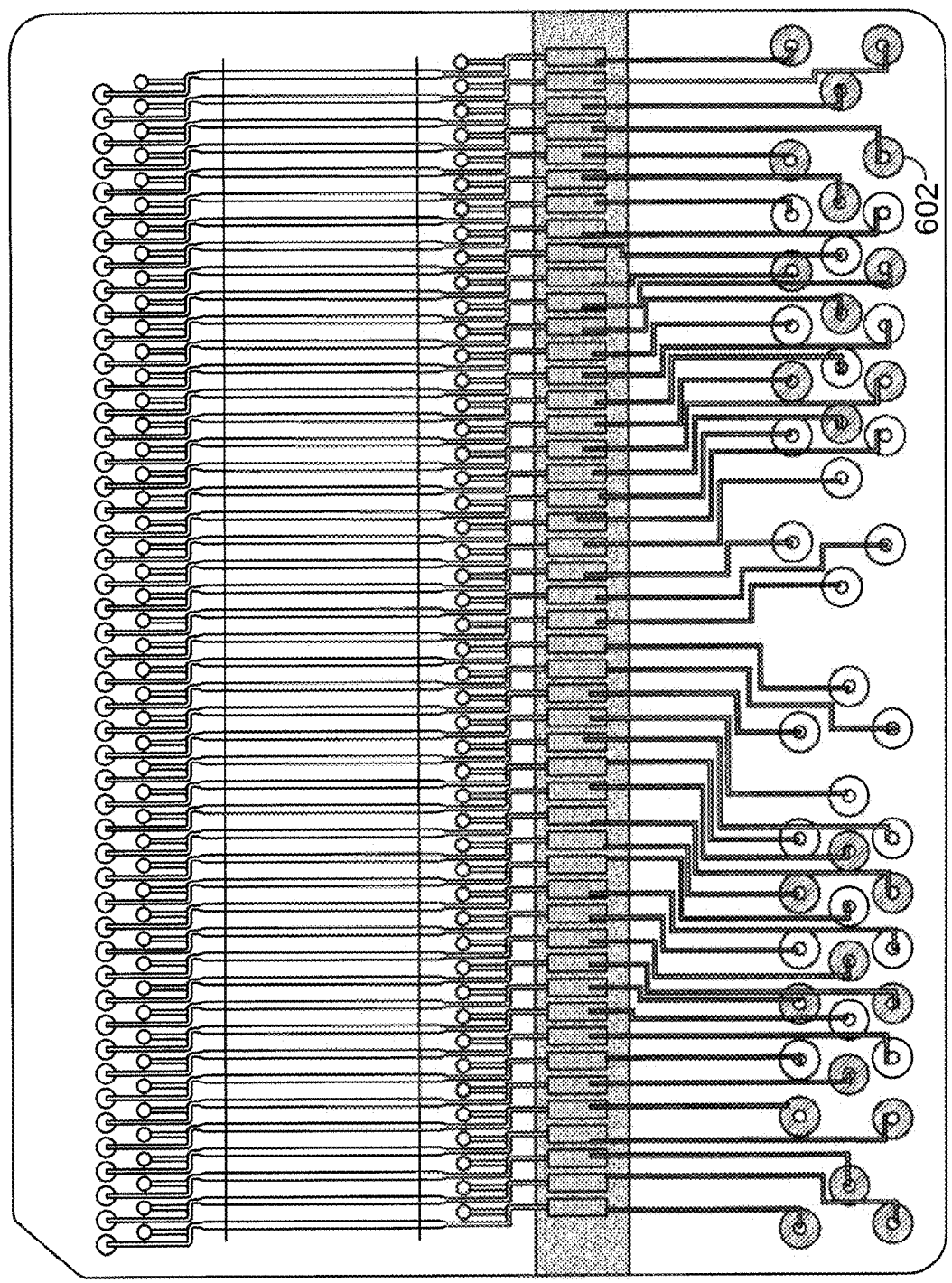
FIGS. 21A-21C show views of an exemplary highly-multiplexed microfluidic cartridge, in plan (FIG. 21A), close-up of valves (FIG. 21B), and close up of inlets (FIG. 21C).
Figure 21B:
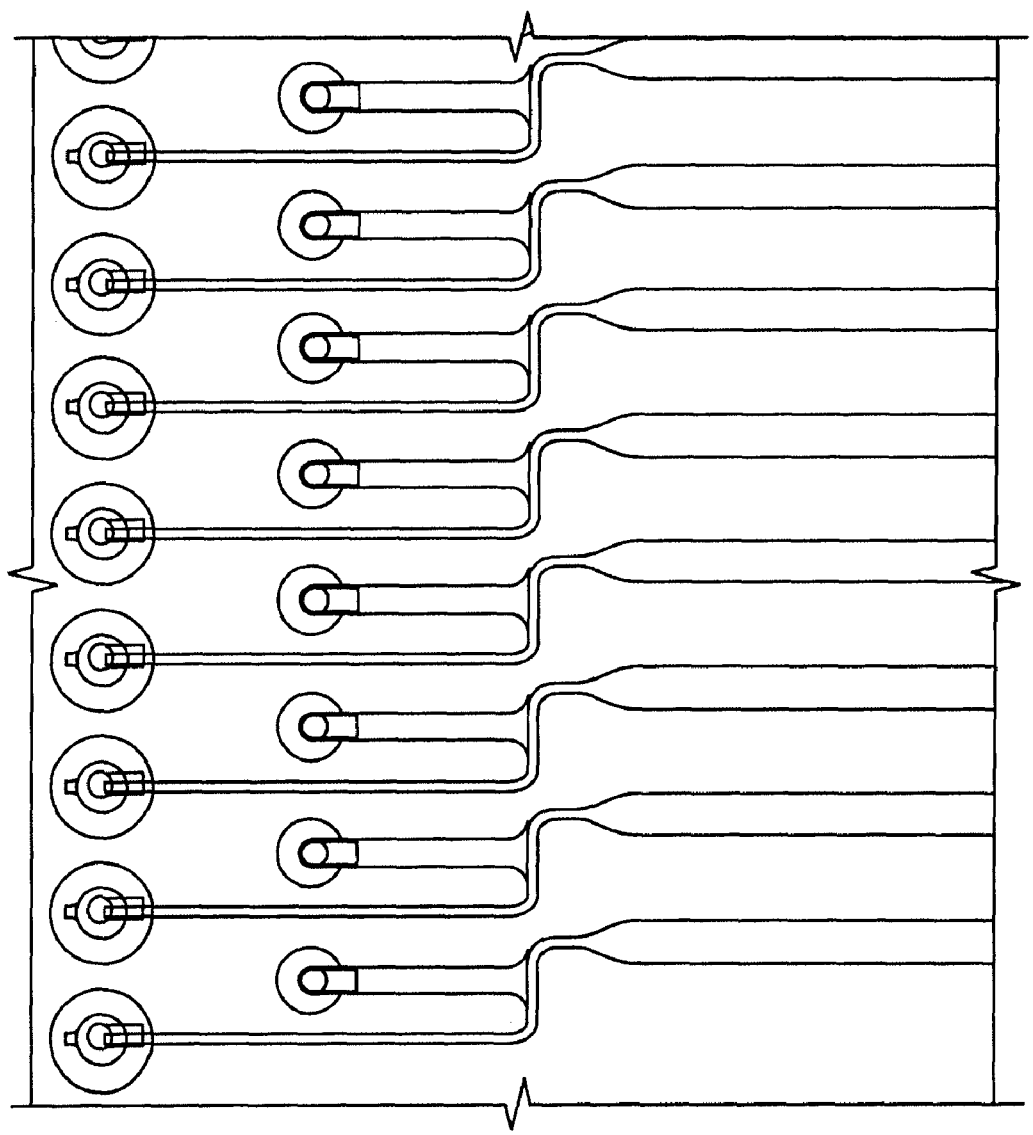
Figure 21C:
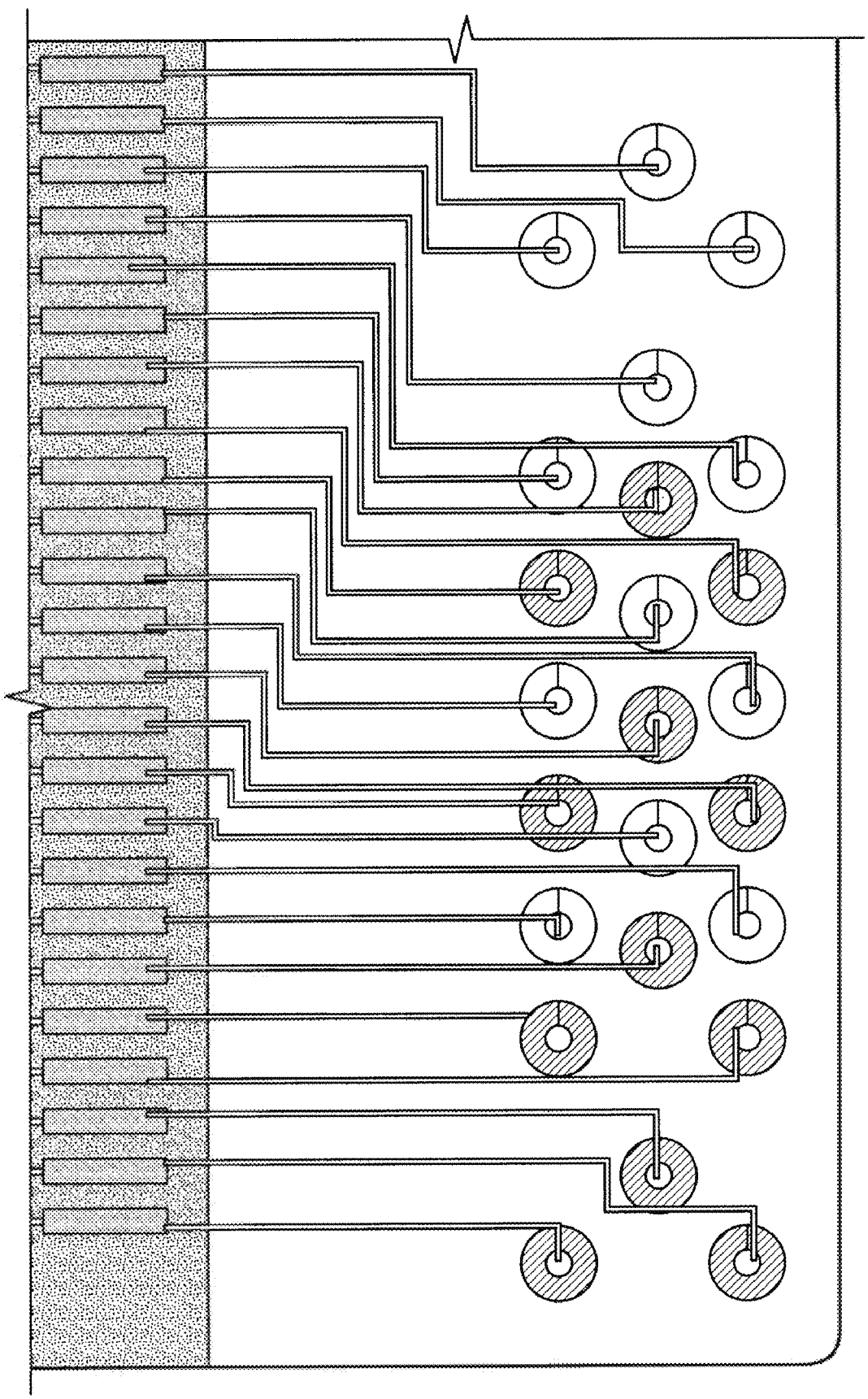

In an exemplary embodiment, shown in FIGS. 21A-21C, a highly multiplexed cartridge has 48 lanes. FIG. 21A shows a plan view of a representative 48-lane cartridge. FIG. 21B shows, in close up, an exemplary spacing of valves and lanes in adjacent lanes of a multi-sample microfluidic cartridge.

FIG. 21C shows an inlet configuration for accepting 48 samples. The inlet configuration is compatible with an automatic pipetting machine that has dispensing heads situated at a 8 mm spacing. For example, such a machine having 4 heads can load 4 inlets of the cartridge of FIGS. 21A and 21C at once, in 12 discrete steps.

Figure 22A:
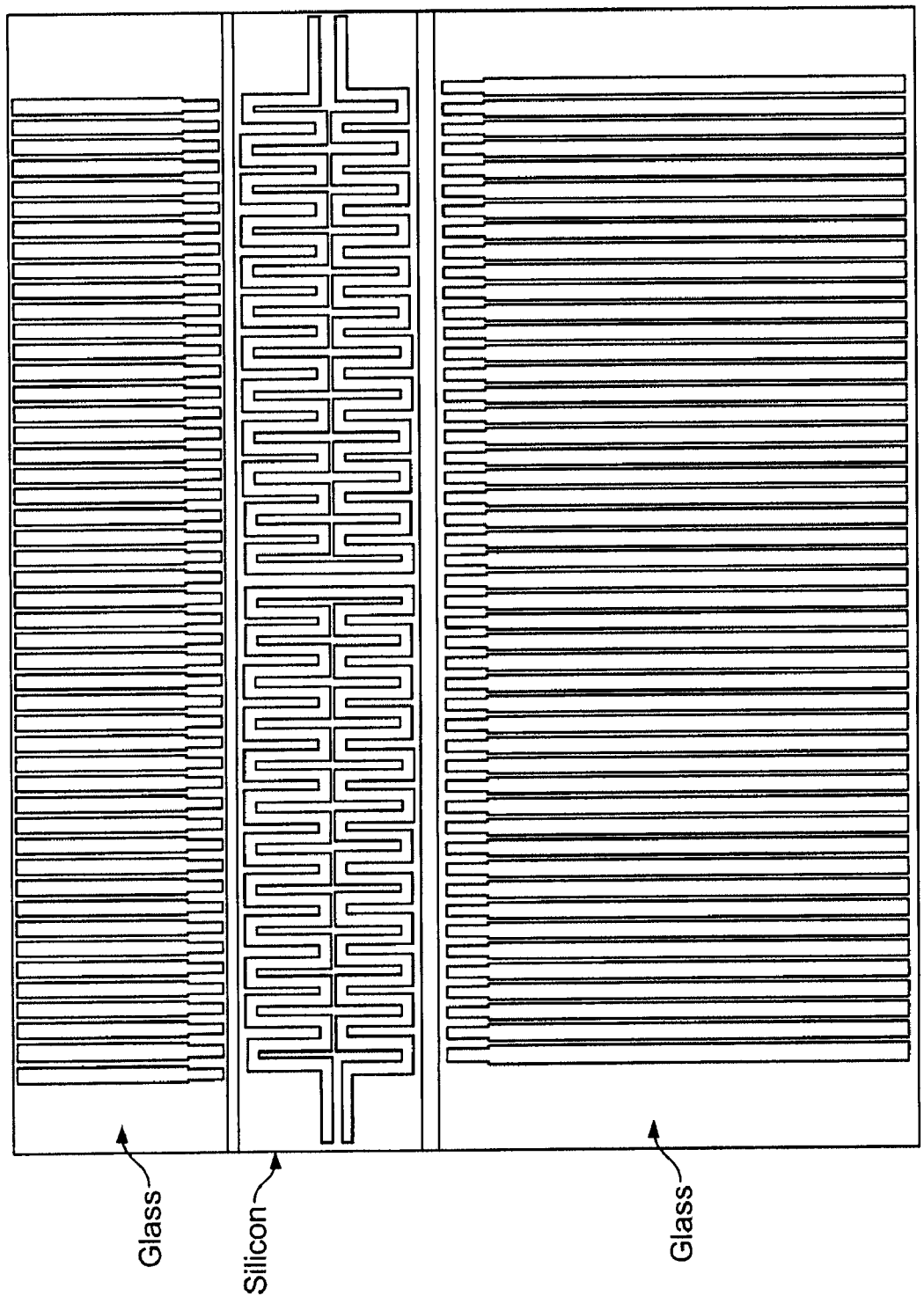
FIGS. 22A and 22B show various aspects of heater units associated with exemplary highly multiplexed microfluidic cartridges.

Each lane of the cartridge has a microfluidic network that includes a PCR chamber and has independently controllable valves in one or more channels, with 2 banks of thermocycling protocols per channel, as shown in FIG. 22A. In the embodiment in FIG. 22A, the heaters are arranged in three arrays. Heaters in two separate glass regions only apply heat to valves in the microfluidic networks in each lane. Because of the low thermal conductivity of glass, the individual valves may be heated separately from one another. This permits samples to be loaded into the cartridge at different times, and passed to the PCR reaction chambers independently of one another. The PCR heaters are mounted on a silicon substrate—and are not readily heated individually, but thereby permit batch processing of PCR samples, where multiple samples from different lanes are amplified by the same set of heating/cooling cycles. In some embodiments, the PCR heaters are arranged in 2 banks (the heater arrays on the left and right are not in electrical communication with one another), thereby permitting a separate degree of sample control.

Figure 22B:
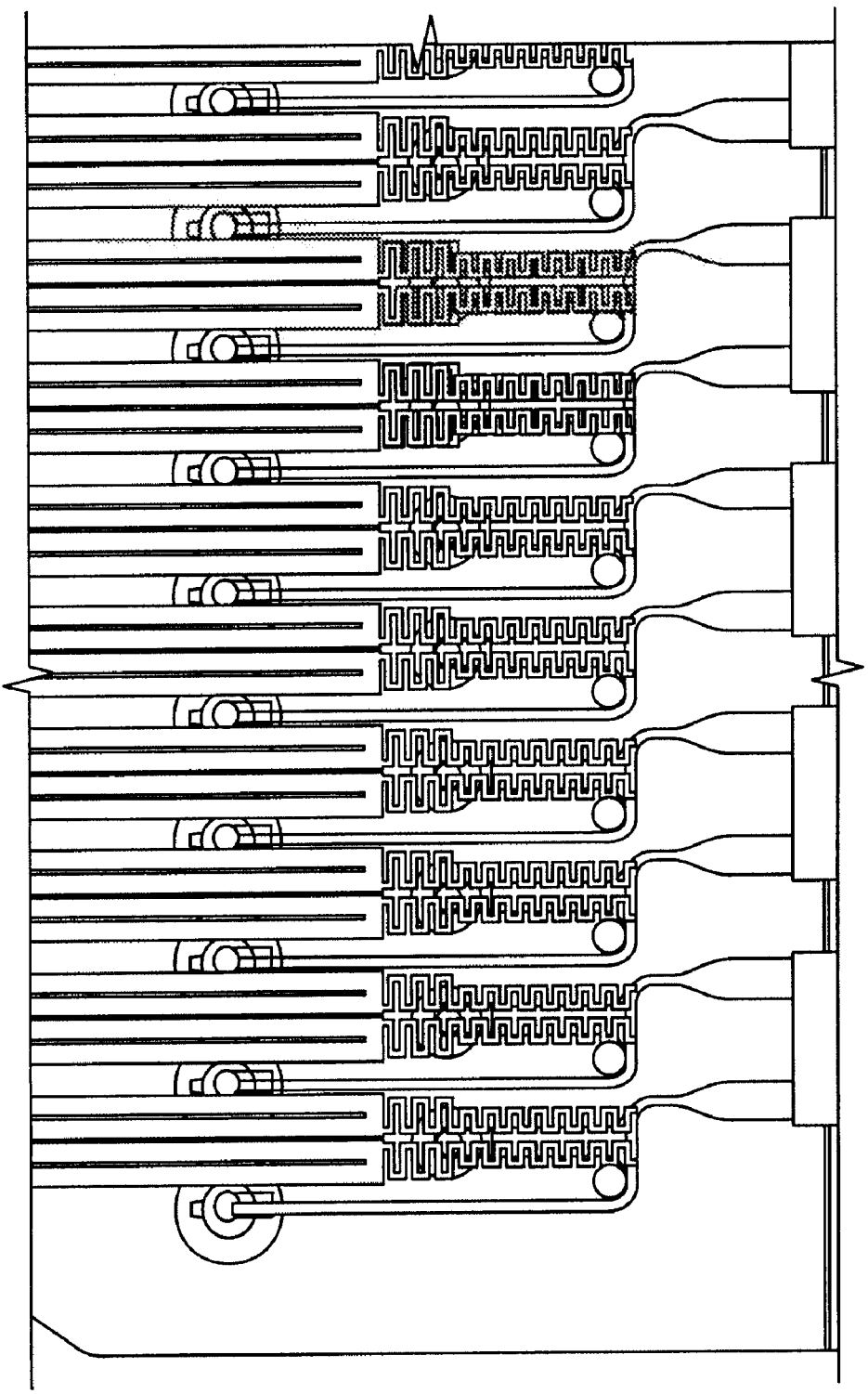

FIGS. 22A and 22B show heater arrays of the exemplary cartridge of FIG. 21A in, respectively, plan view, and in close-up.

Figure 23A:
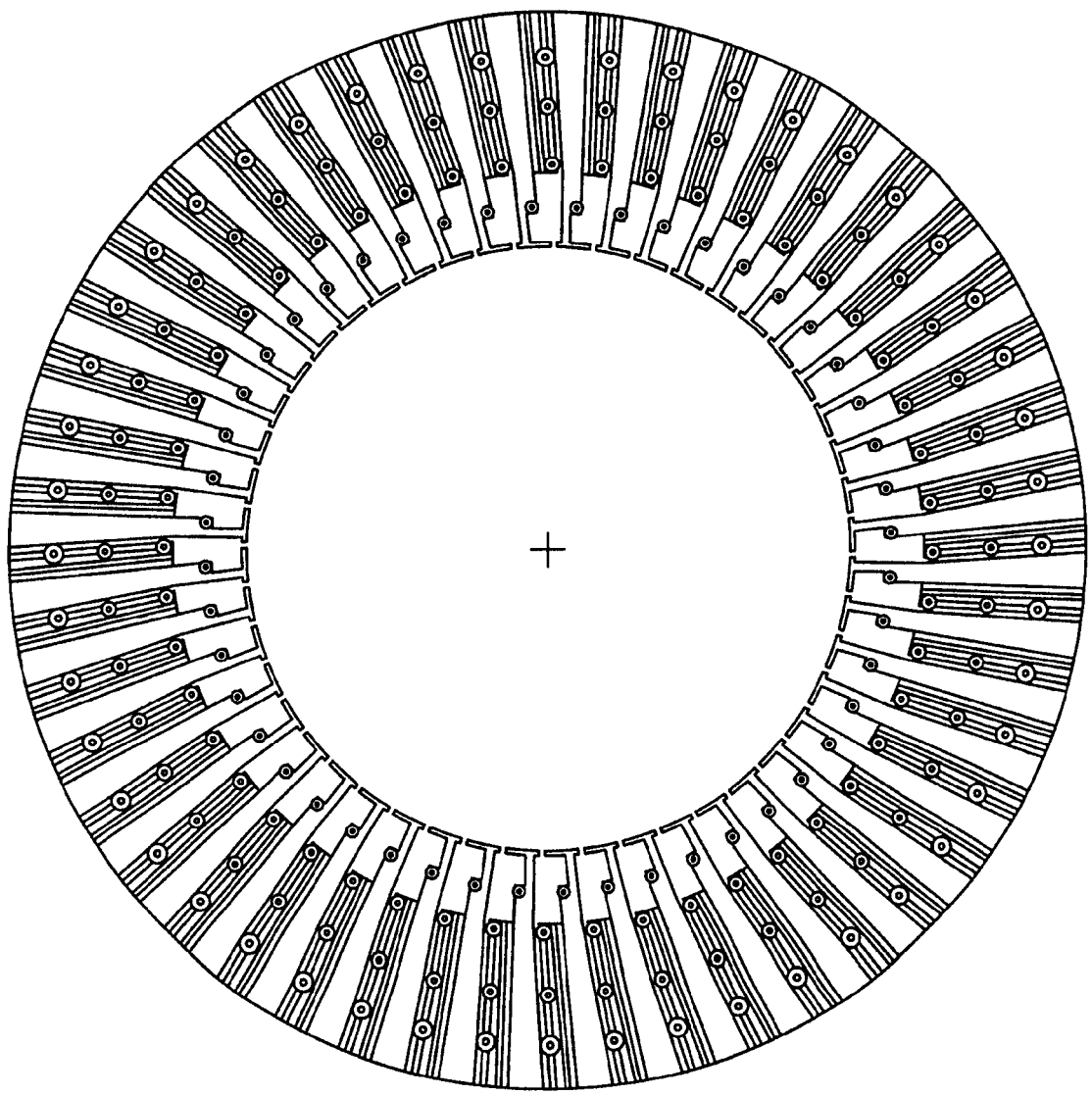
FIGS. 23A-C show various aspects of a radially configured highly multiplexed microfluidic cartridge.
Figure 23B:
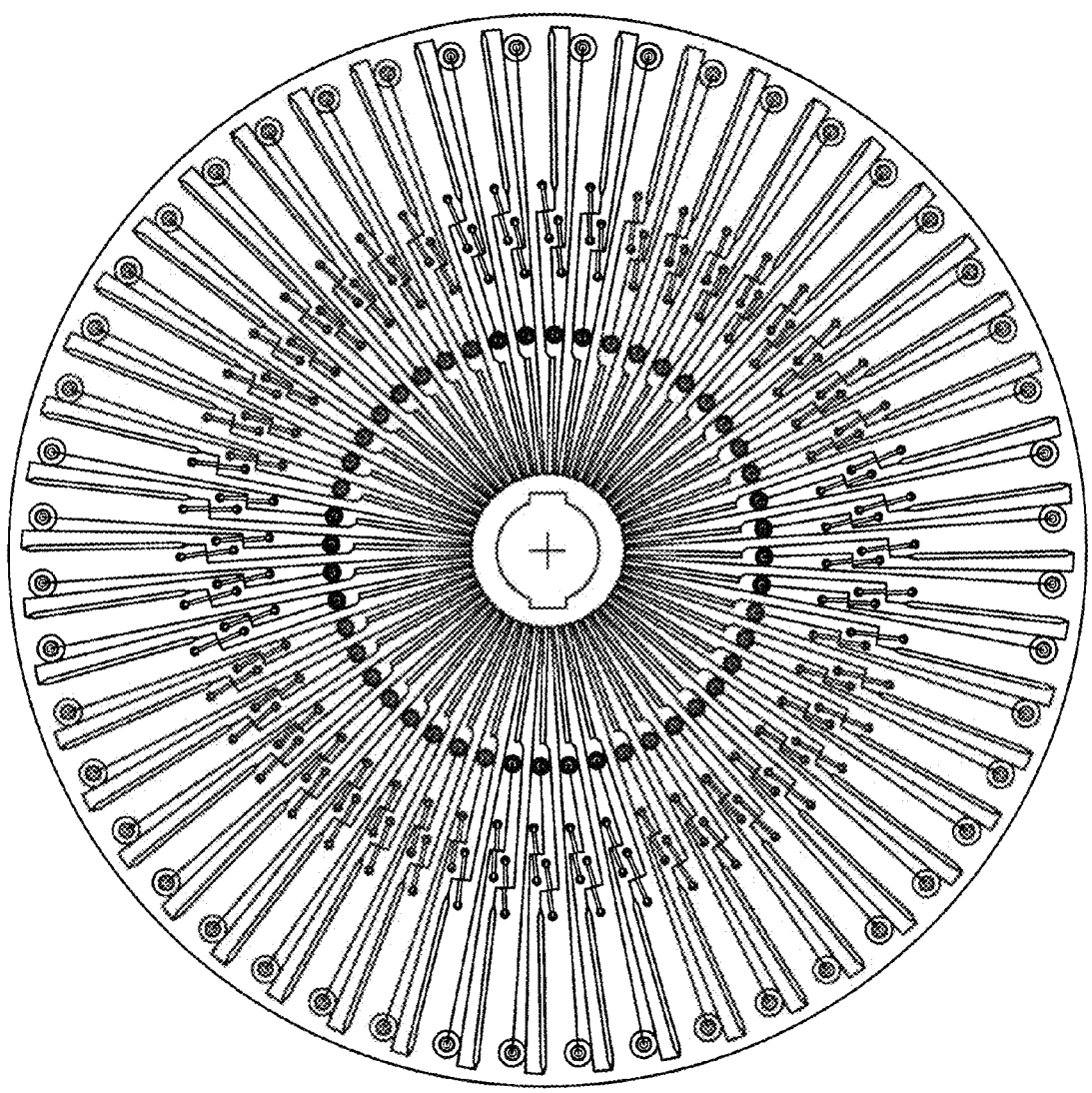
Figure 23C:
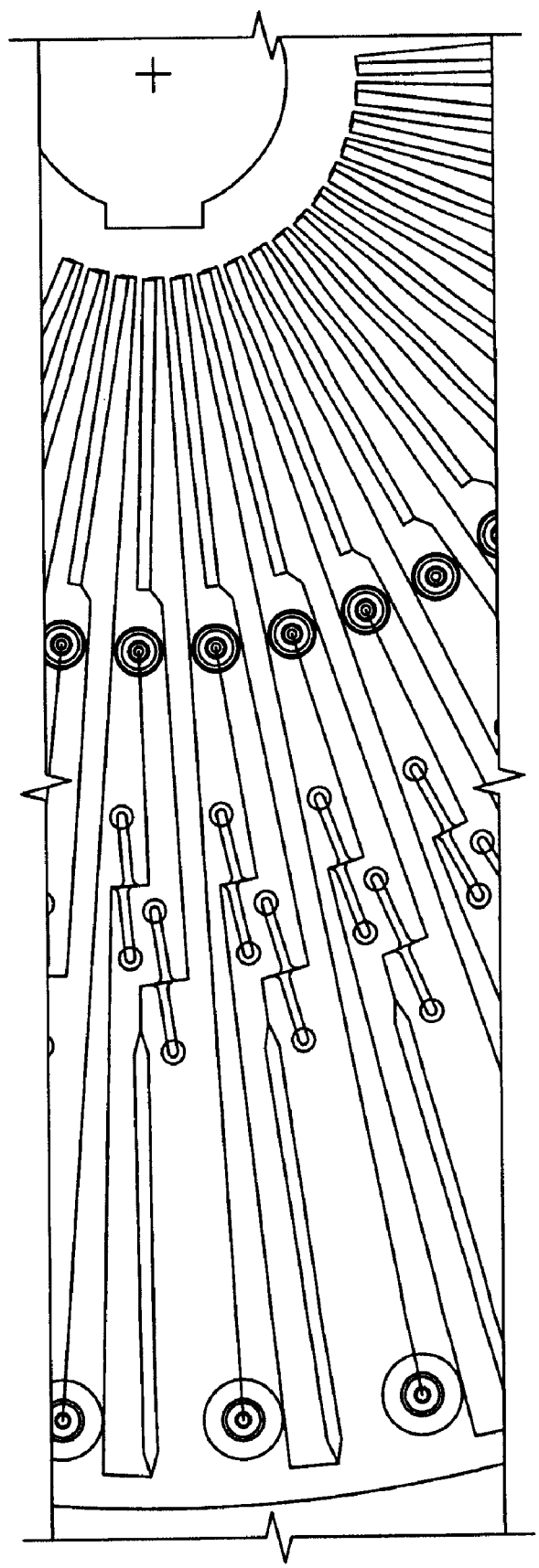

FIGS. 23A-23C show various views of an embodiment of a radially-configured highly-multiplexed cartridge, having a number of inlets, microfluidic lanes, and PCR reaction zones.

The various embodiments shown in FIGS. 21A-23C are compatible with liquid dispensers, receiving bays, and detectors that are configured differently from the specific examples described herein.

In another embodiment (not shown in the FIGs.), a cartridge and apparatus is configured so that the read-head does not cover the sample inlets, thereby permitting loading of separate samples while other samples are undergoing PCR thermocycling.

Heater Multiplexing (Under Software Control)

Another aspect of the apparatus described herein, relates to a method for controlling the heat within the system and its components. The method leads to a greater energy efficiency of the apparatus described herein, because not all heaters are heating at the same time, and a given heater is receiving current for only part of the time.

Figure 4E:
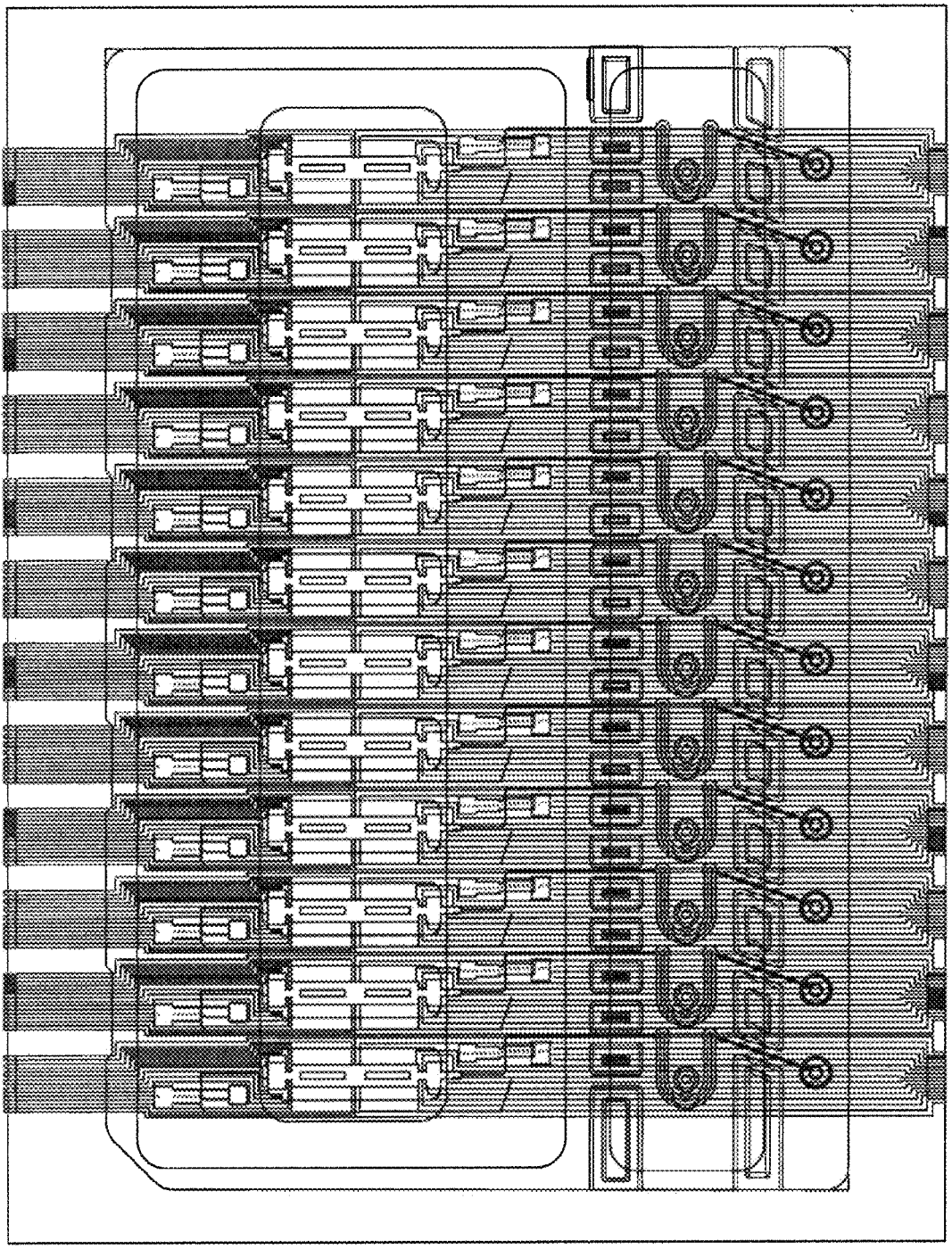
FIG. 4E shows an overlay of a heater unit with the lanes of the cartridge.

Generally, the heating of microfluidic components, such as a PCR reaction zone, is controlled by passing currents through suitably configured microfabricated heaters, as illustrated in FIG. 4E. The heating can be further controlled by periodically turning the current on and off with varying pulse width modulation (PWM), wherein pulse width modulation refers to the on-time/off-time ratio for the current. The current can be supplied by connecting a microfabricated heater to a high voltage source (for example, 30V), which can be gated by the PWM signal. In some embodiments, the device includes 48 PWM signal generators. Operation of a PWM generator includes generating a signal with a chosen, programmable period (the end count) and granularity. For instance, the signal can be 4000 μs (micro-seconds) with a granularity of 1 μs, in which case the PWM generator can maintain a counter beginning at zero and advancing in increments of 1 μs until it reaches 4000 μs, when it returns to zero. Thus, the amount of heat produced can be adjusted by adjusting the end count. A high end count corresponds to a greater length of time during which the microfabricated heater receives current and therefore a greater amount of heat produced.

In various embodiments, the operation of a PWM generator can also include a programmable start count in addition to the aforementioned end count and granularity. In such embodiments, multiple PWM generators can produce signals that can be selectively non-overlapping (e.g., by multiplexing the on-time of the various heaters) such that the current capacity of the high voltage power is not exceeded. Multiple heaters can be controlled by different PWM signal generators with varying start and end counts. The heaters can be divided into banks, whereby a bank defines a group of heaters of the same start count.

For example, 36 PWM generators can be grouped into six different banks, each corresponding to a certain portion of the PWM cycle (500 ms for this example). The end count for each PWM generator can be selectively programmed such that not more than six heaters will be on at any given time. A portion of a PWM cycle can be selected as dead time (count 3000 to 4000 for this example) during which no heating takes place and sensitive temperature sensing circuits can use this time to sense the temperature. The table below represents a PWM cycle for the foregoing example:

|  | Start Count | End Count | Max End Count |
| --- | --- | --- | --- |
| Bank 1 | | | |
| PWM generator#1 | 0 | 150 | 500 |
| PWM generator#2 | 0 | 220 | 500 |
| ... | ... | ... | ... |
| PWM generator#6 | 0 | 376 | 500 |
| Bank 2 | | | |
| PWM generator#7 | 500 | 704 | 1000 |
| PWM generator#8 | 500 | 676 | 1000 |
| ... | ... | ... | ... |
| PWM generator#12 | 500 | 780 | 1000 |
| Bank 3 | | | |
| PWM generator#13 | 1000 | 1240 | 1500 |
| PWM generator#14 | 1000 | 1101 | 1500 |
| ... | ... | ... | ... |
| PWM generator#18 | 1000 | 1409 | 1500 |
| Bank 4 | | | |
| PWM generator#19 | 1500 | 1679 | 2000 |
| PWM generator#20 | 1500 | 1989 | 2000 |
| ... | ... | ... | ... |
| PWM generator#24 | 1500 | 1502 | 2000 |
| Bank 5 | | | |
| PWM generator#25 | 2000 | 2090 | 2500 |
| PWM generator#26 | 2000 | 2499 | 2500 |
| ... | ... | ... | ... |
| PWM generator#30 | 2000 | 2301 | 2500 |
| Bank 6 | | | |
| PWM generator#31 | 2500 | 2569 | 3000 |
| PWM generator#32 | 2500 | 2790 | 3000 |
| ... | ... | ... | ... |
| PWM generator#36 | 2500 | 2678 | 3000 |

Use of Detection System to Measure/Detect Fluid in PCR Chamber

The apparatus optionally has a very sensitive fluorescence detector that is able to collect fluorescence light from the PCR chamber 210 of a microfluidic cartridge. Further aspects of such a detector are described in U.S. patent application Ser. No. 12/173,023, filed Jul. 14, 2008, and incorporated herein by reference. Such a detector is used to monitor the progress of PCR, and can also be used to detect the presence of liquid in the chamber, a measurement that determines whether or not to carry out a PCR cycle on that particular chamber. One way to accomplish this determination is to take a background reading prior to filling the chamber with liquid. Another reading is taken after operations have been performed that should result in filling the PCR chamber with liquid. The presence of liquid alters the fluorescence reading from the chamber relative to an empty chamber. A programmable threshold value is used to tune an algorithm programmed into the processor (for example, the second reading has to exceed the first reading by 20%). If the two readings do not differ beyond the programmed margin, the liquid is deemed to not have entered the chamber, and a PCR cycle is not initiated for that chamber. Instead, a warning is issued to a user.

Liquid Dispenser

The microfluidic cartridge is configured to receive sample (s) via the one or more inlets, and delivered by a liquid dispenser. A suitable liquid dispenser for use with the apparatus herein is described in U.S. patent application Ser. No. 12/212,403, filed Sep. 17, 2008, and incorporated herein by reference.

In various embodiments, preparation of a PCR-ready sample for use in subsequent diagnosis using the apparatus as further described herein, can include one or more of the following steps: contacting a neutralized polynucleotide sample with a PCR reagent mixture comprising a polymerase enzyme and a plurality of nucleotides (in some embodiments, the PCR reagent mixture can further include a positive control plasmid and a fluorogenic hybridization probe selective for at least a portion of the plasmid); in some embodiments, the PCR reagent mixture can be in the form of one or more lyophilized pellets, as stored in a receptacle on a holder, and the method can further include reconstituting the PCR pellet with liquid to create a PCR reagent mixture solution. Various, such as one or more, of the liquid transfer operations associated with the foregoing steps can be accomplished by an automated pipette head.

During sample preparation, the liquid dispenser is configured to carry out fluid transfer operations on two or more holders simultaneously, and can be mounted on a gantry having three degrees of translational freedom.

The liquid dispenser typically comprises a number of individually sprung heads, wherein each head is configured to accept a pipette tip from the one or more pipette tips in a holder, and to control dispense operations with that pipette tip. For example, a typical liquid dispenser comprises four individually sprung heads, but it is to be understood that the dispenser is not limited to this number. For example, other numbers include 2, 3, 5, 6, 8, 10, or 12. The liquid dispenser can be further configured such that no two heads accept pipette tips from the same holder. The individually sprung heads may be arranged in parallel to one another, but may be configured in other arrangements.

The liquid dispenser is further configured to aspirate or dispense fluid in connection with analysis or preparation of solutions of two or more samples. The liquid dispenser is also configured to dispense liquid into a microfluidic cartridge. Additionally, the liquid dispenser is configured to accept or dispense, in a single operation, an amount of 1.0 ml of fluid or less, such as an amount of fluid in the range 10 nl-1 ml.

Typically when transferring a sample containing extracted nucleic acid from a pipette tip to an inlet on the microfluidic cartridge, say using a liquid dispenser, a volume of air is simultaneously introduced into the microfluidic network that is connected to the inlet, the volume of air being typically between about 0.5 mL and about 5 mL, but depending on the volume of the pipette tip. Presence of air in the microfluidic network, however, is not essential to operation of the cartridge described herein.

Proper alignment of pipette tips attached to the dispense head with the inlets on the cartridge can be achieved with a motorized alignment plate, as further described in U.S. patent application Ser. No. 12/212,403, filed Sep. 17, 2008, and incorporated herein by reference.

Cartridge Autoloader

In certain embodiments of the apparatus described elsewhere herein, microfluidic cartridges are stored in a loading device and automatically delivered to a receiving bay when needed. Such an arrangement, which may be referred to as an amplification-detection system, permits multiple samples to be analyzed, in batches, and with minimal interruption between successive cartridges.

Figure 24:
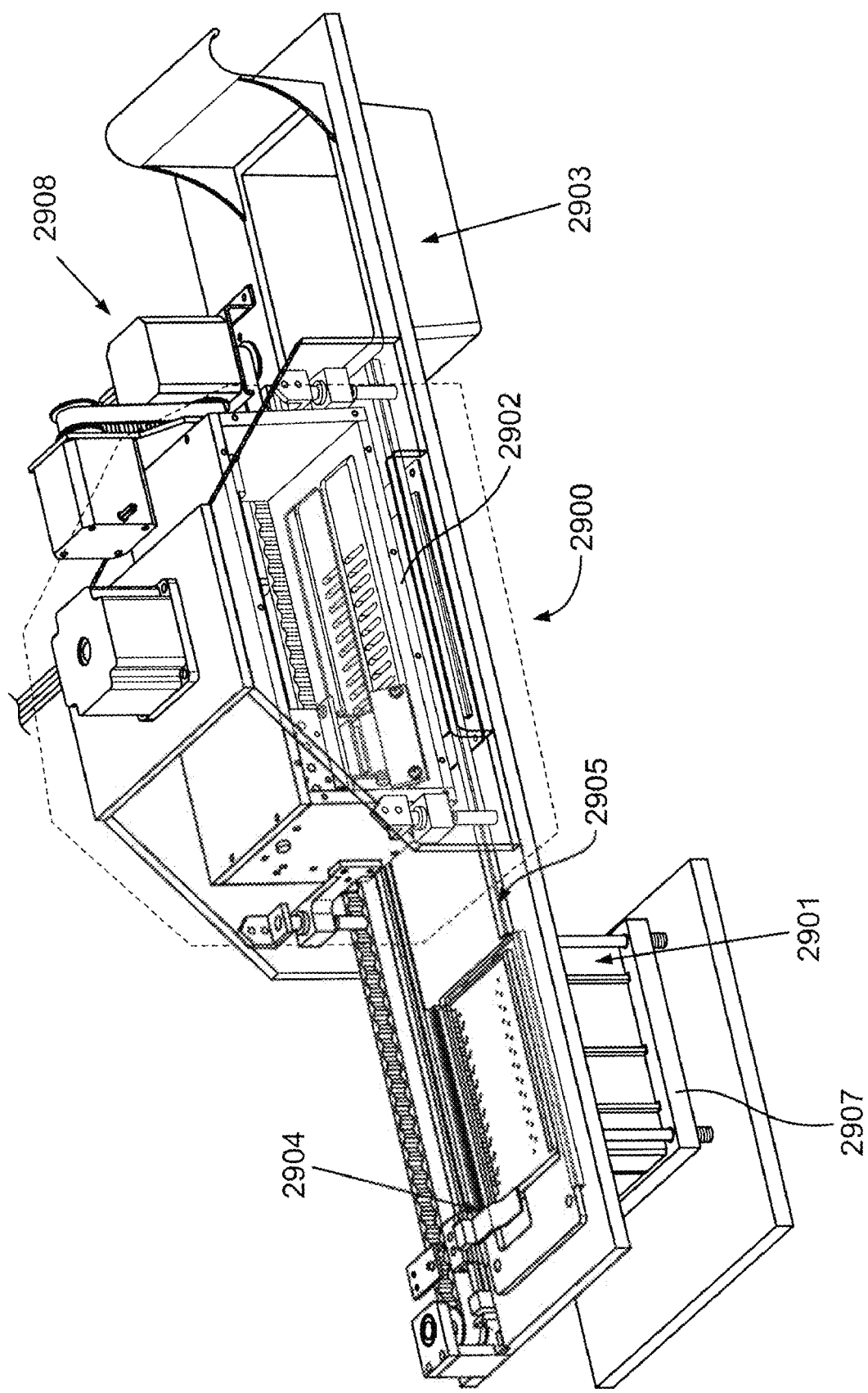
FIG. 24 shows a cartridge auto-loader in conjunction with an amplification-detection system.

An exemplary embodiment of an amplification-detection system 2900 for use with a microfluidic cartridge is shown in FIG. 24. The system 2900 performs and automates the process of PCR on multiple nucleic-acid containing samples, on a cartridge, in parallel. The system 2900 comprises a repository 2907 for unused microfluidic cartridges, a cartridge autoloader, a receiving bay 2902 for a microfluidic cartridge, a detector 2908, and a waste tray 2903 configured to receive used microfluidic cartridges. In one embodiment, the cartridge autoloader comprises a cartridge pack 2901, and a cartridge pusher 2904.

The system 2900, for illustration purposes, is configured so that a microfluidic cartridge moves in a plane and linearly from the repository 2907 to the receiving bay 2902, to the waste bin 2903, but it need not be so arranged. For example, the waste cartridge bin 2903 can be aligned orthogonally, or any angle thereof, to the receiving bay, such as disposed behind it. Alternatively, each element (cartridge autoloader 2901, receiving bay 2902, and waste cartridge bin 2903) can be configured in a step-wise manner where the cartridge pack 2901 is on the same, higher or lower level than the amplification-detection system 2902 and the amplification-detection system 2902 is on the same, higher or lower level than the waste cartridge bin 2903. Another configuration could be that each of the three elements is not arranged linearly but at an angle to one another, although within the same plane.

FIG. 24 illustrates the cartridge pack 2901 and the waste cartridge bin 2903 below the plane of the receiving bay, and a detection system 2908 above the plane. This configuration is exemplary and it would be understood that some of these elements may be positioned alternately above or below the plane in other embodiments.

Figure 25:
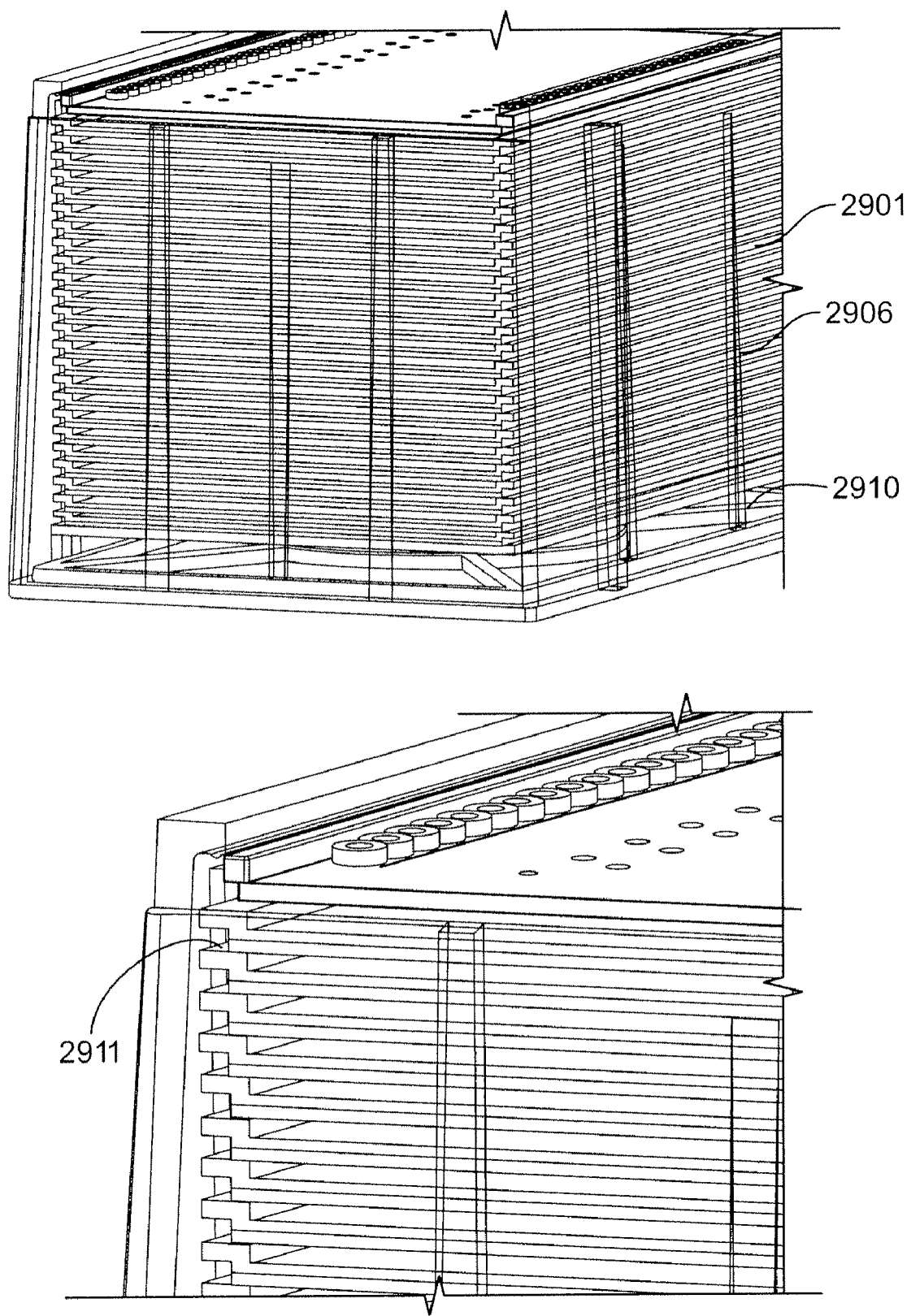
FIG. 25 shows a perspective view, and a close-up view, of a cartridge stacker.

FIG. 25 illustrates a repository for unused microfluidic cartridges. The repository can be configured to accept a number of individually stacked and individually loaded cartridges, or can be configured to accept a pack of cartridges 2901, where it is to be understood that a pack is a set of two or more cartridges that are stored and transported together with one another, even though each will be used separately. An exemplary cartridge pack has 24 cartridges. The repository may consist of a cage 2910 of any material that may or may not be transparent. For example it may be made of metal or plastic. The cartridge pack 2901 is not limited to twenty-four cartridges 2906 per pack but may contain any number from 2 to 100. For example, other numbers such as 2, 4, 8, 10, 12, 16, 20, 30, 36, 40, 48, 50, or 64 are possible numbers of cartridges per pack. Similarly, the repository may be configured to accept those numbers of cartridges, when individually stacked, rather than being in a pack.

In some embodiments, as in FIG. 25, each cartridge 2906, individually stacked, rests so that ridges along two sides of the cartridge are supported on ledges 2911 that protrude from the cage 2910. However, other configurations are possible. For example, a cartridge 2906 may rest on recessed grooves made within the interior surfaces of cage 2910. Furthermore, the cartridge pack 2901 may not need to be placed in a cage 2910. The cartridge pack 2901 may itself include the necessary connections to bind securely to the apparatus and to load the cartridges 2906.

Figure 26:
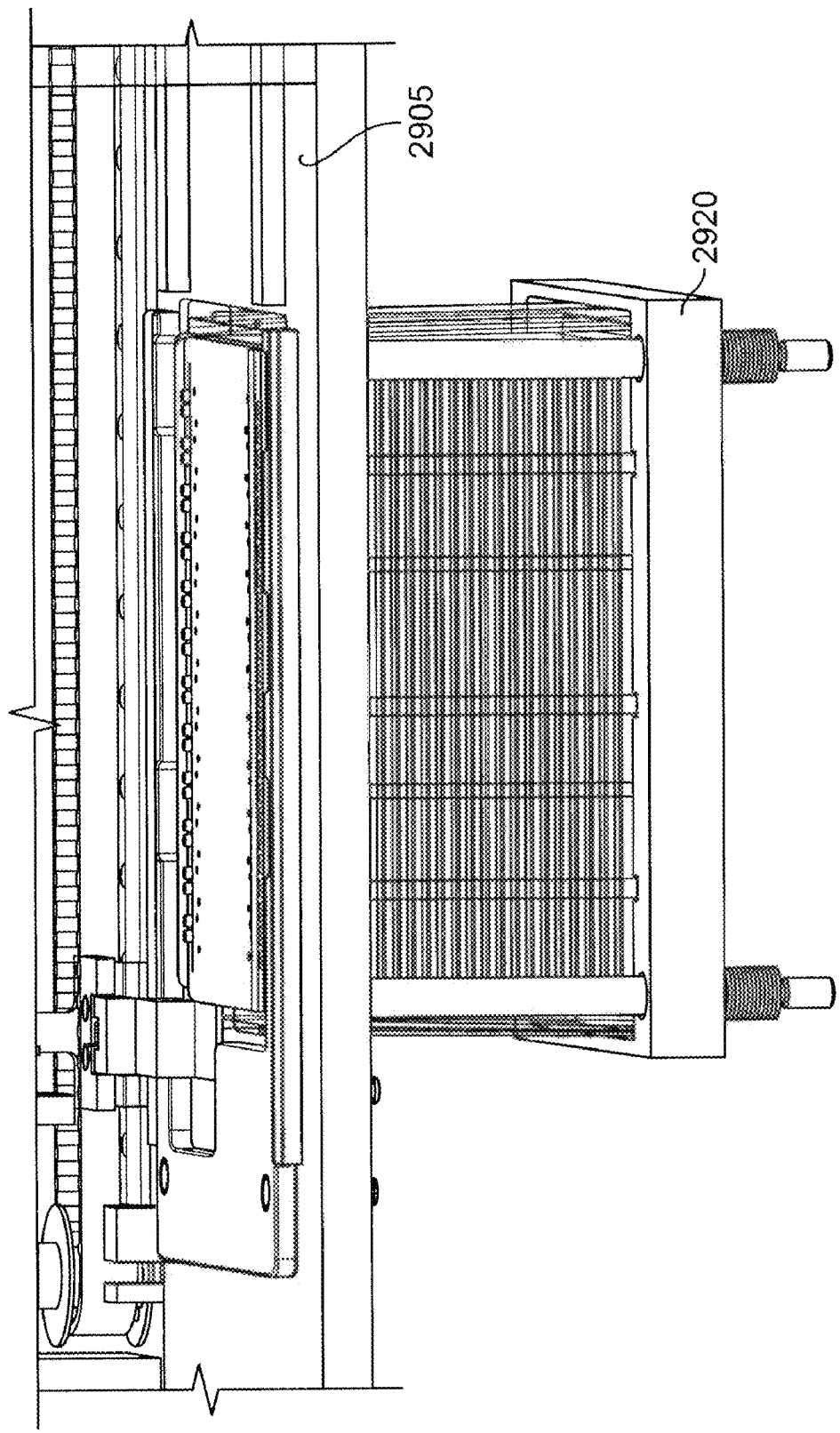
FIG. 26 shows a cartridge stacker in position to deliver a cartridge to an auto-loader.

FIG. 26 is an illustration of an exemplary initial loading position of a cartridge pack 2901 in a depository when samples are loaded in the topmost cartridge in the pack. FIG. 26 shows the cartridge pack 2901 below a plane that contains a cartridge pusher. In other embodiments, the cartridge pack 2901 may be above the plane of a cartridge pusher where the pusher pushes the lowest cartridge out from the holder; or partly above and partly below in a holder 2920 where a cartridge pusher pushes a cartridge from the middle of the cartridge pack 2901. In the embodiment shown in FIG. 26, a topmost cartridge 106 is pushed along two guide rails 2905. Alternatively, there may be more or fewer guide rails (such as one or three) or no guide rails at all so long as a cartridge 2906 can be caused to move to other required positions with reliability and accuracy of positioning.

Figure 27:
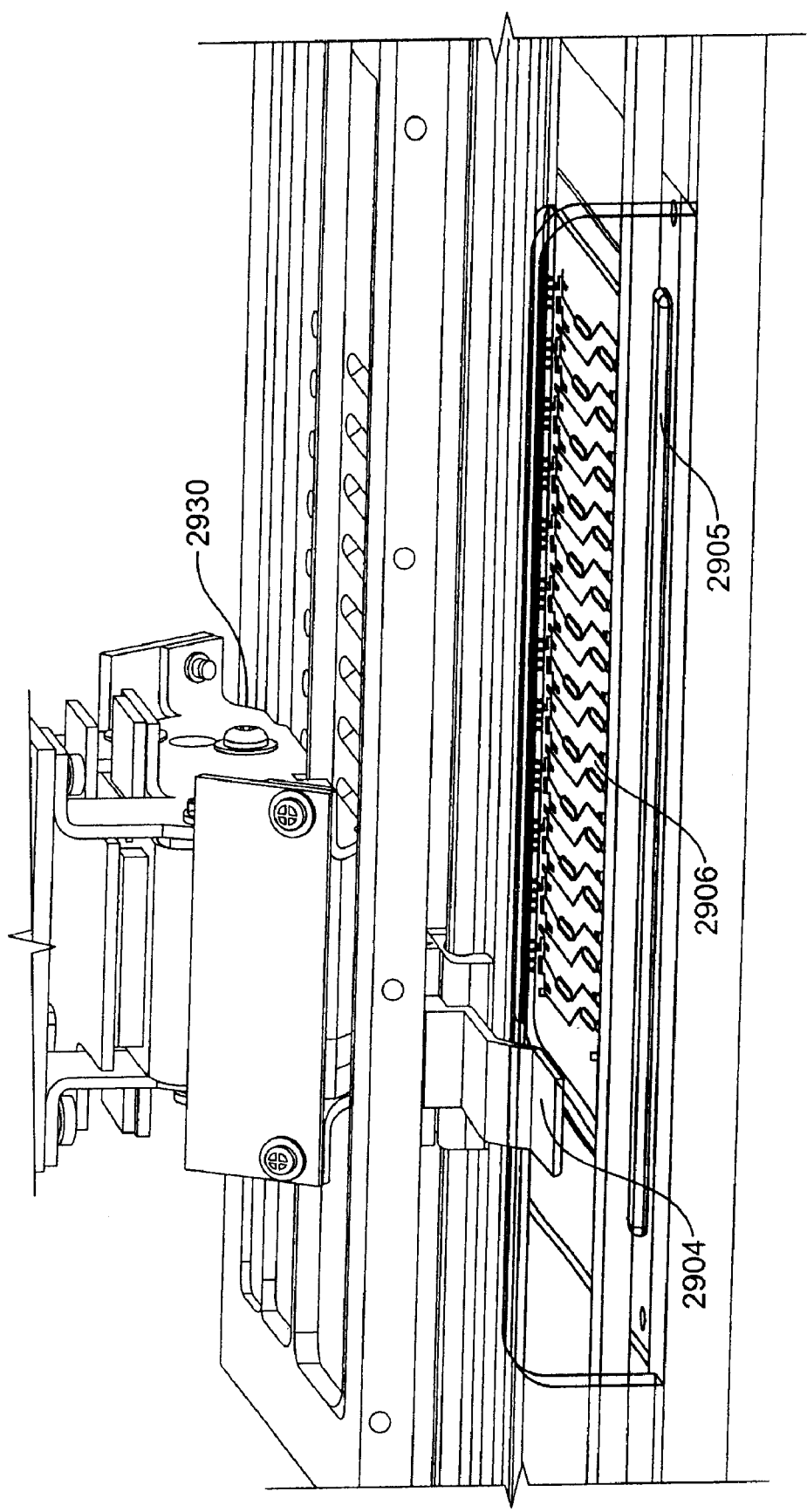
FIG. 27 shows a cartridge loading system.

An exemplary cartridge pusher 2904 is shown in FIG. 27. The cartridge pusher 2904 pushes a cartridge 2906 along guide rails 2905, which allows a cartridge 2906 to travel to pre-calibrated positions by the mechanism of a stepper motor 2930. However, it would be understood that the mechanism of transporting the cartridge 2906 is not limited to a stepper motor 2930 and thus other mechanisms are also consistent with the cartridge pusher 2904 as described herein.

Figure 28:
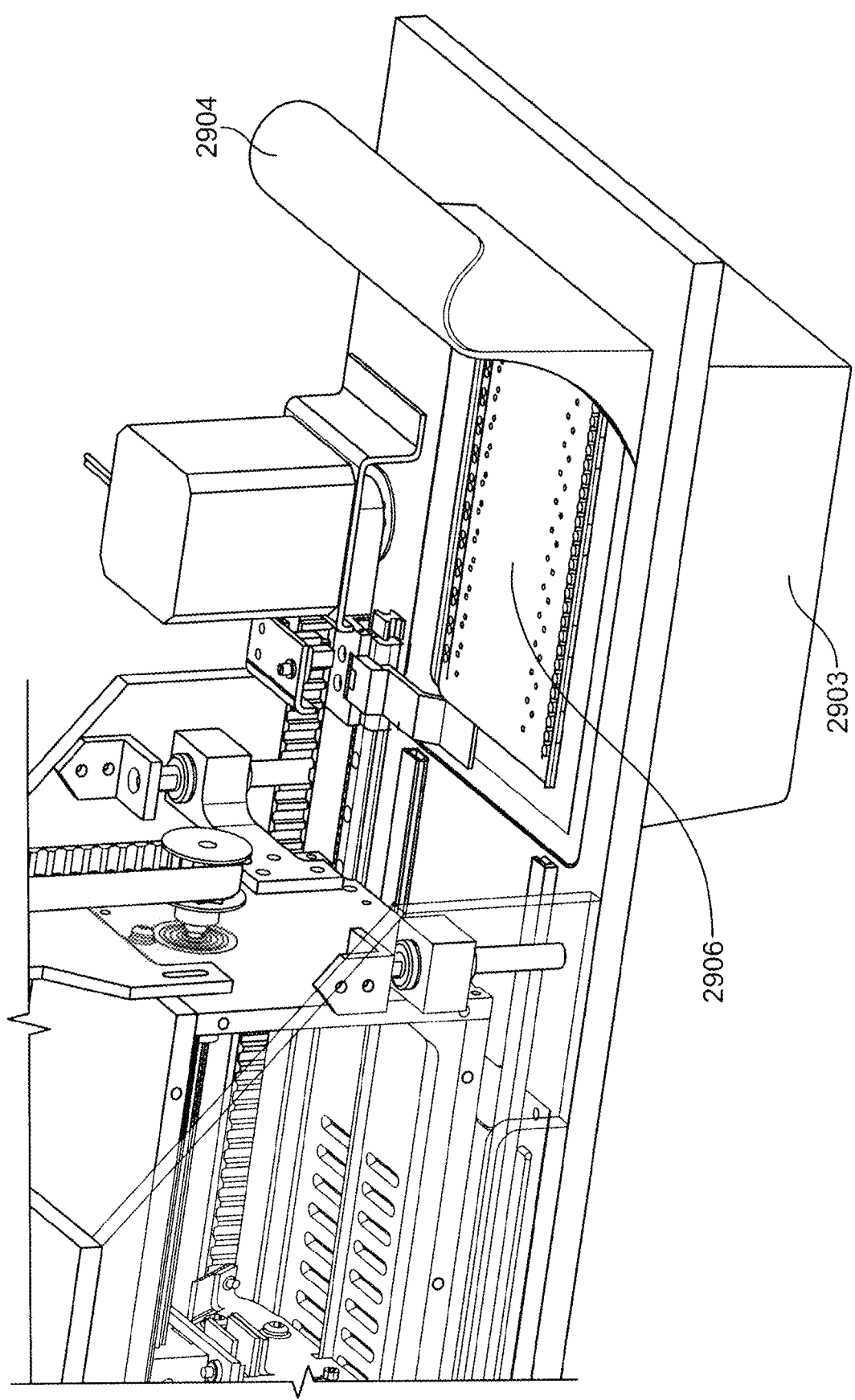
FIG. 28 shows a disposal unit for used cartridges.

FIG. 28 shows a used cartridge 2906 that has been pushed by the cartridge pusher 2904 into the waste cartridge bin 2903 after a PCR process has been completed, such as on multiple samples in the cartridge. The embodiment shows a lipped handle 2940 that facilitates easy handling, such as emptying, of the bin 2903. However, it would be understood that the handle 2904 is not limited to the style and shape shown.

Figure 29:
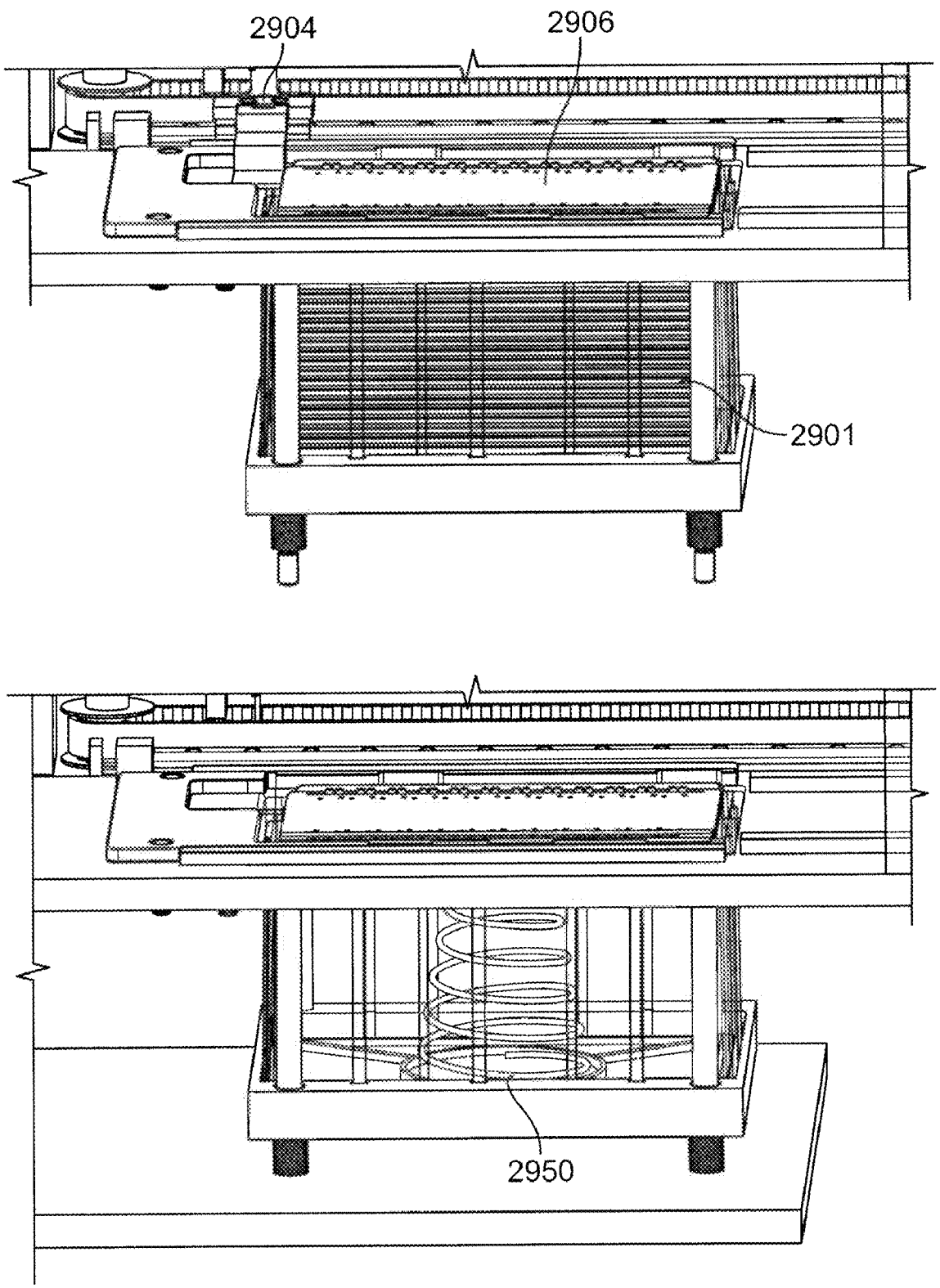
FIG. 29 shows a cartridge stacker in full and empty configurations.

An exemplary cartridge pack 2901, before and after multiple PCR processes are completed, is shown in FIG. 29. After the cartridge pusher 2904 pushes a cartridge 2906 out of the cartridge pack 2901, a spring 2950 at the bottom of the cartridge pack pushes against the lower surface of the stack of cartridges and causes the topmost cartridge to be made available for sample injection. The spring 2950 is not limited in number or type. Thus although a single helical or coiled spring is shown, it is consistent with the description herein that more than one helical or coiled springs could be used, such as 2, 3, or 4, and that alternatively a sprung metal strip, or several strips, could be used. Alternatively another mechanism for forcing the cartridges upwards could be deployed, such as a pneumatic, hydraulic, or inflatable pressurized container, could be utilized.

The cartridge pushing mechanism can also be made to not only push the cartridge from the autoloader box to the detection position, but also be used to move it back to the autoloading position. This will enable unused lanes in the microfluidic cartridge to be used in the next PCR run.

The cartridge autoloading box is also designed so that once all the cartridges are used, the box can be easily recycled or new cartridges added to it. This reduces the cost to the customer and the manufacturer.

It is to be noted that microfluidic cartridges, as further described herein, that have a raised lip along their edges to permit ease of stacking and/or storage in a pack or an autoloader are particularly advantageous because the raised lips also introduce a stiffness into the cartridges and assist in keeping the fluid inlets on one cartridge away from those on another cartridge during storage and transport. The raised regions, which need not only be lips along each edge of a cartridge, also help minimize friction between the lower surface of one cartridge and the upper surface of another during transport and use.

Sample Preparation, and Reagents

In various embodiments, the PCR-ready sample injected into the cartridge can include a PCR reagent mixture comprising a polymerase enzyme, and a nucleotide or a plurality of nucleotides from a biological sample in question. The PCR reagent mixture can be in the form of one or more lyophilized pellets prior to mixing with the sample, and the steps by which the PCR-ready sample is prepared can involve contacting the PCR pellet with liquid to create a PCR reagent mixture solution. In yet another embodiment, each of the PCR chambers in the cartridge may have dried down or lyophilized ASR reagents preloaded such that the user only needs to input prepared polynucleotide sample into the cartridge. In another embodiment, the PCR chambers of the cartridge may have only the application-specific probes and primers premeasured and preloaded, and the user inputs a sample mixed with the PCR reagents.

In various embodiments, the PCR-ready sample further includes a sample buffer, and at least one probe that is selective for a polynucleotide sequence, e.g., the polynucleotide sequence that is characteristic of a pathogen selected from the group consisting of gram positive bacteria, gram negative bacteria, yeast, fungi, protozoa, and viruses.

In various embodiments, the sample can include at least one probe that can be selective for a polynucleotide sequence. The probe can be a fluorogenic hybridization probe. The fluorogenic hybridization probe can include a polynucleotide sequence coupled to a fluorescent reporter dye and a fluorescence quencher dye.

In various embodiments, the PCR ready sample can further include a positive control plasmid and a fluorogenic hybridization probe selective for at least a portion of the plasmid, and the microfluidic cartridge can be configured to allow independent optical detection of the fluorogenic hybridization probe and the plasmid fluorogenic hybridization probe.

In various embodiments, the microfluidic cartridge can accommodate a negative control polynucleotide, wherein the microfluidic network can be configured to independently carry out PCR on each of a neutralized polynucleotide sample and a negative control polynucleotide with the PCR reagent mixture under thermal cycling conditions suitable for independently creating PCR amplicons of the neutralized polynucleotide sample and PCR amplicons of the negative control polynucleotide.

Each lane of a multi-lane cartridge as described herein can perform two reactions because of the presence of two fluorescence detection systems per lane. A variety of combinations of reactions can be performed in the cartridge, such as two sample reactions in one lane, a positive control and a negative control in two lanes, such as adjacent lanes; or a sample reaction and an internal control in one lane and a negative control in a separate lane.

Carrying out PCR on a PCR-ready sample can include heating the PCR reagent mixture and the neutralized polynucleotide sample under thermal cycling conditions suitable for creating PCR amplicons from the neutralized polynucleotide sample; contacting the neutralized polynucleotide sample or a PCR amplicon thereof with at least one probe that is selective for a polynucleotide sequence; independently contacting each of the neutralized polynucleotide sample and a negative control polynucleotide with the PCR reagent mixture under thermal cycling conditions suitable for independently creating PCR amplicons of the neutralized polynucleotide sample and PCR amplicons of the negative control polynucleotide; and/or contacting the neutralized polynucleotide sample or a PCR amplicon thereof and the negative control polynucleotide or a PCR amplicon thereof with at least one probe that is selective for a polynucleotide sequence.

In various embodiments, a method of using the apparatus described herein can further include one or more of the following steps: determining the presence of a polynucleotide sequence in the biological sample, the polynucleotide sequence corresponding to the probe, if the probe is detected in the neutralized polynucleotide sample or a PCR amplicon thereof; determining a contaminated result if the probe is detected in the negative control polynucleotide or a PCR amplicon thereof; and/or in some embodiments, wherein the PCR reagent mixture further comprises a positive control plasmid and a plasmid probe selective for at least a portion of the plasmid, the method further including determining that a PCR amplification has occurred if the plasmid probe is detected.

In various embodiments, the probes used can be selective for a polynucleotide sequence that is characteristic of an organism, for example any organism that employs deoxyribonucleic acid or ribonucleic acid polynucleotides. Thus, the probe can be selective for any organism. Suitable organisms include mammals (including humans), birds, reptiles, amphibians, fish, domesticated animals, wild animals, extinct organisms, bacteria, fungi, viruses, plants, and the like. The probe can also be selective for components of organisms that employ their own polynucleotides, for example mitochondria. In some embodiments, the probe is selective for microorganisms, for example, organisms used in food production (for example, yeasts employed in fermented products, molds or bacteria employed in cheeses, and the like) or pathogens (e.g., of humans, domesticated or wild mammals, domesticated or wild birds, and the like). In some embodiments, the probe is selective for organisms selected from the group consisting of gram positive bacteria, gram negative bacteria, yeast, fungi, protozoa, and viruses.

In various embodiments, the probe can be selective for a polynucleotide sequence that is characteristic of an organism selected from the group consisting of *Staphylococcus* spp., e.g., *S. epidermidis, S. aureus*, Methicillin-resistant *Staphylococcus aureus* (MRSA), Vancomycin-resistant *Staphylococcus; Streptococcus*(e.g., α, β or γ-hemolytic, Group A, B, C, D or G) such as *S. pyogenes, S. agalactiae; E. faecalis, E. durans*, and *E. faecium* (formerly *S. faecalis, S. durans, S. faecium*); nonenterococcal group D streptococci, e.g., *S. bovis* and *S. equines*; Streptococci viridans, e.g., *S. mutans, S. sanguis, S. salivarius, S. mitior, A. milleri, S. constellatus, S. intermedius*, and *S. anginosus; S. iniae; S. pneumoniae; Neisseria*, e.g., *N. meningitides, N. gonorrhoeae*, saprophytic *Neisseria* sp; *Erysipelothrix*, e.g., *E. rhusiopathiae; Listeria* spp., e.g., *L. monocytogenes*, rarely *L. ivanovii* and *L. seeligeri; Bacillus*, e.g., *B. anthracis, B. cereus, B. subtilis, B. subtilus niger, B. thuringiensis; Nocardia asteroids; Legionella*, e.g., *L. pneumonophilia, Pneumocystis*, e.g., *P. carinii*; Enterobacteriaceae such as *Salmonella, Shigella, Escherichia* (e.g., *E. coli, E. coli* O157:H7); *Klebsiella, Enterobacter, Serratia, Proteus, Morganella, Providencia, Yersinia*, and the like, e.g., *Salmonella*, e.g., *S. typhi S. paratyphi* A, B (*S. schottmuelleri*), and C (*S. hirschfeldii*), *S. dublin S. choleraesuis, S. enteritidis, S. typhimurium, S. heidelberg, S. newport, S. infantis, S. agona, S. montevideo*, and *S. saint-paul; Shigella* e.g., subgroups: A, B, C, and D, such as *S. flexneri, S. sonnei, S. boydii, S. dysenteriae; Pro-* teus (*P. mirabilis, P. vulgaris*, and *P. myxofaciens*), *Morganella* (*M. morganii*); *Providencia* (*P. rettgeri, P. alcalifaciens*, and *P. stuartii*); *Yersinia*, e.g., *Y. pestis, Y. enterocolitica; Haemophilus*, e.g., *H. influenzae, H. parainfluenzae H. aphrophilus, H. ducreyi; Brucella*, e.g., *B. abortus, B. melitensis, B. suis, B. canis; Francisella*, e.g., *F. tularensis; Pseudomonas*, e.g., *P. aeruginosa, P. paucimobilis, P. putida, P. fluorescens, P. acidovorans, Burkholderia* (*Pseudomonas*) *pseudomallei, Burkholderia mallei, Burkholderia cepacia* and *Stenotrophomonas maltophilia; Campylobacter*, e.g., *C. fetus fetus, C. jejuni, C. pylori* (*Helicobacter pylori*); *Vibrio*, e.g., *V. cholerae, V. parahaemolyticus, V. mimicus, V. alginolyticus, V. hollisae, V. vulnificus*, and the nonagglutinable vibrios; *Clostridia*, e.g., *C. perfringens, C. tetani, C. difficile, C. botulinum; Actinomyces*, e.g., *A. israelii; Bacteroides*, e.g., *B. fragilis, B. thetaiotaomicron, B. distasonis, B. vulgatus, B. ovatus, B. caccae*, and *B. merdae; Prevotella*, e.g., *P. melaninogenica*; genus *Fusobacterium; Treponema*, e.g. *T. pallidum* subspecies *endemicum, T. pallidum* subspecies *pertenue, T. carateum*, and *T. pallidum* subspecies *pallidum*; genus *Borrelia*, e.g., *B burgdorferi*; genus *Leptospira; Streptobacillus*, e.g., *S. moniliformis; Spirillum*, e.g., *S. minus; Mycobacterium*, e.g., *M. tuberculosis, M. bovis, M. africanum, M. avium M. intracellulare, M. kansasii, M. xenopi, M. marinum, M. ulcerans*, the *M. fortuitum* complex (*M. fortuitum* and *M. chelonei*), *M. leprae, M. asiaticum, M. chelonei* subsp. *abscessus, M. fallax, M. fortuitum, M. malmoense, M. shimoidei, M. simiae, M. szulgai, M. xenopi; Mycoplasma*, e.g., *M. hominis, M. orale, M. salivarium, M. fermentans, M. pneumoniae, M. bovis, M. tuberculosis, M. avium, M. leprae; Mycoplasma*, e.g., *M. genitalium; Ureaplasma*, e.g., *U. urealyticum; Trichomonas*, e.g., *T. vaginalis; Cryptococcus*, e.g., *C. neoformans; Histoplasma*, e.g., *H. capsulatum; Candida*, e.g., *C. albicans; Aspergillus* sp; *Coccidioides*, e.g., *C. immitis; Blastomyces*, e.g. *B. dermatitidis; Paracoccidioides*, e.g., *P. brasiliensis; Penicillium*, e.g., *P. mameffei; Sporothrix*, e.g., *S. schenckii; Rhizopus, Rhizomucor, Absidia*, and *Basidiobolus*; diseases caused by *Bipolaris, Cladophialophora, Cladosporium, Drechslera, Exophiala, Fonsecaea, Phialophora, Xylohypha, Ochroconis, Rhinocladiella, Scolecobasidium*, and *Wangiella; Trichosporon*, e.g., *T. beigelii; Blastoschizomyces*, e.g., *B. capitatus; Plasmodium*, e.g., *P. falciparum, P. vivax, P. ovale*, and *P. malariae; Babesia* sp; protozoa of the genus *Trypanosoma*, e.g., *T. cruzi; Leishmania*, e.g., *L. donovani, L. major L. tropica, L. mexicana, L. braziliensis, L. viannia braziliensis; Toxoplasma*, e.g., *T. gondii*; Amoebas of the genera *Naegleria* or *Acanthamoeba; Entamoeba histolytica; Giardia lamblia*; genus *Cryptosporidium*, e.g., *C. parvum; Isospora belli; Cyclospora cayetanensis; Ascaris lumbricoides; Trichuris trichiura; Ancylostoma duodenale* or *Necator americanus; Strongyloides stercoralis Toxocara*, e.g., *T. canis, T. cati; Baylisascaris*, e.g., *B. procyonis; Trichinella*, e.g., *T. spiralis; Dracunculus*, e.g., *D. medinensis*; genus *Filarioidea; Wuchereria bancrofti; Brugia*, e.g., *B. malayi*, or *B. timori; Onchocerca volvulus; Loa loa; Dirofilaria immitis*; genus *Schistosoma*, e.g., *S. japonicum, S. mansoni, S. mekongi, S. intercalatum, S. haematobium; Paragonimus*, e.g., *P. Westermani, P. Skriabini; Clonorchis sinensis; Fasciola hepatica; Opisthorchis* sp; *Fasciolopsis buski; Diphyllobothrium latum; Taenia*, e.g., *T. saginata, T. solium; Echinococcus*, e.g., *E. granulosus, E. multilocularis*; Picornaviruses, rhinoviruses echoviruses, coxsackieviruses, influenza virus; paramyxoviruses, e.g., types 1, 2, 3, and 4; adnoviruses; Herpesviruses, e.g., HSV-1 and HSV-2; varicella-zoster virus; human T-lymphotrophic virus (type I and type II); Arboviruses and Arenaviruses; Togaviridae, Flaviviridae, Bunyaviridae, Reoviridae; Flavivirus; Hantavirus; Viral encephalitis (alphaviruses [e.g., Venezuelan equine encephalitis, eastern equine encephalitis, western equine encephalitis]); Viral hemorrhagic fevers (filoviruses such as Ebola, Marburg and arenaviruses such as Lassa, Machupo); Smallpox (variola); retroviruses e.g., human immunodeficiency viruses 1 and 2; human papillomavirus (HPV) types 6, 11, 16, 18, 31, 33, and 35.

In various embodiments, the probe can be selective for a polynucleotide sequence that is characteristic of an organism selected from the group consisting of *Pseudomonas aeruginosa, Proteus mirabilis, Klebsiella oxytoca, Klebsiella pneumoniae, Escherichia coli, Acinetobacter Baumannii, Serratia marcescens, Enterobacter aerogenes, Enterococcus faecium*, vancomycin-resistant *enterococcus* (VRE), *Staphylococcus aureus*, methecillin-resistant *Staphylococcus aureus* (MRSA), *Streptococcus viridans, Listeria monocytogenes, Enterococcus* spp., *Streptococcus* Group B, *Streptococcus* Group C, *Streptococcus* Group G, *Streptococcus* Group F, *Enterococcus faecalis, Streptococcus pneumoniae, Staphylococcus epidermidis, Gardenerella vaginalis, Micrococcus* sps., *Haemophilus influenzae, Neisseria gonorrhoeee, Moraxella catarrahlis, Salmonella* sps., *Chlamydia trachomatis, Peptostreptococcus productus, Peptostreptococcus anaerobius, Lactobacillus ferrmentum, Eubacterium lentum, Candida glabrata, Candida albicans, Chlamydia* spp., *Camplobacter* spp., *Salmonella* spp., smallpox (variola major), Yersina Pestis, Herpes Simplex Virus I (HSV I), and Herpes Simplex Virus II (HSV II).

In various embodiments, the probe can be selective for a polynucleotide sequence that is characteristic of Group B *Streptococcus.*

Computer Program Product

In various embodiments, a computer program product, such as a computer readable medium, for use with the apparatus herein includes computer readable instructions thereon for execution by a processor in connection with operating the apparatus.

In various embodiments, the computer program product can include one or more instructions to cause the system to: output an indicator of the placement of the microfluidic cartridge in the bay; read a sample label or a microfluidic cartridge label; output directions for a user to input a sample identifier; output directions for a user to load a sample transfer member with the PCR-ready sample; output directions for a user to introduce the PCR-ready sample into the microfluidic cartridge; output directions for a user to place the microfluidic cartridge in the receiving bay; output directions for a user to close the lid to operate the force member; output directions for a user to pressurize the PCR-ready sample in the microfluidic cartridge by injecting the PCR-ready sample with a volume of air between about 0.5 mL and about 5 mL; and output status information for sample progress from one or more lanes of the cartridge.

In various embodiments, the computer program product can include one or more instructions to cause the system to: heat the PCR ready-sample under thermal cycling conditions suitable for creating PCR amplicons from the neutralized polynucleotide; contact the neutralized polynucleotide sample or a PCR amplicon thereof with at least one probe that is selective for a polynucleotide sequence; independently contact each of the neutralized polynucleotide sample and a negative control polynucleotide with the PCR reagent mixture under thermal cycling conditions suitable for independently creating PCR amplicons of the neutralized polynucleotide sample and PCR amplicons of the negative control polynucleotide; contact the neutralized polynucleotide sample or a PCR amplicon thereof and the negative control polynucleotide or a PCR amplicon thereof with at least one probe that is selective for a polynucleotide sequence; output a determination of the presence of a polynucleotide sequence in the biological sample, the polynucleotide sequence corresponding to the probe, if the probe is detected in the neutralized polynucleotide sample or a PCR amplicon thereof; and/or output a determination of a contaminated result if the probe is detected in the negative control polynucleotide or a PCR amplicon thereof.

In various embodiments, the computer readable instructions are configured to independently actuate one or more microfluidic components (such as valves) of each lane in the microfluidic cartridge, independently of one another, and for causing a detector to measure fluorescence from the PCR reaction zones.

In various embodiments, the computer readable instructions present a user with the option to either get results from all samples as quickly as possible, or from a first batch of samples as quickly as possible and the subsequent batch later on.

EXAMPLES

Example 1

Exemplary 3-Layer Cartridge

This example includes exemplary specifications used to design and assemble a microfluidic cartridge as well as exemplary instructions on the use of the cartridge in, for example, the apparatus described elsewhere herein.
Characteristics In some embodiments, the cartridge has the following functional specifications.

The cartridge includes fluidic components (e.g., microchannels, valves, end vents, reagent inlet holes, reaction chambers, and the like) necessary to perform the functions of the cartridge (e.g., PCR).

The cartridge can be adapted to a one-time use, making it a disposable cartridge that can be disposed of according to typical laboratory procedures.

The cartridge is 4.375 inches long and 2.800 inches wide, with a thickness of 0.094+/−0.005 inches. The cartridge includes features that allow it to interface with, for example, the system described herein. The interfacing features include PCR channel walls and the top of the micro-substrate over the PCR channel that are well polished (SPI A1/A2/A3), enabling easy transfer of excitation and emission light between the PCR reactor (contained in the cartridge) and a detection system. The cartridge includes a thermal interface, located on the bottom of the cartridge, for interfacing with the analyzer. The thermal interface includes a thin laminate (typically less than 150 microns thick, such as 100 microns thick) to encourage heat transfer from the heater wafer to, for example, the PCR channels of the cartridge.

The cartridge includes one or more mechanical interfaces with, for example, the receiving bay of a diagnostic apparatus as described elsewhere herein. For example, the cartridge has a notch in one or more of the corners that can mate with a corresponding shape on the heater module of the receiving bay. The notch and corresponding shape enables the cartridge to be placed only one way in the receiving bay. In some embodiments, the cartridge has a single notch in one of the corners, with the remaining three corners having a minimum radius of 1 mm to facilitate placement of the cartridge in the analyzer.

The cartridge includes a number of inlet holes that are cone-shaped with a height of 1 mm from the top surface of the cartridge. The cone has an inner diameter of 3 mm at the top of the cone and tapers uniformly down to a diameter that matches the width of a microchannel (e.g., an inlet channel) to which the inlet cone is fluidly connected. The inlet channel fluidly connects the inlet hole to a PCR reactor that has an interior volume of, for example, about 4.25 μl to 4.75 μl (e.g., 4.22 μl, 4.5 μl, 4.75 μl, or the like). An outlet microfluidic channel fluidly connects the PCR reactor to an overflow chamber. The cartridge also includes an outlet vent hole.

The microfluidic substrate layer of the cartridge can include one or more of the following specifications. The material of the microsubstrate is optically clear (e.g., has about 90% or greater optical transmission, be 3 mm thick, comply with ASTMD1003, and the like), have auto-fluorescence that is less than that emitted by 2 mm thick ZEONOR 1420R, and have a refractive index of about 1.53 (ASTM D542). The material of the microsubstrate is amenable to the injection molding of features required for the microfluidic networks of the cartridge. The material is typically compatible with all PCR agents and can withstand temperatures of up to about 130° C. for about 5 minutes or more without yielding or melting.

The cartridge includes fiducials, recognizable by suitably configured manufacturing equipment, located in one or more (preferably two) of the corners of the substrate.

Additional features of the substrate material include one or more of the following. Minimum clearances of about 1 mm are present between adjacent functional features to ensure sealing success (e.g., to the analyzer), and to allow simplified fixturing during assembly. The cartridge can include "dog-bones" under small fluid path ends to, for example, increase mold life. The bottom surface of the cartridge can be roughened (e.g., by vapor hone, EDM, or the like prior to attaching laminate to the substrate). The substrate material is capable of adhesion by a label.

In some embodiments, the sealing tape used in the cartridge includes one or more of the following specifications. Laminate can be easily applied to the bottom of the microfluidic substrate. The material of the laminate is essentially pin-hole free. The material of the sealing tape, in particular the adhesive, are compatible with the PCR reaction chemistries. The laminate material and glue used should not autofluoresce. The material can withstand up to 130° C. for 5 minutes without losing adhesion, and without yielding, melting, or causing undue stresses on the cartridge. Bubbles should not form in the adhesive layer upon heating (e.g., to 130° C. for 5 minutes) after application to the microsubstrate. The laminate is less than 5 mils thick (typically 4 mils thick) to, for example, enable rapid heat transfer. (1 mil=1/1000 inch=25.4 microns.)

The high temperature wax included in the cartridge has the following characteristics. The wax should have a melt point of about 90+/−3° C. (e.g., 87° C., 90° C., 93.1° C., or the like), be biocompatible with PCR reactions, have wettability with microsubstrate material, and have a melt viscosity range, for example, of about viscosity at 100° C.=20 mm$^2$/s and Hardness at 25° C.=8 dmm.

The main label on the upper surface of the cartridge has the following characteristics. It has a thickness of 2-4 mils, has suitable bondability to micro features, and seals around the valves, includes cuts for one or more PCR windows, and optionally space for a tab (free from adhesive) for aiding in removal of the cartridge from the analyzer. In embodiments, where a lid of a receiving bay for the cartridge slides over the cartridge, the main label also has resistance to abrasion on its upper surface, and is printable. The main label can have an upper and lower alignment pattern for the label to completely cover the valve holes to permit proper operation of the valves.

Figure 30:
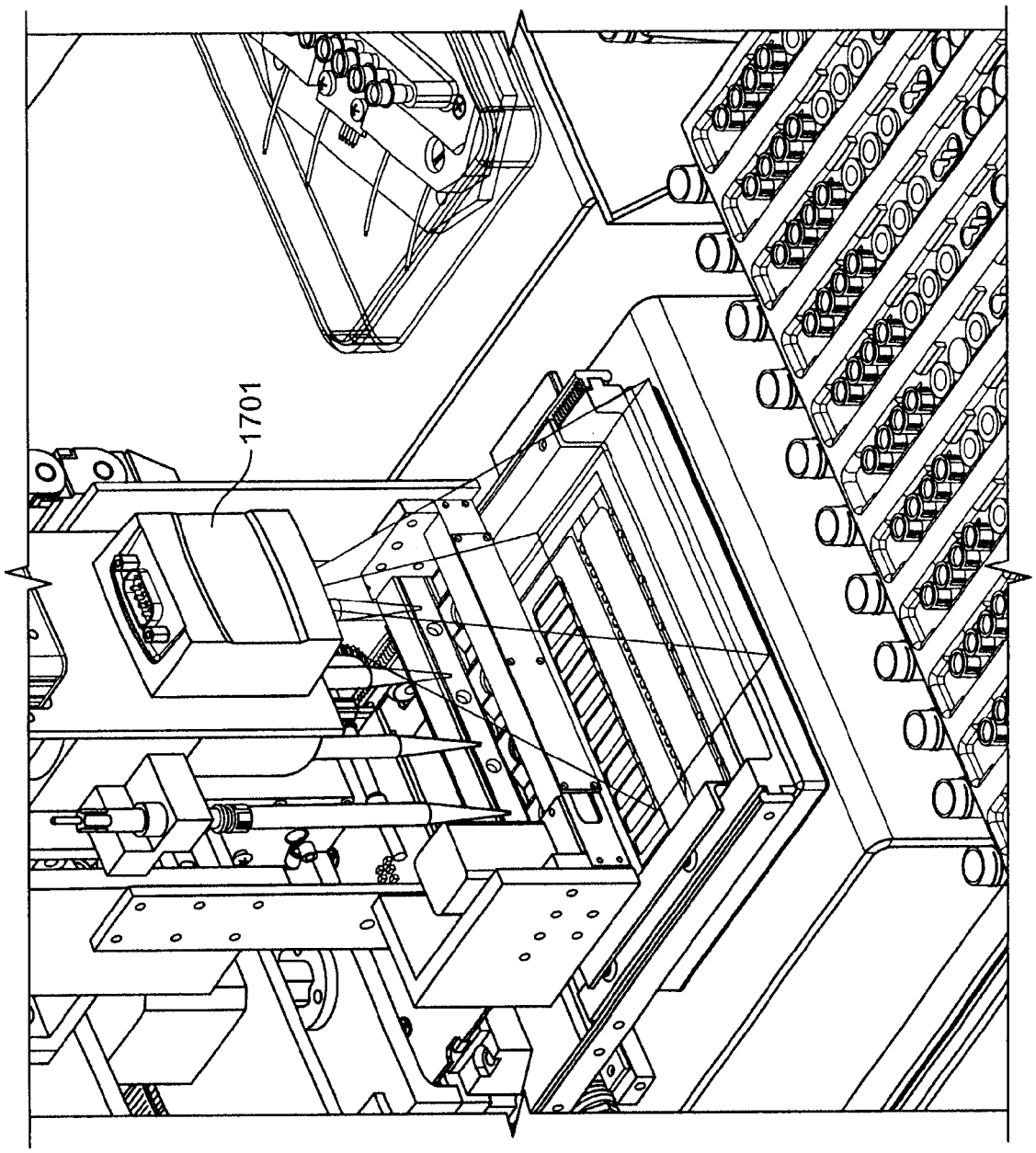
FIG. 30 shows a barcode reader positioned above a microfluidic cartridge.

The cartridge includes a barcode label applied to the top of the cartridge, which is readable by a barcode reader (e.g., the barcode reader included in the apparatus described elsewhere herein) while the cartridge is installed in the analyzer. The barcode label can include the product name, lot #, expiration date, bar code (2D) and may be printed directly onto the cartridge. In addition, or in the alternative, a barcode may be applied directly to the main cartridge label using a laser or inkjet type printer. The label is suitable for being read by a scanning head, for example as depicted in FIG. 30.

The packaging in which the cartridge is shipped includes one or more of the following: package label, carton, carton label, and/or operating instructions. The packaging can be printed on or can have a label attached to it. The cartridge can be placed inside of a plastic bag, shrink/stretch wrap bag, or the like. The cartridge can be stacked and packaged in groups, such as of 12, or 24. It is not critical that the cartridge bagging has a seal but it should be kept free from contamination, such as dust.

Microfluidic Components

The cartridge includes microchannels and holes such that the holes are of a size and shape to enable easy, leak-free interfacing with a 175 µl pipette tip. In some examples, the hole size is between about 200 µm and about 4000 µm in diameter. The microchannels can be between about 50 µm and about 1500 µm wide and between about 50 µm and 1000 µm high.

The cartridge includes valves for controlling the flow of fluid within the cartridge (e.g., through the microchannels, reactor chambers, and the like). The valve edges, steps, and general geometry can be designed to encourage exact flow and/or stoppage required during wax load. The valve geometry can be designed to accommodate limitations of wax dispensing equipment (e.g., +/−25% of 75 nL volume). In some embodiments, step down air chambers on the valves are funnel shaped to aid wax loading and the remaining geometry diminishes from the bottom of the funnel to the end point where the wax stops. The path where the valves are to flow into and block, during use, is narrow enough (e.g., 150-200 microns wide and deep), and has enough length, to effectively seal when the valves are activated during use. The valve wax temperature can be about 90° C. When in use to block a portion of a microchannel, the valves seal to prevent evaporation of fluid and/or physical migration of fluid from the PCR reactor during thermocycling.

The cartridge includes one or more valves (such as temperature controlled, wax-containing valves) for starting, stopping, and/or controlling the flow of material inside the cartridge. The wax contained in the valves is free of trapped air bubbles that have a diameter greater than half the width of the valve channel. The valve channel can have an air pocket. The wax may not intrude into the fluid path (the 150µ channel) prior to activation. The wax can be filled to the start of the flare at the fluid path (i.e., the junction of the 150µ fluid channel and the wax loading channel, see, e.g., FIG. 9A).

The cartridge can include one or more PCR regions for performing PCR on a sample. The channel in the PCR region (the PCR reactor) can be designed such that the temperature of the contents of the channel remain uniformly within about 1° C. of the PCR anneal temperature. The channel walls can have a polish of SPI A1/A2/A3.

Operation

An input PCR sample (e.g., a reaction mixture) can be between about 6.0 and 7.0 µl per PCR lane (e.g., 5.9 µl per lane, 6.4 µl per lane, 7.1 µl per lane, or the like) and is introduced into the cartridge through the inlet hole by, for example, a pipette. A reaction mixture is transported, via the inlet channel, to the PCR reactor where the reaction mixture is isolated (e.g., sealed off by valves) to prevent evaporation or movement (leakage) of the reaction mixture during thermocycling. Once the various reaction mixtures are sealed inside their respective chambers, the diagnostic apparatus initiates multiplexed real-time PCR on some or all of the reaction mixtures (e.g., 4.5 µl, an amount of fluid equal to the inner volume of the reaction chamber, or the like).

In some embodiments, the cartridge is designed to be able to perform diagnostic tests within a temperature range of about 59° F. to about 86° F. (about 15° C. to about 30° C.) and a humidity range of about 15% relative humidity to about 80% relative humidity. The cartridge is designed to be safe and functional when used indoors, used at an altitude of 2000 m or less, and used under non-condensing humidity conditions (e.g., maximum relative humidity of 80% for temperatures up to 31° C. decreasing linearly to 50% relative humidity at 40° C.).

In use, end-product of PCR, produced in the cartridge, can remain in the used cartridge to, for example, minimize the likelihood of cross contamination.

The cartridge can be designed such that a drop from a height of 4 foot, while in its packaging, will not damage the cartridge. The cartridge is designed to perform without damage after exposure to the following conditions. The cartridge should be stored at 4° C. to 40° C. for the rated shelf life. Exposure to temperatures between −20° C. and 4° C. or 40° C. and 60° C. should occur for no longer than 24 hours. The cartridge can withstand air pressure changes typical of air transport.

The cartridge can be labeled with the following information (e.g., to identify the cartridge, comply with regulations, and the like). The label can contain a "Research Use Only" label, if applicable, and a CE mark, if applicable. The label can contain the company name and logo (e.g., HandyLab®), a part number (e.g., 55000009), a part name (12x Cartridge-nonvented), a lot number (e.g., LOT 123456), an expiration date (e.g., in month and year format, such as "06/2015"), space for writing, a barcode according to barcode specifications (described elsewhere), and/or manufacturer name and address, e.g., "Handylab, Inc., Ann Arbor, Mich. 48108 USA".

The cartridge can be provided in a carton that contains information on its exterior or interior such as: a part number (e.g., 55000009), a part name (12x Cartridge-nonvented), a quantity (e.g., 24), a lot number (e.g., LOT 123456), an expiration date (e.g., 06/2015), an optional UPC code, a manufacturer's statement and contact details, such as "Manufactured by Handylab, Inc., Ann Arbor, Mich. 48108 USA", a carton label to state storage limits, a CE mark (if applicable), and/or an AR name and address.

The cartridge packaging can include paper wrap to secure multiple cartridges together, and clean package fill to prevent damage, for example, from vibration. The cartridge shipping carton can include features such as, compliance to ASTM 6159, carton may be stored in any direction, refrigeration or fragile labeling of the carton may not be required, and additional cold packs may not be required. The shelf life of the cartridge is 12 months or more.

The cartridge complies with IEC 61010 (NRTL tested) and an FDA listing may be required for clinical distribution. Cartridges used in a clinical lab device typically meet all quality system requirements. Cartridges used for research only in a commercial device may meet all quality system requirements of a particular research institution, or HandyLab, Inc. Cartridges for research use only (Alpha or Beta testing) may be design/manufacturing traceable to a device history record (DHR) (such as a manufacturing record).

The cartridge has a maximum limit of detection equal to 20 copies per reaction volume (i.e., 20 copies/4µ), with a target detection of 10 copies per reaction volume. The cartridge can perform 45 reaction cycles in 40 minutes or less (e.g., 45 cycles in 40 minutes, 45 cycles in 20 minutes, 45 cycles in 15 minutes). The cartridge can utilize two color detection using, for example, the FAM (or equivalent) and CAL RED (or equivalent) fluorescent dyes. Results obtained using the cartridge have been compared with the results obtained using standard real-time PCR instruments.

During use (e.g., when placed in a system described herein and performing a function such as PCR), the cartridge is pressed, on one side, by the optics block, against the heater wafer (positioned against the opposite side), with a pressure of about 1 psi or greater (e.g., 0.99 psi, 1.2 psi, or the like). When located in the tray of the analyzer, the cartridge has an alignment slop of +/−200 microns to enable a user to easily place and remove the cartridge from the analyzer tray. The cartridge has two ledges, that are each 1 mm wide and located along the two long edges of the cartridge, to enable the heating (lower) surface of the cartridge to extend below the datum of the tray and therefore make effective contact with the upper surface of the heater unit.

Cartridge Manufacturing:

Existing semi-automatic equipment for laminating & waxing (Think & Tinker DF-4200, & Asymtek Axiom Heated Jet Platform, respectively) can be utilized to meet all cartridge manufacture requirements. An exemplary protocol is as follows:

Laminate micro substrate & trim excess.
Fill valves with hot wax & inspect.
Apply label & barcode.
Band 24 pieces together.
Bag & seal banded cartridges, label bag.
Place bag & insert(s) into carton, seal and label.

Venting is not required on this cartridge, which eliminates the most time consuming process for cartridge manufacture, along with the highest risk and highest cost for fully integrated automation. (In embodiments, where a hydrophobic membrane needs to be attached, the membrane requires careful placement, alignment, and pressure sealing at a properly regulated temperature.) Over 1,000 pieces of the 12-up without venting have been successfully produced.

Example 2

Exemplary Chemistry and Processes of Use

The chemistry typically performed in conjunction with the microfluidic cartridge herein centers around the detection and identification of organisms in a clinical specimen, by virtue of detecting nucleic acids from the organism in question. This involves isolation of nucleic acids from target organisms that are contained in a clinical specimen, followed by a process that will detect the presence of specific nucleic acid sequences. In addition to target detection, an internal positive control nucleic acid is added to the collection buffer, and is taken through the entire extraction and detection process along with target nucleic acids. This control monitors the effectiveness of the entire process and minimizes the risk of having false negative results.

Nucleic Acid Extraction and Purification

Nucleic acid extraction procedures begin with the addition of a clinical specimen to a prepared specimen collection solution. This can be done either at a specimen collection site, or at the testing site. Two collection solution formats are available: one for body fluids, and one for swab specimens. Collection solutions used at collection sites serve as specimen transport solutions, and therefore, this solution must maintain specimen and analyte integrity.

The extraction and purification procedure, which can be entirely automated, proceeds as follows:

Target organisms are lysed by heating the detergent-containing collection solution.
Magnetic beads, added to the specimen/collection solution mix, non-specifically bind all DNA that is released into the solution.
Magnetic beads are isolated and are washed to eliminate contaminants
DNA is released from the beads using high pH and heat.
DNA containing solution is removed and neutralized with a buffer Nucleic Acid Amplification Nucleic acids that have been captured by magnetic beads, washed, released in high pH, and neutralized with buffer, are added to a mixture of buffers, salts, and enzymes that have been lyophilized in a tube. The mixture is rapidly rehydrated, and then a portion of the solution is loaded onto a microfluidic cartridge. The cartridge is then loaded into the amplification instrument module, which consists of a heating unit capable of thermal cycling, and an optical detection system. Detection of target nucleic acids proceeds as follows:

The liquid is sealed in a reaction chamber.
Rapid thermal cycling is used to potentiate the Polymerase Chain Reaction (PCR), which is used to amplify specific target DNA.
Amplified DNA fluoresces, and can be detected by optical sensors.
A fluorescent probe "tail" is incorporated into each amplified piece of DNA
At a specific temperature, the probe adopts a conformation that produces fluorescence (this is termed a "scorpion" reaction).
Fluorescence is detected and monitored throughout the reaction.

Extraction and Amplification/Detection Process

Extensive bench-scale testing has been carried out to optimize the nucleic acid extraction chemistry, including the collection buffer, the wash buffer formulation, the release solution formulation, and the PCR reagent mixes. The fully automated method of extraction, followed by 12-up PCR, was able to provide very high sensitivity consistently at 150 copies/sample.

Examples: Chlamydia in Urine (50/50); Gonorrhoea in Urine; GBS in Plasma.

Various detection chemistries, such as Taqman, Scorpion, SYBRg Green, work reliably in the microfluidic cartridge.

Reagent Manufacturing

Feasibility studies were conducted in order to determine whether PCR reagents could be lyophilized in PCR tubes besides the use of 2 µl lyophilized pellets. The studies have indicated that sensitivity of reactions performed using tube-lyophilized reagents is equivalent to that of wet reagents or 2 µl pellet reagents, so feasibility has been proven. Stability studies for this format indicate similar stability data. 2 microliter lyophilized PCR pellets have been found to be stable to up to 2 years at room temperature, once sealed in nitrogen atmosphere.

There are currently seven individual, blended chemistry components identified for potential use with the system described herein. Mixing, blending and processing reagents/chemicals can be performed at HandyLab, Inc., with existing equipment already in place.

Collection buffer, wash, release and neutralization liquids are simple recipes with very low risk, and can be made in large batches to keep labor costs of mixing/blending at or below targeted projections. They can be mixed and placed into intermediate containers for stock, and then issued to a manufacturer of reagent holders for dispensing.

Affinity Beads (AB) have good potential to be stored and used as a liquid in the strip, but design contingencies for using a lyophilized pellet are in place as a back up. It is important to keep the beads suspended in solution during dispense. Dispense equipment (e.g., manufactured by Innovadyne) that provides agitation for continuous suspension during dispense has been identified for achieving this, once stability has been proven for liquid AB storage in the strip. The process to manufacture and magnetize the Affinity Beads spans a 9 hour cycle time to produce a batch of 2,000 aliquots, but that same time period can be used for scaled up recipe batches once we ramp into high volume production. This item has the highest labor content of all chemistry manufacture that is currently required for the apparatus.

PCR reagents/enzymes can be freeze-dried in a lyophilizing chamber (e.g., Virtis Genesis) but will not require spherical pellet formation. Instead, the mixture can be dispensed into, and then lyophilized, inside the end-use tube. First the various reagents are mixed, and then the following steps are performed to accomplish lyophilization: Individual tubes are placed into a rack/fixture, and the solution is dispensed into each, using existing equipment (e.g., EFD Ultra Dispense Station). The filled rack is placed inside a stainless steel airtight box (modified to accept stoppers in the lid) and then placed into the lyophilization chamber, and the drying cycle commences unattended. During lyophilization, the stoppers are in a raised position allowing air/nitrogen to circulate into, and moisture to exit the stainless box holding racks of vials. At the end of the cycle, the shelves of the lyophilization chamber lower to seat the stoppers into the lid, forming a seal while still inside the closed chamber, in a moisture free nitrogen atmosphere. The steel boxes are then removed from the chamber, and each rack inside is processed in a single operation to seal all vials in that rack. Immediately after sealing, the vials are die cut from the foil in one operation, allowing individual vials to be forwarded to the manufacturer for placement into a reagent holder. Internal control can either be added to an existing solution, or can be dispensed into its own cavity in the manner of the collection buffer, wash, neutralization, and release solutions. If lyophilization is required, it will be accomplished in the same manner as the PCR chemistry, and later snapped into the strip. Shelf life stability studies are underway.

Real-Time PCR

After all the appropriate PCR lanes of the PCR cartridge are loaded with final PCR solution, the tray containing the cartridge moves it in the PCR Analyzer. The cartridge is pressed by the optical detection read-head against the heater. Heaters activate valves to close either ends of the PCR reactor and real-time thermocycling process starts. After completing appropriate PCR cycles (~45 cycles), the analyzer decides whether the sample has the target DNA based on the output fluorescence data.

Example 3

Exemplary Diagnostic Apparatus

The apparatus, in combination with the associated consumables (reagents, cartridges, etc.), automatically performs all aspects of nucleic acid testing, including sample preparation, amplification, and detection for up to 48 samples per hour with the first 24 results available in less than an hour. The system is straightforward to use. An operator simply aliquots a portion of the patient sample into a dedicated tube that contains pre-packaged buffer. The operator places the dedicated tubes into positions on a sample rack. The operator then loads a disposable plastic reagent strip for the appropriate test in the rack. The only other consumable used in the apparatus are microfluidic PCR cartridges for conducting amplification and detection; each cartridge is capable of performing up to twelve PCR tests and two cartridges can be loaded into the analyzer at once. Should the apparatus require a new PCR cartridge, the apparatus will prompt the operator to load the cartridge. The apparatus will then prompt the operator to close the lid to initiate testing. All consumables and sample tubes are barcoded for positive sample identification.

Sample lysis and DNA preparation, which will require approximately half an hour for a full run of 24 samples, is automatically performed by the analyzer's robotic and liquid handling components using protocols and reagents located in unitized, disposable plastic strips. The apparatus then automatically mixes the sample and PCR reagents, and injects the mixture into a cartridge that will be automatically processed by an integrated PCR machine. Rapid, real time PCR and detection requires less than 20 minutes. Results, which will be automatically available upon completion of PCR, are displayed on the instrument's touch screen, printed or sent to the hospital information system, as specified by the user (or the user's supervisor).

Each instrument can process up to 24 samples at a time with a total throughput of 48 samples per hour after the first run. The apparatus is slightly less than 1 m wide and fits easily on a standard lab bench. All operations of the unit can be directed using the included barcode wand and touch screen. The analyzer can be interfaced with lab information systems, hospital networks, PCs, printers or keyboards through four USB interfaces and an Ethernet port.

The apparatus has the following characteristics.

Sensitivity: the apparatus will have a limit of detection of ~50 copies of DNA or RNA. (and may have a limit of detection as low as 25-30 copies of DNA/RNA).

Cost per Test: Due to the miniaturized, simplified nature of the reagents described herein and also in U.S. patent application Ser. No. 12/172,208, filed Jul. 11, 2008 and incorporated herein by reference, cartridge, and other consumables, the cost of goods per test will be relatively low and very competitive.

Automation: By contrast with current "automated" NAT systems, which all require some degree of reasonably extensive technologist interaction with the system, through the use of unitized tests and full integration of sample extraction, preparation, amplification and detection, the apparatus herein will offer a higher level of automation, and corresponding reduction in technologist time and required skill level, thereby favorably impacting overall labor costs.

Throughput: Throughput is defined as how many tests a system can conduct in a given amount of time. The apparatus will be capable of running 45 tests per hour, on average.

Time to First Result: In a hospital environment, time to first result is an especially important consideration. The apparatus will produce the first 24 results in less than an hour and an additional 24 results every half hour thereafter.

Random Access and STAT: Random access is the ability to run a variety of tests together in a single run and place samples in unassigned locations on the analyzer. Also, with chemistry and immunoassay systems, it is desirable to be able to add tests after a run has started. This is often referred to as "true random access" since the user is provided complete flexibility with regard to what tests can be run where on an analyzer and when a new sample can be added to a run. A STAT is a sample that requires as rapid a result as possible, and therefore is given priority in the testing cue on the analyzer. Today, essentially all chemistry and immunoassay analyzers are true random access and offer STAT capabilities. For NAT, however, very few systems offer any random access or STAT capabilities. The instrument herein will provide random access and STAT capabilities.

Menu: The number and type of tests available for the analyzer is a very important factor in choosing systems. The apparatus herein deploys a launch menu strategy that involves a mix of high volume, "standard" nucleic acid tests combined with novel, high value tests.

The apparatus enables 24 clinical samples to be automatically processed to purify nucleic acid, mix the purified DNA/RNA with PCR reagents and perform real-time PCR in microfluidic cartridge to provide sample to results in an hour. The exemplary apparatus has two PCR readers, each capable of running a 12 lane microfluidic cartridge using an optical system that has dedicated two-color optical detection system.

The apparatus has the following sub-systems:
Two sample processing racks, each rack processes up to 12 clinical samples in unitized disposable strips
Magnetic separator-cum-tube heater assembly (24 heating stations)
A four-probe liquid dispensing head
3-axis gantry to move the pipette head
Two PCR amplification-detection stations, each capable of running PCR in the lanes of a 12-lane microfluidic cartridge, and dedicated 2-color optical detection system for each PCR lane.
Control electronics
Barcode reader Operation: The user gets a work list for each sample, whether they want to detect certain target analyte (such as GBS, Chlamydia, Gonorrhoea, HSV) for each clinical sample. The sample tubes are placed on the rack and for each sample, the user slides in a disposable reagent holder (analyte specific) into a corresponding lane of the rack. The reagent holder has all the sample prep reagents, PCR reagents, process tubes as well as disposable pipettes already prepackaged in it. Once all disposables are loaded into the rack, the rack is placed in its location on the instrument. The user then places two 12-lane microfluidic PCR cartridges in the two trays of the PCR reader. The user then closes the door of the instrument and starts the sample processing using the GUI (Graphical User Interface).

The instrument checks functionality of all subsystems and then reads the barcode of the sample tubes, the unitized reagent disposables and the microfluidic cartridges. Any mismatch with a pre-existing work list is determined and errors are flagged, if necessary. The instrument than goes through a series of liquid processing, heating, magnetic separation to complete the sample preparation steps for the each of the clinical sample, mixes the purified nucleic acid with PCR reagents and dispenses the final mix into a lane of the microfluidic cartridges. After a microfluidic cartridge is loaded with the final PCR mix, the cartridge tray moves and aligns the cartridge in the reader and the optical detection system presses the cartridge against a microfluidic PCR heater surface. On-chip valves are actuated to close the reaction mix and then thermocycling is started to initiate the PCR reaction. At each cycle of PCR (up to 45 cycles), fluorescence from each PCR lane is detected by the optical detection system (2-colors per PCR lane) and final result is determined based on the threshold cycle (Ct).

The sample preparation steps for 24 samples are performed in about 40 minutes and the PCR reaction in about 20 minutes.

Sample Reader

Figure 31A:
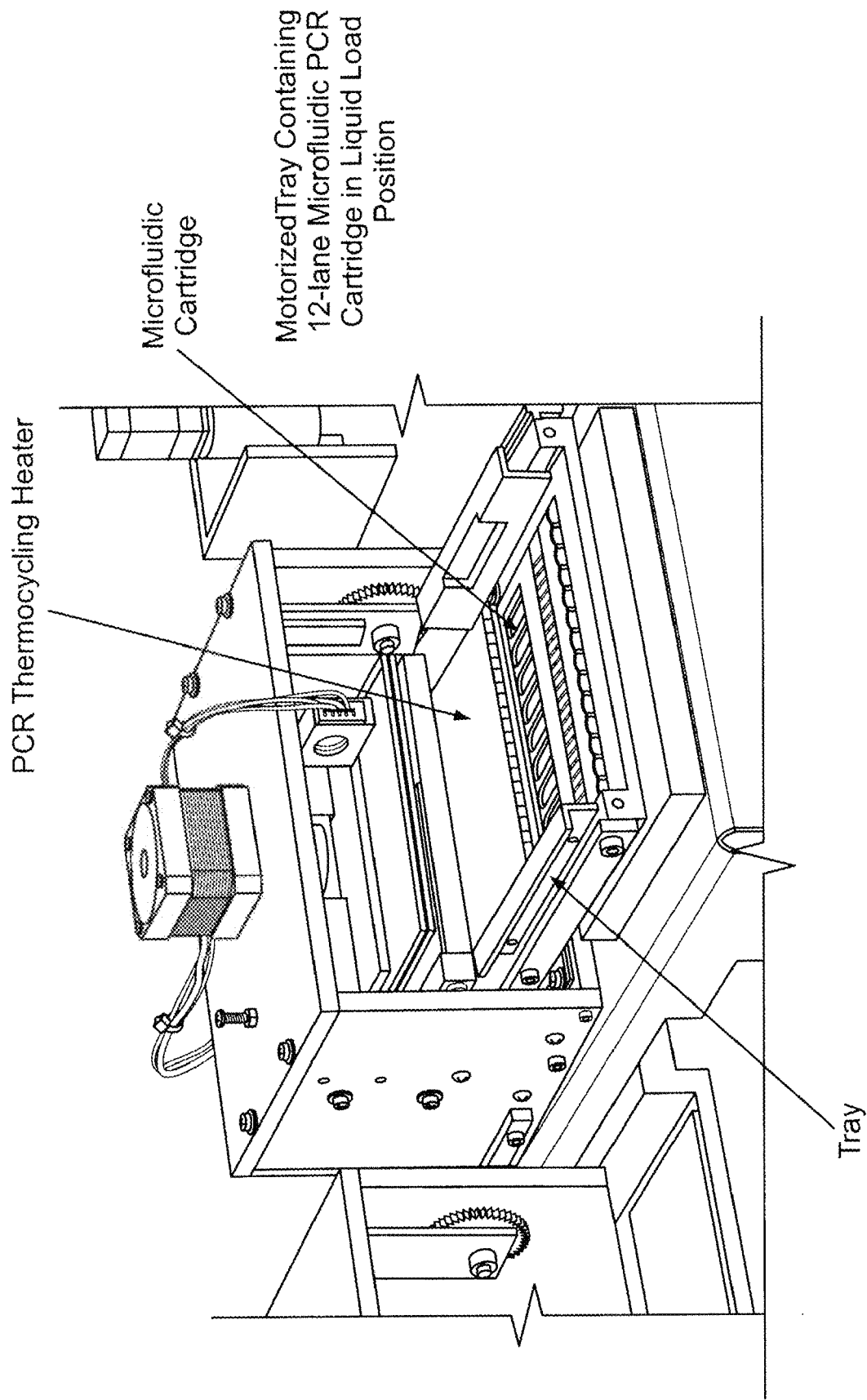
FIGS. 31A and 31B show a thermocycling unit configured to accept a microfluidic cartridge.
Figure 31B:
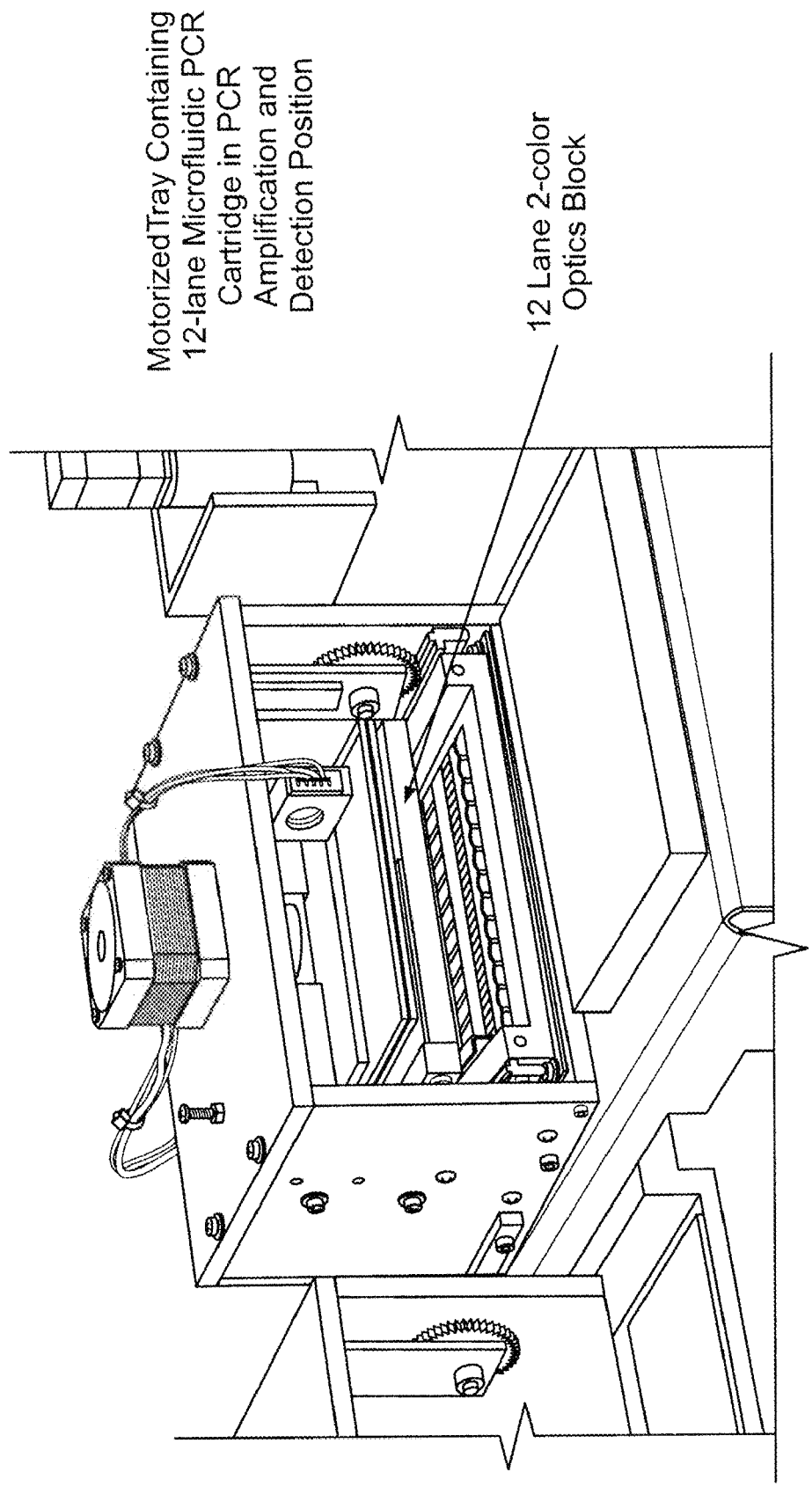

The Reader performs function testing of up to twelve properly prepared patient samples by PCR process (real-time PCR) when used in conjunction with microfluidic (test) cartridges as further described herein. Each unit employs two Reader Modules for a total of up to twenty four tests. (FIGS. 31A and 31B) Operation of the Reader is designed for minimal user interaction, requiring the loading and unloading of test cartridges only. During the "Load Disposables" sequence, the Reader will present a motor actuated tray for installation of the disposable cartridge. Sliding a small knob located in the front of the tray, a spring loaded protective cover will raise allowing the test cartridge to be nested properly in place. The cover is then lowered until the knob self-locks into the tray frame, securing the cartridge and preventing movement during the sample loading sequence.

Once the prepared samples have been dispensed via pipettes into the cartridge, the tray will retract into the Reader, accurately positioning the test cartridge beneath the chassis of the optical assembly. The optical assembly will then be lowered by a captured screw driven stepper motor until contact is made with the test cartridge. At this point the test cartridge is located ⅛" above the target location on the heater assembly. As downward motion continues the test cartridge and its holder within the tray compress springs on the tray frame (these are used later to return the cartridge to it's normal position and able to clear the encapsulated wire bonds located on the heater assembly during tray operation). Movement of the test cartridge and optical assembly is complete once contact with the heater assembly is made and a minimum of 2 psi is obtained across the two-thirds of the cartridge area about the PCR channels and their controlling gates. At this point the testing of the cartridge is performed using the heater assembly, measured with onboard optics, and controlled via software and electronics much in the same manner as currently operated on similar diagnostic instruments.

Once the functional testing is complete the main motor raises the optic assembly, releasing pressure on the test cartridge to return to its normal position. When commanded, the tray motor operating in a rack-and-pinion manner, presents the tray to the customer for cartridge removal and disposal. When the tray is in the extended position it is suspended above a support block located on the apparatus chassis. This block prevents the cartridge from sliding trough the holder in the tray during loading and acts as a support while samples are pipetted into the disposable cartridge. Also provided in this support block is an assist lever to lift and grasp the disposable cartridge during removal. All components of the tray as well as support block and cartridge lift assist are removable by the customer, without tools, for cleaning and reinstalled easily.

Microfluidic PCR Heater Module

The microfluidic PCR heater module comprises a glass wafer with photolithographically defined microheaters and sensors to accurately provide heat for actuation of valves and performing thermocycling required to perform a real-time PCR reaction. The wafer surface has dedicated individually controlled heating zones for each of the PCR lanes in the microfluidic cartridge. For a 12-lane cartridge, there are 12 PCR zones; in the 24-up cartridge, there are 24 PCR heating zones. The individual heaters and sensors are electrically connected to a Printed circuit board using gold or aluminum wire bonds. A thermally compliant encapsulant provides physical protection to the wirebonds. While the present device is made on glass wafer, heaters can be fabricated on Si-on-Glass wafers and other polymeric substrates. Each substrate can provide specific advantages related to its thermal and mechanical properties. Besides using photolithography process, such heating substrates can also be assembled using off-the-shelf electronic components such as power resistors, peltiers, transistors, maintaining the upper heating surface of each of the component to be at the same level to provide heating to a microfluidic cartridge. Temperature calibration values for each temperature sensor may be stored in EEPROM or other memory devices co-located in the heater PC Board.

Example 4

Exemplary High-Efficiency Diagnostic Apparatus

A more highly multiplexed embodiment, enables 24 clinical samples to be automatically processed to purify nucleic acids, mix the purified DNA/RNA with PCR reagents and perform real-time PCR in a microfluidic cartridge. This product has a single PCR reader, with a scanning read-head, capable of reading up to 4 different colors from each of the PCR lanes in a microfluidic cartridge. The cartridge has 24 PCR channels enabling a single cartridge to run all 24 clinical samples. In addition, this apparatus includes a cartridge auto-loader, whereby the instrument automatically feeds the PCR reader from a pack of cartridges and discards each used cartridge into a waste tray.

The apparatus has the same sub-systems as the apparatus of Example 3, herein, except in the following: a single PCR amplification-detection station capable of running a 24-lane microfluidic cartridge is used in place of two such stations each running 12-lane cartridges; a scanner unit can detect up to 4 colors from each PCR lane in place of a 2-color optical detection system; and an autoloader unit to feed 24-lane microfluidic cartridge from a box into the PCR detection unit can be used in place of manual loading of a cartridge.

Operation of the instrument is similar to that of the instrument in Example 3, herein, except that a single 24-lane cartridge is loaded, either manually, or from the auto-loader and used cartridge is then pushed out automatically into a waste cartridge bin. Microfluidic cartridges are stored in a cartridge pack (maximum 24 cartridges) and the instrument alerts the user to replace the cartridge pack and empty out the waste cartridge bin once all cartridges from the pack are used up.

Example 5

Exemplary 24-Lane Cartridge

Figure 32A:
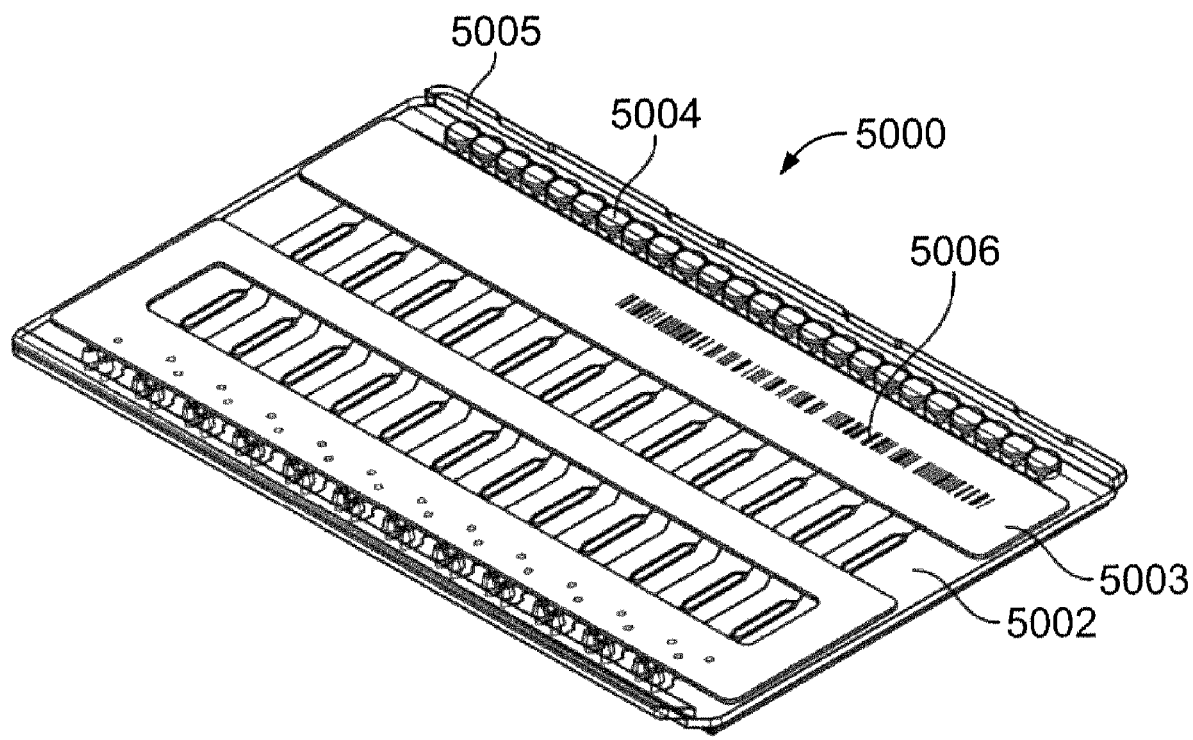
FIG. 32A shows a plan view of a 24-lane microfluidic cartridge.

Various views of an exemplary 24-lane cartridge 5000 are shown in FIGS. 32A (perspective view), 32B (plan view), and 32C (exploded view).

Figure 32B:
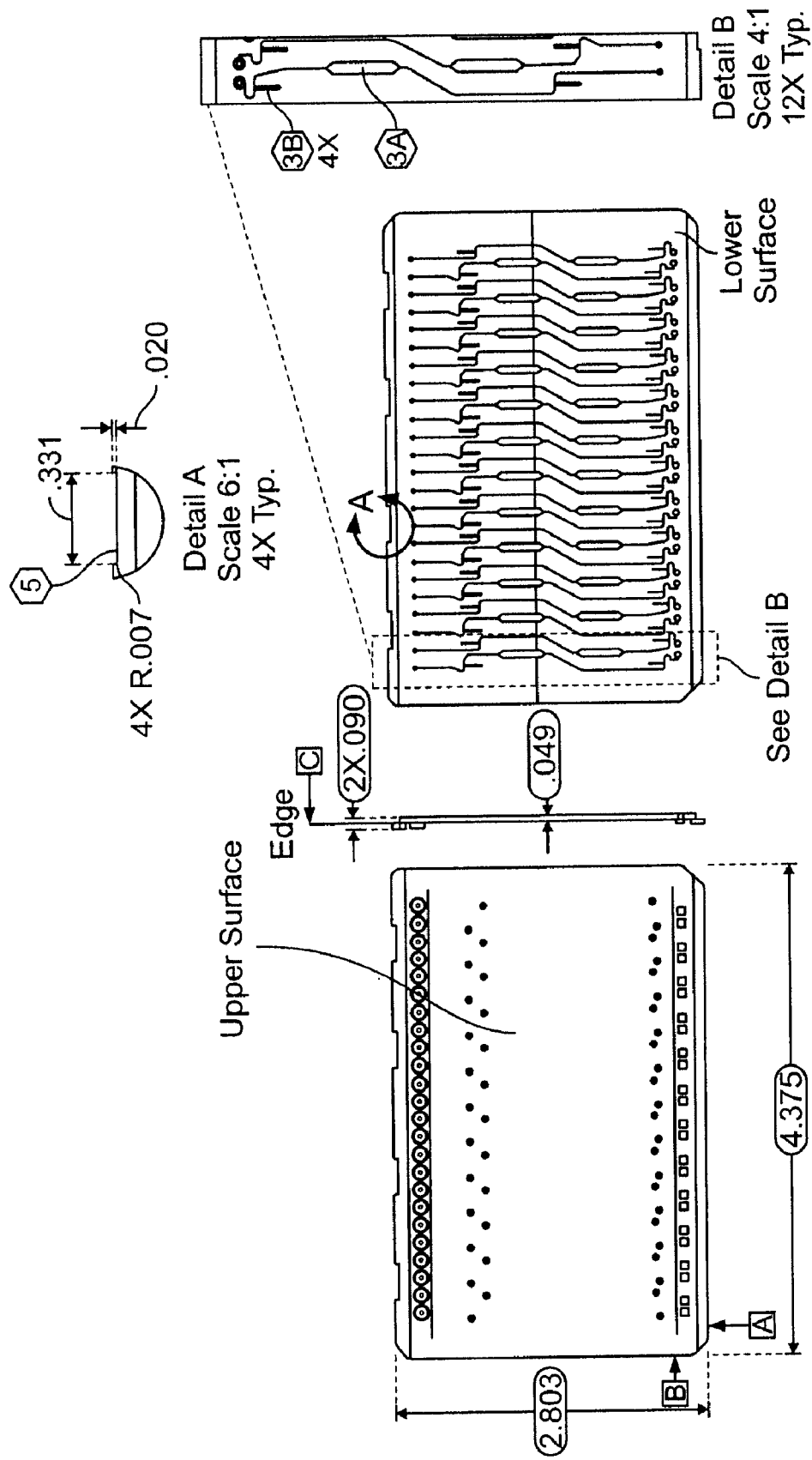
FIG. 32B shows a perspective view of the cartridge of FIG. 32A.
Figure 32C:
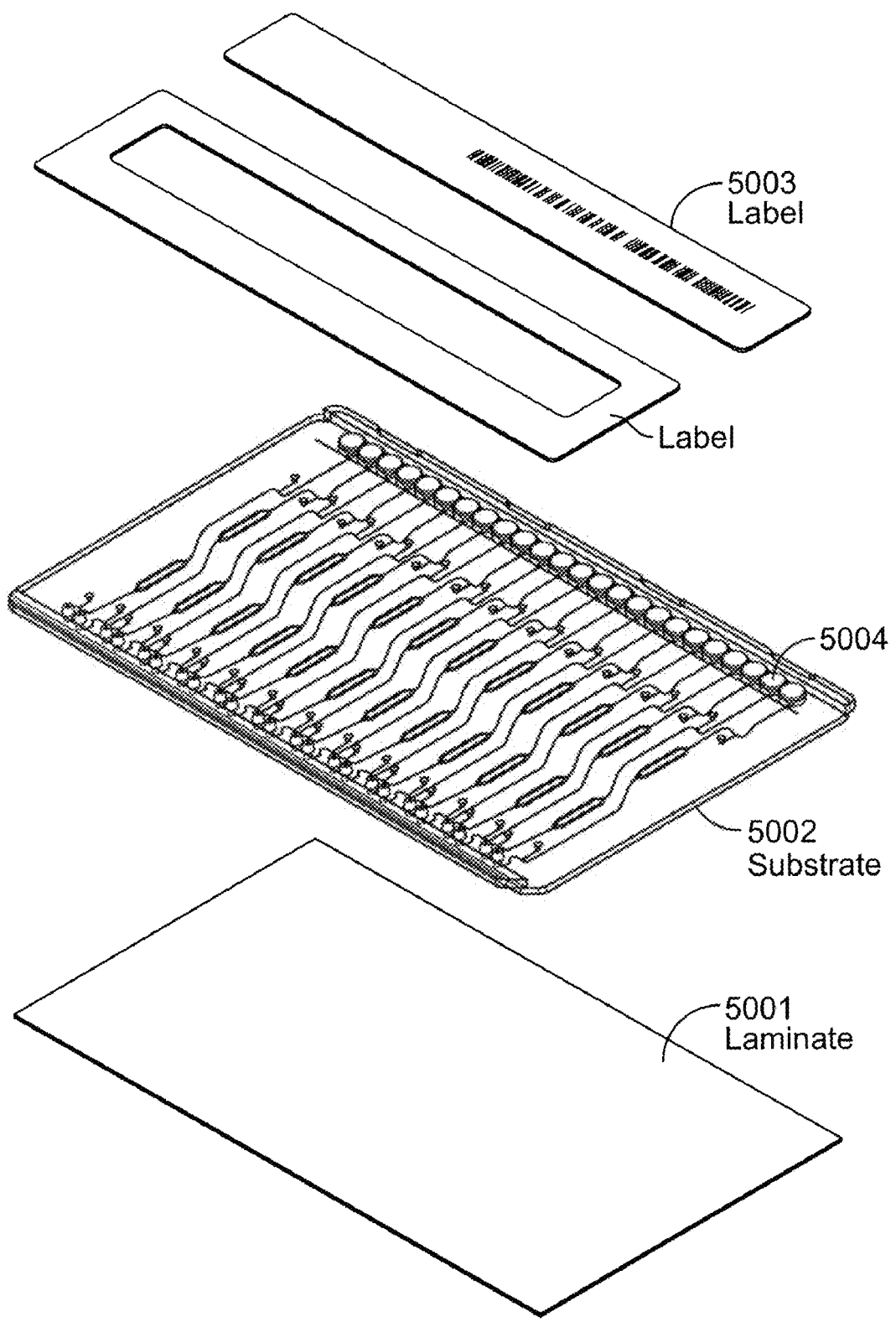
FIG. 32C shows an exploded view of the cartridge of FIG. 32A.

As shown in FIG. 32C, the cartridge 5000 has 3 layers, a laminate 5001, a substrate 5002, and a label 5003. The label is shown in two pieces in this example. A barcode 5006 is visible on label 5003. A row of 24 sample inlets 5004 is shown. A ledge 5005 runs along each of the long edges of the cartridge to facilitate placement in a removable receptacle in receiving bay of a diagnostic instrument, or in a cartridge auto-loader, as further described elsewhere herein.

FIG. 32B has three plan views of the cartridge substrate (upper surface, edge, and lower surface), and two inset views. The upper inset view ("Detail A") shows dimensions of a cut-out (notch) in the upper edge of the cartridge. The right inset view ("Detail B") shows a pair of adjacent lanes, each having a microfluidic network, and each from one of the two banks of networks. The chambers in adjacent networks (from alternate banks) are staggered with respect to one another, even though the sample inlets are all shown in a single line.

The 24-lane cartridge has two banks of 12 PCR lanes, shown in plan view in FIG. 32B. Each lane has a liquid inlet port, that interfaces with a disposable pipette tip; a 4 microliter PCR reaction chamber labeled 3A in the inset in FIG. 32B (1.5 mm wide, 300 microns deep, and approximately 10 mm long), two microvalves on either side of the PCR reactor (one of which labeled 3B in the inset in FIG. 32B, and an outlet vent. Microvalves are normally open initially and close the channel on actuation. The outlet holes enable extra liquid (~1 µl) to be contained in the fluidic channel in case more than 6 µl of fluid is dispensed into a lane of the cartridge.

Dimensions of the cartridge (in inches) and layout of the lanes in the cartridge are shown in FIG. 32B. It would be understood that these dimensions and layout are exemplary, and deviations from those shown are consistent with an equivalent manner of operation of such a cartridge.

The inlet holes 5004 of the cartridge are made conical in shape and have a diameter of 3-6 mm at the top to ensure pipettes can be easily landed by the fluid dispensing head within the conical hole. The bigger the holes, the better is the alignment with the pipette, however, there is a trade-off between maximizing the number of inlet ports within the width of the cartridge and ensuring that the pitch between the holes is compatible with the inter-pipette distance. In this particular design, the inter-pipette distance is 24 mm and the distance between the loading holes in the cartridge is 8 mm. So lanes 1, 4, 7, 11 are pipetted into during one dispensing operation; lanes 2, 5, 8 and 12 in the next, and so on and so forth.

The height of the conical holes is kept lower than the height of the ledges on the sides of the cartridge to ensure the cartridges can be stacked on the ledges. The ledges on the two long edges of the cartridge enable stacking of the cartridges with minimal surface contact between two stacked cartridges and also help guide the cartridge into the reader from a cartridge pack in an auto-loader.

The foregoing description is intended to illustrate various aspects of the present inventions. It is not intended that the examples presented herein limit the scope of the present inventions. The technology now being fully described, it will be apparent to one of ordinary skill in the art that many changes and modifications can be made thereto without departing from the spirit or scope of the appended claims.

What is claimed is:

1. A microfluidic substrate, comprising:
   a plurality of sample lanes, wherein each of the plurality of sample lanes comprises a microfluidic network having, in fluid communication with one another:
      an inlet;
      a first valve and a second valve;
      a reaction chamber;
      a vent;
      a first channel leading from the inlet, via the first valve, to the reaction chamber; and
      a second channel leading from the reaction chamber, via the second valve, to the vent;
      wherein the first and second valves are co-planar with the first and second channels in the microfluidic network and wherein the first and second valves each comprise a temperature responsive substance that melts upon heating and seals the first and second channels.

2. The microfluidic substrate of claim 1, wherein each of the plurality of sample lanes is configured to amplify one or more polynucleotides independently of the other lanes.

3. The microfluidic substrate of claim 1, configured to carry out real-time PCR in at least one of the reaction chambers.

4. The microfluidic substrate of claim 1, wherein each of the inlets is configured to accept a quantity of sample from a pipette tip.

5. The microfluidic substrate of claim 4, wherein the quantity of sample is from 1-20 μl.

6. The microfluidic substrate of claim 4, wherein an inlet comprises an inverted frustoconical structure of at least 1 mm height, and having a diameter at its widest point that accepts entry of a pipette tip, of from 1-5 mm.

7. The microfluidic substrate of claim 1, wherein the inlets of the respective plurality of sample lanes are spaced apart from one another to permit simultaneous loading from a multiple-pipette head dispenser.

8. The microfluidic substrate of claim 1, wherein the reaction chamber has a volume of 3-5 μl.

9. The microfluidic substrate of claim 1, wherein the plurality of sample lanes is 12 lanes.

10. The microfluidic substrate of claim 1, further comprising a fluorescence detection window situated over each of the reaction chambers.

11. A microfluidic cartridge comprising the microfluidic substrate of claim 1.

12. The microfluidic cartridge of claim 11, further comprising a registration member that ensures that the cartridge is received by a complementary diagnostic apparatus in a single orientation.

13. The microfluidic cartridge of claim 11, wherein each of the microfluidic networks, including the reaction chambers, the inlet holes and the valves for isolating the reaction chambers, is defined in a single substrate.

14. The microfluidic cartridge of claim 11, wherein the substrate is a rigid substrate and impervious to air or liquid, and entry or exit of air or liquid during operation of the cartridge is only possible through the inlet or a vent.

15. A microfluidic cartridge, comprising:
a substrate having an upper side and an opposed lower side, wherein the substrate comprises a plurality of sample lanes, wherein each lane of the plurality of sample lanes comprises a microfluidic network having, in fluid communication with one another:
an inlet;
a first valve and a second valve;
a first channel leading from the inlet, via the first valve, to a reaction chamber;
a second channel leading from the reaction chamber, via the second valve, to a vent; and
a label, attached to the upper side, wherein each valve has a wax loading hole extending to the upper side of the substrate, and wherein the label covers and seals the loading holes.

16. The cartridge of claim 15, wherein the microfluidic network is configured so that the time required to fill from the inlet to the second valve is less than 50% of the time required to fill up to the exit vent.

17. The cartridge of claim 15, wherein each microfluidic network comprises an overflow reservoir to contain extra liquid dispensed into the cartridge.

18. The cartridge of claim 15, wherein a 2-D barcode sample identifier is present on the label.

19. The cartridge of claim 15, further comprising two or more positioning elements for use when filling the valves with thermally responsive material.

20. The cartridge of claim 15, configured to be stackable.

21. The cartridge of claim 15, wherein the substrate comprises two ridges, one of each situated along each of two opposite edges of the cartridge, the ridges disposed on the upper side of the substrate.

22. The cartridge of claim 21, wherein the two ridges are configured to permit the cartridge to be supported horizontally on a tray, but keeping the lower side of the substrate below the tray.

23. A microfluidic substrate, comprising:
a plurality of sample lanes, wherein each of the plurality of sample lanes comprises a microfluidic network having, in fluid communication with one another:
an inlet;
a first valve and a second valve;
a reaction chamber;
a vent;
a first channel leading from the inlet, via the first valve, to the reaction chamber; and
a second channel leading from the reaction chamber, via the second valve, to the vent;
wherein the first and second valves comprise a temperature responsive substance that melts upon heating and seals the reaction chamber.

24. The microfluidic substrate of claim 23, wherein each of the plurality of sample lanes is configured to amplify one or more polynucleotides independently of the other lanes.

25. The microfluidic substrate of claim 23, configured to carry out real-time PCR in at least one of the reaction chambers.

26. The microfluidic substrate of claim 23, wherein each of the inlets is configured to seal with and accept a quantity of sample from a pipette tip.

27. The microfluidic substrate of claim 26, wherein the quantity of sample is from 1-20 μl.

28. The microfluidic substrate of claim 26, wherein an inlet comprises an inverted frustoconical structure of at least 1 mm height, and having a diameter at its widest point that accepts entry of a pipette tip, of from 1-5 mm.

29. The microfluidic substrate of claim 23, wherein the inlets of the respective plurality of sample lanes are spaced apart from one another to permit simultaneous loading from a multiple-pipette head dispenser.

30. The microfluidic substrate of claim 23, wherein the reaction chamber has a volume of 3-5 μl.

31. The microfluidic substrate of claim 23, wherein the plurality of sample lanes is 12 lanes.

32. The microfluidic substrate of claim 23, further comprising a fluorescence detection window situated over each of the reaction chambers.

33. A microfluidic cartridge comprising the microfluidic substrate of claim 23.

34. The microfluidic cartridge of claim 33, further comprising a registration structure that ensures that the cartridge is received by a complementary diagnostic apparatus in a single orientation.

35. The microfluidic cartridge of claim 33, wherein each of the microfluidic networks, including the PCR reaction chambers, the inlet holes and the valves for isolating the PCR reaction chambers, is defined in a single substrate.

36. The microfluidic cartridge of claim 33, wherein the substrate is a rigid substrate and impervious to air or liquid, and entry or exit of air or liquid during operation of the cartridge is substantially possible only through the inlet or a vent.

* * * * *

UNITED STATES PATENT AND TRADEMARK OFFICE
CERTIFICATE OF CORRECTION

| | |
|---|---|
| PATENT NO. | : 8,105,783 B2 |
| APPLICATION NO. | : 12/239537 |
| DATED | : January 31, 2012 |
| INVENTOR(S) | : Kalyan Handique |

It is certified that error appears in the above-identified patent and that said Letters Patent is hereby corrected as shown below:

On Title Page 1, Item [56] Col. 2, Line 37, please change "Microfuidic" to --Microfluidic--.

On Title Page 5, Item [56] Col. 1, Line 36, please change ""Microflidic" to --"Microfluidic--.

On Title Page 5, Item [56] Col. 1, Line 43, please change "Micochannel"," to --Microchannel",--.

On Title Page 5, Item [56] Col. 1, Line 47, please change "Microfludic" to --Microfluidic--.

On Title Page 5, Item [56] Col. 2, Line 2, please change "Concentraction" to --Concentration--.

On Title Page 5, Item [56] Col. 2, Line 7, please change "Microfludic" to --Microfluidic--.

On Title Page 5, Item [56] Col. 2, Line 47, please change "fro" to --from--.

On Title Page 5, Item [56] Col. 2, Line 48, please change "Polyamidomine" to --Polyamidoamine--.

In the Drawings:

At Sheet 17 of 52 (Ref. Numeral 2902, FIG. 10A), Line 1, please change "Chambe" to --Chamber--.

At Sheet 29 of 52 (FIG. 19A), approx. Line 2, please change "Catridge" to --Cartridge--.

In the Specifications:

At Col. 3, Line 21, please change "shows" to --show--.

At Col. 4, approx. Line 31, please change "herein" to --herein.--.

At Col. 13, approx. Line 22, please change "polytetrafluorethylene" to --polytetrafluoroethylene--.

At Col. 20, Line 61, please change "received" to --received.--.

At Col. 32, Line 57, please change "pneumonophilia," to --pneumophila,--.

At Col. 32, Line 58, please change "pneumonophilia," to --pneumophila,--.

At Col. 32, Line 62, please change "typhi" to --typhi,--.

At Col. 32, Line 64, please change "dublin" to --dublin,--.

At Col. 33, Line 24, please change "avium" to --avium,--.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,105,783 B2

At Col. 33, Line 26, please change "chelonei)," to --chelonae),--.

At Col. 33, Line 27, please change "chelonei" to --chelonae--.

At Col. 33, Line 37, please change "mameffei;" to --marneffei;--.

At Col. 33, Line 52, please change "stercoralis" to --stercoralis,--.

At Col. 33, Line 59, please change "Skriabini;" to --Skrjabini;--.

At Col. 33, Line 64, please change "adnoviruses;" to --adenoviruses;--.

At Col. 33, Line 66, please change "T-lymphotrophic" to --T-lymphotropic--.

At Col. 34, Line 16, please change "methecillin" to --methicillin--.

At Col. 34, Line 21, please change "Gardenerella" to --Gardnerella--.

At Col. 34, Line 22, please change "gonorrhoeee," to --gonorrhoeae,--.

At Col. 34, Line 23, please change "catarrahlis," to --catarrhalis,--.

At Col. 34, Line 25, please change "ferrmentum," to --fermentum,--.

At Col. 34, Lines 26-27, please change "Camplobacter" to --Campylobacter--.

At Col. 34, Line 28, please change "Yersina" to --Yersinia--.

At Col. 40, Line 13, please change "contaminants" to --contaminants.--.

At Col. 40, Line 16, please change "buffer" to --buffer.--.

At Col. 40, Line 34, please change "DNA" to --DNA.--.

At Col. 40, Line 51, please change "SYBRg" to --SYBR--.

At Col. 41, Line 9, please change "back up." to --backup.--.